(12) United States Patent
Han et al.

(10) Patent No.: US 11,739,267 B2
(45) Date of Patent: Aug. 29, 2023

(54) LC MEDIUM

(71) Applicant: MERCK PATENT GMBH, Darmstadt (DE)

(72) Inventors: Yeon-Jeong Han, Gyeonggi-do (KR); Dong-Hyun Kim, Seoul (KR); Heui-Seok Jin, Gyeonggi-do (KR); Chang-Suk Choi, Chungcheongnam-do (KR)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 16/913,971

(22) Filed: Jun. 26, 2020

(65) Prior Publication Data
US 2020/0407640 A1    Dec. 31, 2020

(30) Foreign Application Priority Data
Jun. 28, 2019 (EP) ..................... 19183112

(51) Int. Cl.
| | | |
|---|---|---|
| *G02F 1/1333* | (2006.01) | |
| *C09K 19/34* | (2006.01) | |
| *C09K 19/02* | (2006.01) | |
| *G02F 1/137* | (2006.01) | |
| *C09K 19/04* | (2006.01) | |

(52) U.S. Cl.
CPC ...... *C09K 19/3402* (2013.01); *C09K 19/0208* (2013.01); *C09K 2019/0466* (2013.01); *C09K 2019/3422* (2013.01); *G02F 1/137* (2013.01); *G02F 1/13706* (2021.01)

(58) Field of Classification Search
CPC ............ C09K 19/3402; C09K 19/0208; C09K 19/20; C09K 19/3003; C09K 19/44; C09K 2019/0466; C09K 2019/3422; C09K 2019/0448; C09K 2019/122; C09K 2019/123; C09K 2019/3004; C09K 2019/301; C09K 2019/3025; C09K 2019/3066; G02F 1/137; G02F 1/13706; G02F 1/1333; G02B 30/24
See application file for complete search history.

(56) References Cited

U.S. PATENT DOCUMENTS

| | | | | |
|---|---|---|---|---|
| 8,404,150 | B2* | 3/2013 | Wittek | ............... C09K 19/3098 |
| | | | | 252/299.6 |
| 8,585,925 | B2* | 11/2013 | Czanta | .................. C09K 19/42 |
| | | | | 252/299.63 |
| 8,906,261 | B2 | 12/2014 | Wittek et al. | |
| 10,550,326 | B2 | 2/2020 | Wittek et al. | |
| 2012/0256124 | A1 | 10/2012 | Ohgiri et al. | |
| 2013/0207038 | A1 | 8/2013 | Haensel et al. | |
| 2013/0327984 | A1 | 12/2013 | Wittek et al. | |
| 2014/0306158 | A1 | 10/2014 | Saito | |
| 2017/0037315 | A1 | 2/2017 | Hirschmann et al. | |
| 2017/0037316 | A1 | 2/2017 | Goetz et al. | |
| 2017/0204332 | A1 | 7/2017 | Wittek et al. | |
| 2017/0335195 | A1 | 11/2017 | Hung et al. | |
| 2018/0057747 | A1 | 3/2018 | Matsuda et al. | |
| 2018/0134960 | A1 | 5/2018 | Haensel et al. | |
| 2018/0179446 | A1 | 6/2018 | Klasen-Memmer et al. | |
| 2018/0187080 | A1 | 7/2018 | Song et al. | |
| 2018/0223187 | A1 | 8/2018 | Hirschmann et al. | |
| 2018/0265785 | A1 | 9/2018 | Yun et al. | |
| 2019/0241811 | A1 | 8/2019 | Kirsch et al. | |
| 2021/0163820 | A1 | 6/2021 | Junge et al. | |
| 2021/0171830 | A1 | 6/2021 | Verbunt et al. | |

FOREIGN PATENT DOCUMENTS

| | | |
|---|---|---|
| DE | 102011106314 A1 | 2/2012 |
| EP | 3127989 A1 | 2/2017 |
| EP | 2628779 B1 | 5/2017 |
| EP | 3375842 A1 | 9/2018 |
| EP | 3246374 B1 | 8/2019 |
| EP | 3275973 B1 | 12/2019 |
| EP | 3127991 B1 | 4/2020 |
| WO | 2015169425 A1 | 11/2015 |
| WO | 2016008568 A1 | 1/2016 |
| WO | 16177445 A1 | 11/2016 |
| WO | 16206772 A1 | 12/2016 |

(Continued)

OTHER PUBLICATIONS

Peng et al., "High performance liquid crystals for vehicle displays", Optical Materials Express, Mar. 1, 2016, vol. 6, No. 3, pp. 717-726. (Year: 2016).*
Search Report in corresponding EP 20181815 dated Oct. 27, 2020 (pp. 1-14).
Office action in corresponding EP application 201818915.0 dated Feb. 14, 2023 (pp. 1-5).

*Primary Examiner* — Geraldina Visconti
(74) *Attorney, Agent, or Firm* — MILLEN WHITE ZELANO AND BRANIGAN, PC; Csaba Henter

(57) ABSTRACT

LC media and LC displays containing an LC medium with positive dielectric anisotropy, which contains one or more compounds of formula I in a concentration of >0 and ≤10%

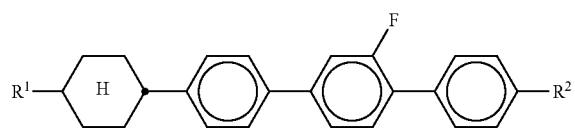

and displays addressed by an active matrix and in particular displays of the IPS, PS-IPS, FFS, PS-FFS, HB-FFS, U-IPS, TN, PS-TN, STN or TN-TFT mode.

26 Claims, No Drawings

(56) References Cited

FOREIGN PATENT DOCUMENTS

| | | |
|---|---|---|
| WO | 16206774 A1 | 12/2016 |
| WO | 18001919 A1 | 1/2018 |
| WO | 2019110458 A1 | 6/2019 |
| WO | 2019110459 A1 | 6/2019 |

* cited by examiner

LC MEDIUM

The present invention relates to LC (LC) media and to LC displays (LCDs) containing these media, especially to LCDs addressed by an active matrix and in particular to LCDs of the IPS, PS-IPS, FFS, PS-FFS, HB-FFS, U-IPS, TN, PS-TN, STN or TN-TFT mode.

LCDs are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the LC layer. Besides these modes, there are also electro-optical modes that utilise an electric field which is substantially parallel to the substrates or the LC layer, such as, for example, the in-plane switching (IPS) mode (as disclosed, for example, in DE 40 00 451 and EP 0 588 568) and the fringe field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and displays for TV sets and multimedia applications. The liquid crystals according to the present invention are preferably used in displays of this type. In general, dielectrically positive LC media having rather lower values of the dielectric anisotropy are used in FFS displays, but in some cases LC media having a dielectric anisotropy of only about 3 or even less are also used in IPS displays.

A further development are displays of the so-called PS ("polymer sustained") or PSA ("polymer sustained alignment") type, for which the term "polymer stabilised" is also occasionally used. In these, a small amount (for example 0.3% by weight, typically <1% by weight) of one or more polymerisable, compound(s), preferably polymerisable monomeric compound(s), is added to the LC medium and, after filling the LC medium into the display, is polymerised or crosslinked in situ, usually by UV photopolymerisation, optionally while a voltage is applied to the electrodes of the display. The polymerisation is carried out at a temperature where the LC medium exhibits an LC phase, usually at room temperature. The addition of polymerisable mesogenic or LC compounds, also known as reactive mesogens or "RMs", to the LC mixture has proven particularly suitable.

For these displays, novel LC media having improved properties are required. The addressing times in particular have to be improved for many types of application. Thus, LC media having lower viscosities ($\eta$), especially having lower rotational viscosities ($\gamma_1$), are required. Besides these viscosity parameters, the media must have a nematic phase range of suitable width and position and an appropriate birefringence ($\Delta n$), and the dielectric anisotropy ($\Delta\vartheta$) should be sufficiently high to allow a reasonably low operating voltage.

The displays according to the present invention are preferably addressed by an active matrix (active matrix LCDs, AMDs for short), preferably by a matrix of thin film transistors (TFTs). However, the liquid crystals according to the invention can also advantageously be used in displays having other known addressing means.

LC media which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these LC media have certain disadvantages. Amongst other deficiencies, most of them result in disadvantageously long addressing times, have inadequate values of the resistivity and/or require excessively high operating voltages. Both an improvement in the operating properties and also in the shelf life are necessary here.

Especially in case of LC media for use in the expanding market of public information displays (PIDs) and automotive displays a high reliability and a wide operating range are highly important factors. For these applications LC media with high clearing temperature (Tni), good LTS (Low Temperature Stability) and high reliability are therefore desired.

The invention has the object of providing media, in particular for FFS, IPS, TN or STN displays of this type, in particular for active matrix displays like those of the TFT (thin film transistor) type, which do not exhibit the disadvantages indicated above or only do so to a lesser extent and preferably exhibit one or more of a wide operating range, a high clearing temperature, a high reliability, a low threshold voltage, a high dielectric anisotropy, a good low temperature stability (LTS), a low rotational viscosity and fast response times.

This object was achieved by providing an LC medium as described and claimed hereinafter.

The invention relates to an LC medium with positive dielectric anisotropy, characterised in that it contains one or more compounds of formula I in a concentration of >0 and ≤10%

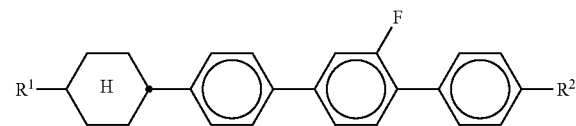

I in which $R^1$ and $R^2$ independently of each other denote alkyl having 1 to 6 C atoms.

Preferably the LC medium has a birefringence <0.15, more preferably from 0.8 to 0.15.

The invention further relates to the use of an LC medium as described above and below for electro-optical purposes, in particular for the use in shutter glasses, for 3D applications, in IPS, PS-IPS, FFS, PS-FFS, HB-FFS, U-IPS, TN, PS-TN, STN or TN-TFT displays.

The invention further relates to an electro-optical LC display containing an LC medium as described above and below, in particular an IPS, PS-IPS, FFS, PS-FFS, HB-FFS, U-IPS, TN, PS-TN, STN or TN-TFT display.

The invention furthermore relates to a process for preparing an LC medium as described above and below, comprising the steps of mixing one or more compounds of formula I with one or more further LC compounds and optionally one or more additives.

In the present application, all atoms also include their isotopes. In particular, one or more hydrogen atoms (H) may be replaced by deuterium (D), which is particularly preferred in some embodiments; a high degree of deuteration enables or simplifies analytical determination of compounds, in particular in the case of low concentrations.

If $R^0$ denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy. $R^0$ preferably denotes straight-chain alkyl having 2-6 C atoms.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$ denotes an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^0$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH=CF_2$ or $CH=CF_2$, very particularly preferably F or $OCF_3$, furthermore $CF_3$, $OCF=CF_2$, $OCHF_2$ or $OCH=CF_2$.

Particular preference is given to compounds in which $X^0$ denotes F or $OCF_3$, preferably F.

In the compounds of formulae I $R^1$ and $R^2$ are preferably selected from ethyl, propyl, butyl and pentyl, all of which are straight-chain.

Preferred compounds of the formula I are selected from the following subformulae.

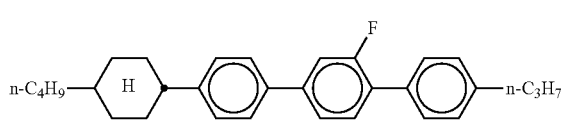

I1

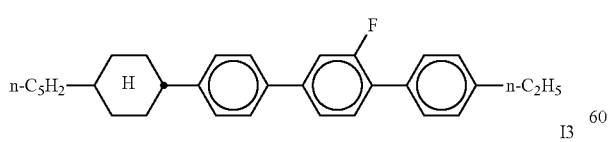

I2

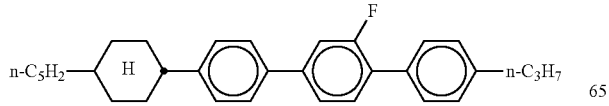

I3

Very preferred are compounds of formula I2.

The concentration of the compounds of formula I and its subformulae in the LC medium is preferably from 0.2 to 10%, more preferably from 1.0 to 10%, very preferably from 1.0 to 8%.

Preferably the LC medium contains 1, 2 or 3 compounds of formula I or its subformulae.

Further preferred embodiments of an LC medium according to the present invention are indicated below, including any combination thereof:

The medium additionally comprises one or more compounds selected from the following formulae

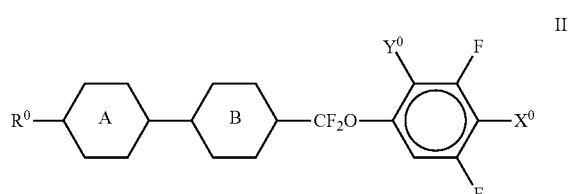

II

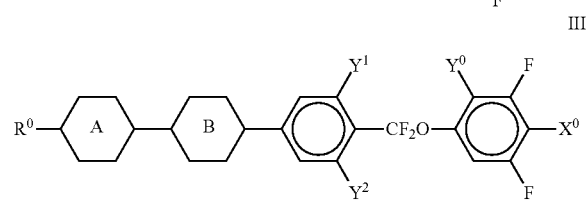

III wherein the individual radicals, independently of each other and on each occurrence identically or differently, have the following meanings

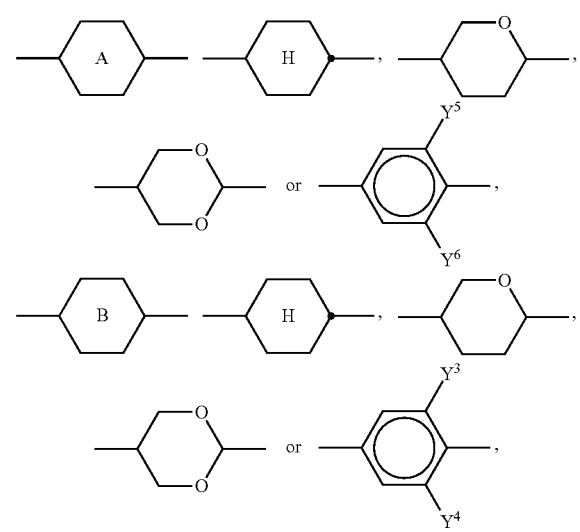

$R^0$ an unsubstituted or halogenated alkyl or alkoxy radical having 1 to 15 C atoms, where, in addition, one or more $CH_2$ groups in these radicals may each be replaced, independently of one another, by —C≡C—, —$CF_2O$—, —CH=CH—,

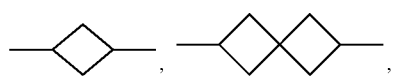

—O—, —CO—O— or —O—CO— in such a way that O atoms are not linked directly to one another, or denotes

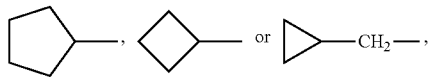

$X^0$ F, Cl, CN, SF$_5$, SCN, NCS, a halogenated alkyl radical, a halogenated alkenyl radical, a halogenated alkoxy radical or a halogenated alkenyloxy radical having up to 6 C atoms, and $Y^0$ H or CH$_3$, $Y^{1-6}$ H or F.

In the compounds of formulae II and III and their subformulae $R^0$ preferably denotes straight-chain alkyl having 1 to 6 C atoms, in particular methyl, ethyl or propyl, furthermore alkenyl having 2 to 6 C atoms, in particular vinyl, 1E-propenyl, 1E-butenyl, 3-butenyl, 1E-pentenyl, 3E-pentenyl or 4-pentenyl.

The LC medium comprises one or more compounds of formula II wherein $Y^0$ is H, preferably selected from the group consisting of the following subformulae

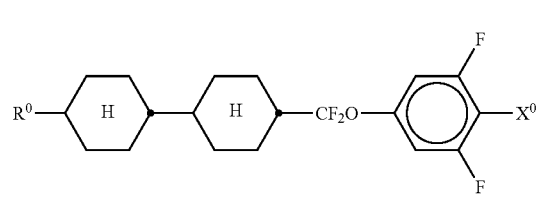
II1

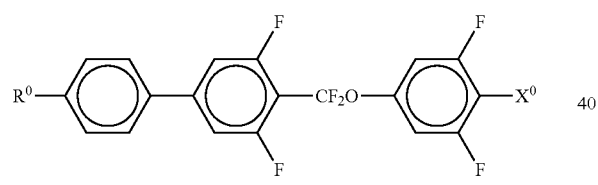
II2

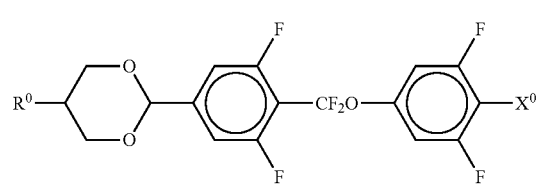
II3

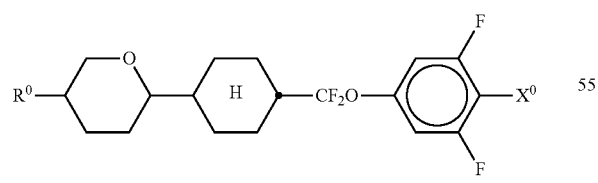
II4

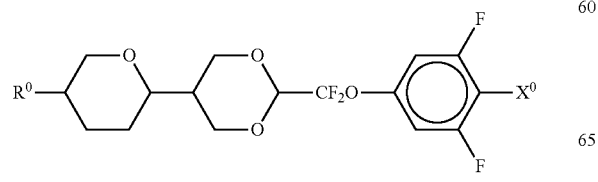
II5

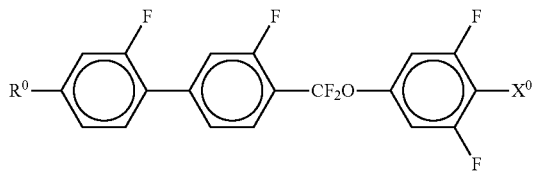
II6

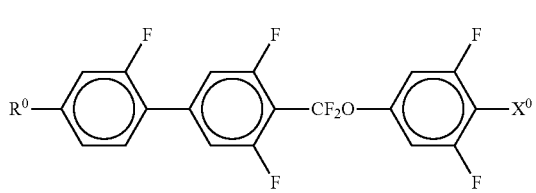
II7 in which $R^0$ and $X^0$ have the meanings given above.

Preferred compounds are those of formula II1, II2 and II3, very preferred those of formula II1 and II2.

In the compounds of formulae II1 to II7 $R^0$ preferably denotes alkyl having 1 to 6 C atoms, very preferably ethyl or propyl, and $X^0$ preferably denotes F or OCF$_3$, very preferably F.

The medium comprises one or more compounds of formula II wherein $Y^0$ is CH$_3$, preferably selected from the group consisting of the following subformulae

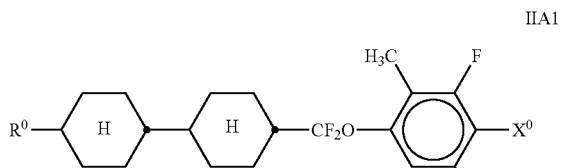
IIA1

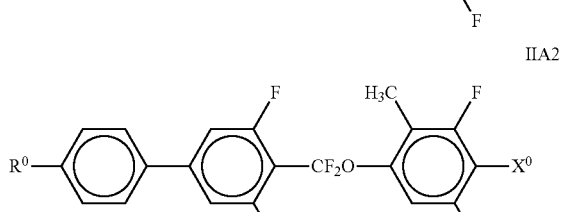
IIA2

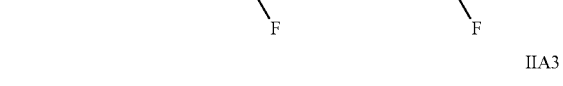
IIA3

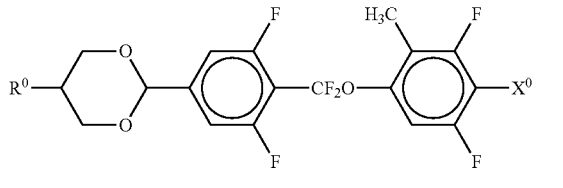
IIA3

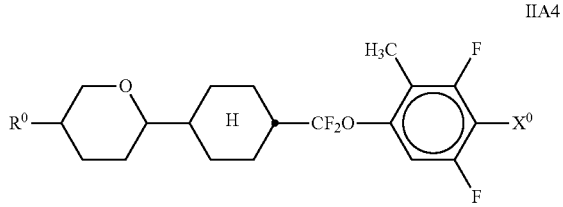
IIA4

IIA5
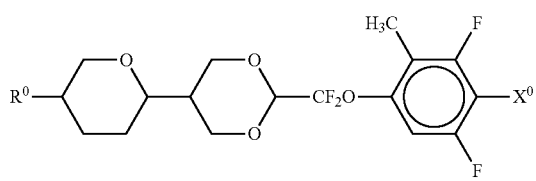

IIA6
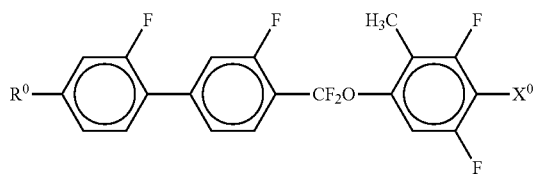

IIA7
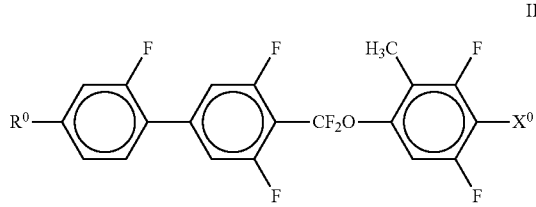

in which $R^0$ and $X^0$ have the meanings given above.

Preferred compounds are those of formula IIA1, IIA2 and IIA3, very preferred those of formula IIA1 and IIA2.

In the compounds of formulae IIA1 to IIA7 $R^0$ preferably denotes alkyl having 1 to 6 C atoms, very preferably ethyl or propyl, and $X^0$ preferably denotes F or $OCF_3$, very preferably F.

The medium comprises one or more compounds of formula III wherein $Y^0$ is H, preferably selected from the group consisting of the following subformulae III1
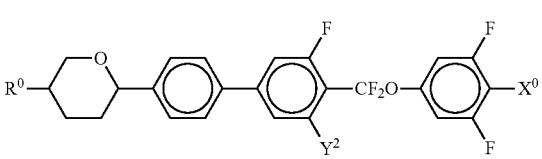

III2
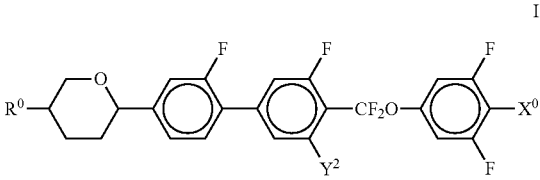

III3
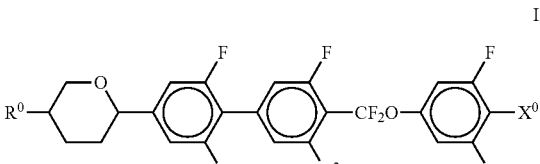

III4
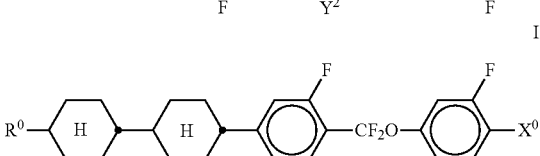

III5
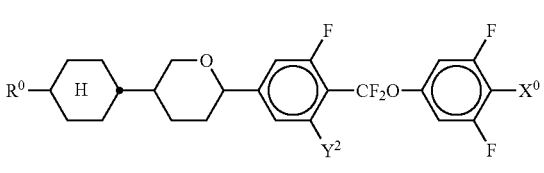

III6
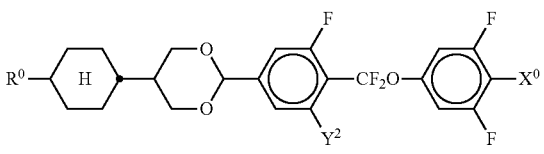

III7
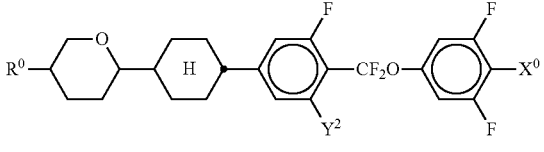

III8
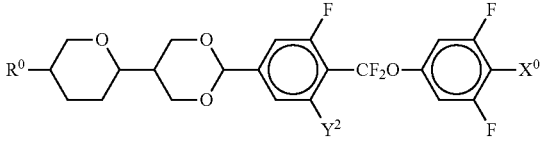

III9
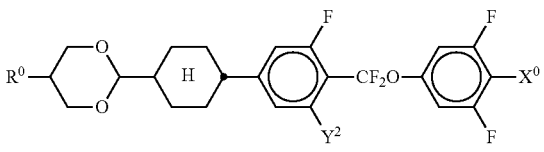

III10
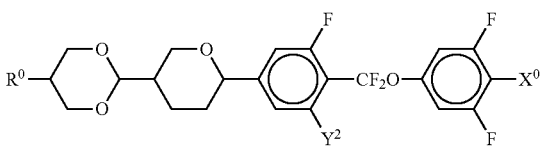

III11
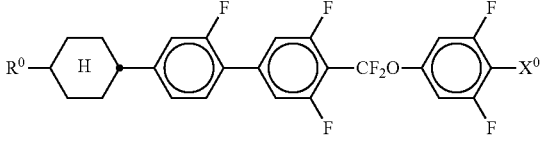

III12
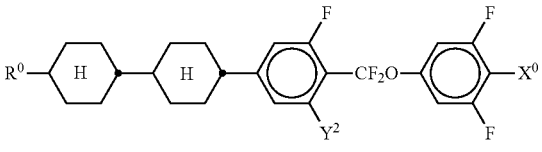

III13

III14
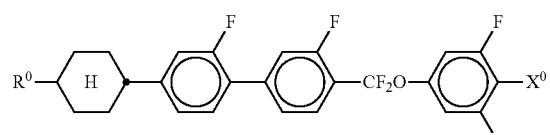

III15
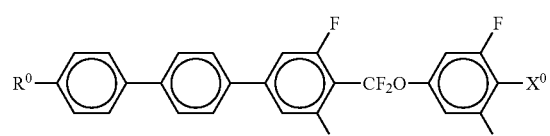

III16
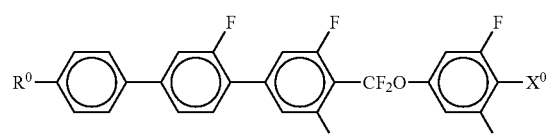

III17
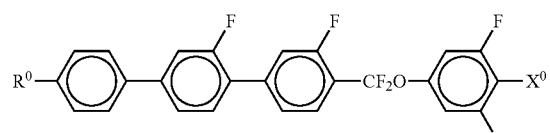

III18
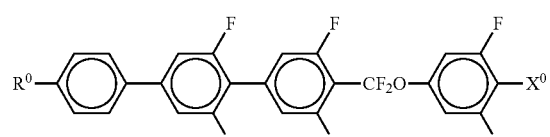

III19
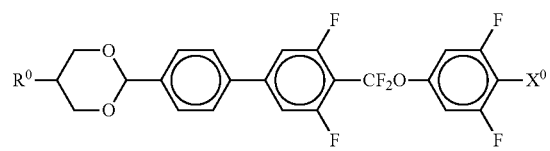

III20
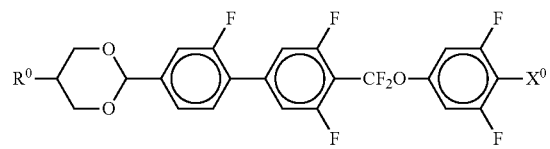

III21
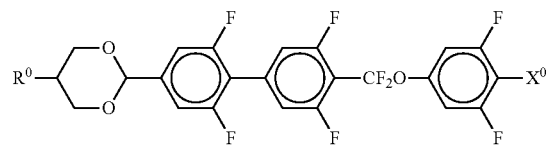

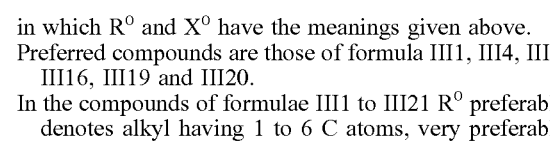

in which $R^0$ and $X^0$ have the meanings given above.

Preferred compounds are those of formula III1, III4, III6, III16, III19 and III20.

In the compounds of formulae III1 to III21 $R^0$ preferably denotes alkyl having 1 to 6 C atoms, very preferably ethyl or propyl, $X^0$ preferably denotes F or $OCF_3$, very preferably F, and $Y^2$ preferably denotes F.

The medium comprises one or more compounds of formula III wherein $Y^0$ is $CH_3$, preferably selected from the group consisting of the following subformulae IIIA1
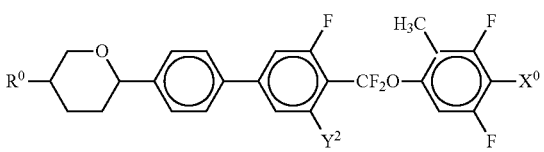

IIIA2
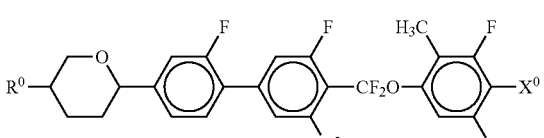

IIIA3
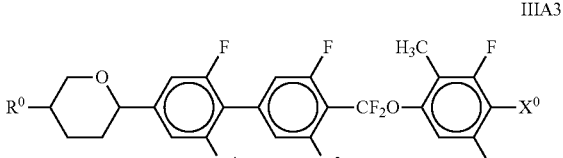

IIIA4
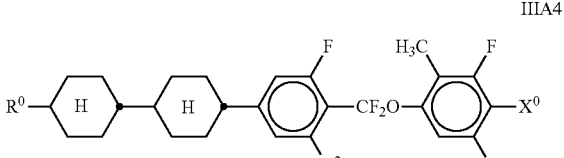

IIIA5
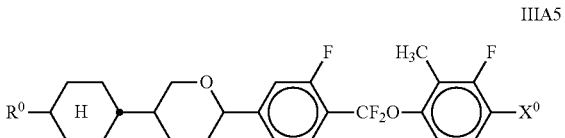

IIIA6
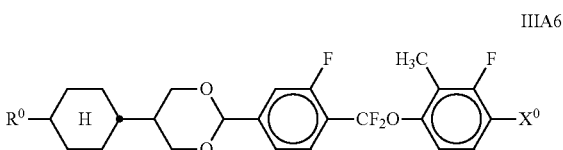

IIIA7
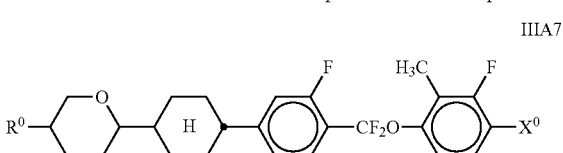

IIIA8
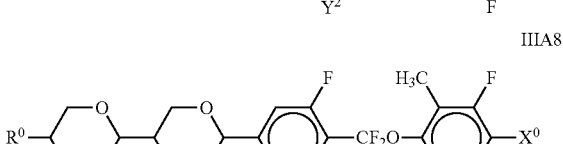

IIIA9
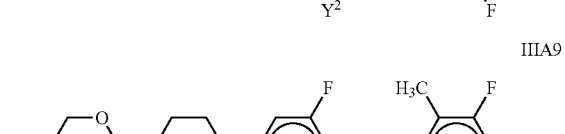

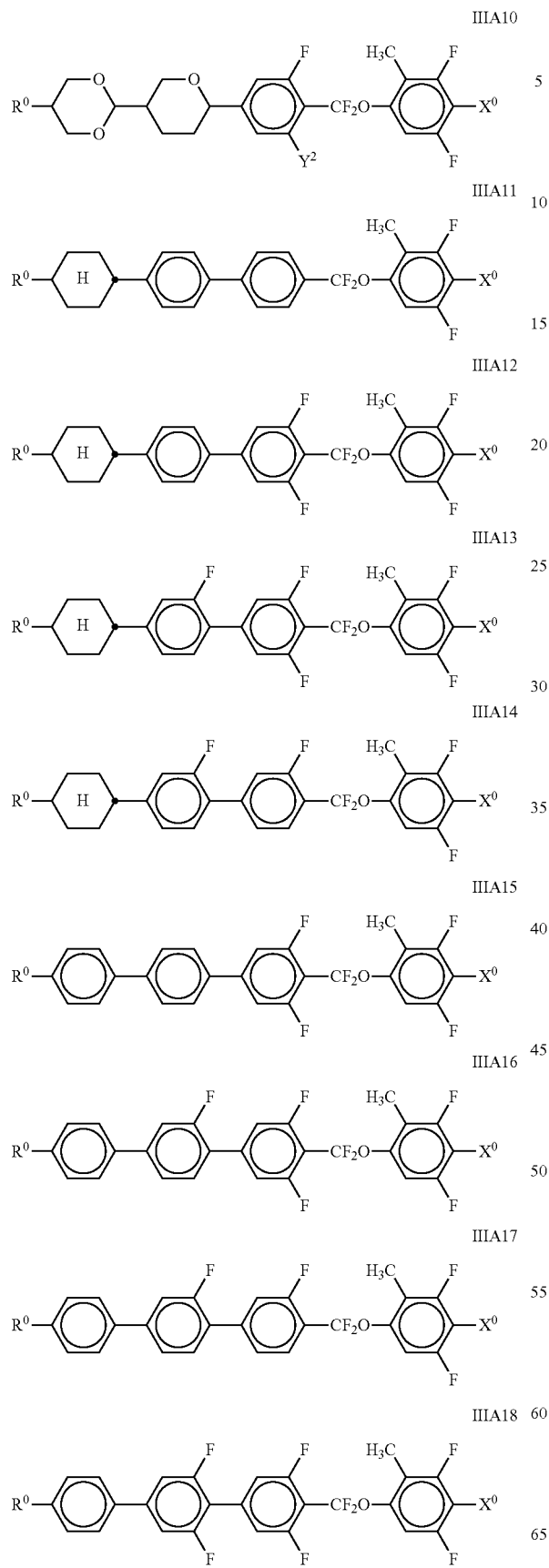
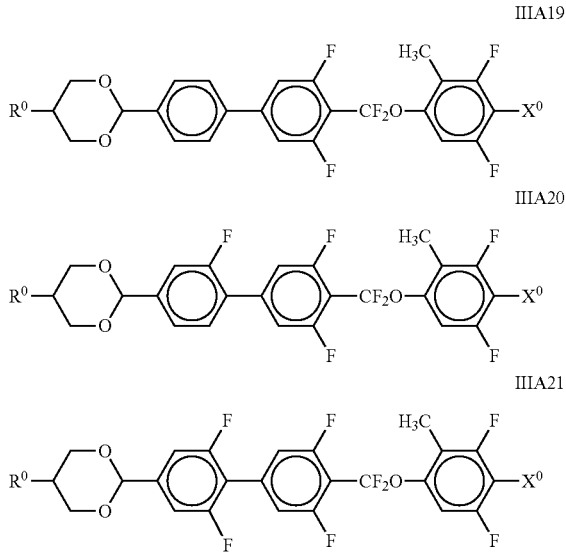

in which $Y^2$, $R^0$ and $X^0$ have the meanings given above.

Preferred compounds are those of formula IIIA1, IIIA4, IIIA6, IIIA16, IIIA19 and IIIA20.

In the compounds of formulae IIIA1 to IIIA21 $R^0$ preferably denotes alkyl having 1 to 6 C atoms, very preferably ethyl or propyl, $X^0$ preferably denotes F or $OCF_3$, very preferably F, and $Y^2$ preferably denotes F.

The medium additionally comprises one or more compounds selected from the following formulae:

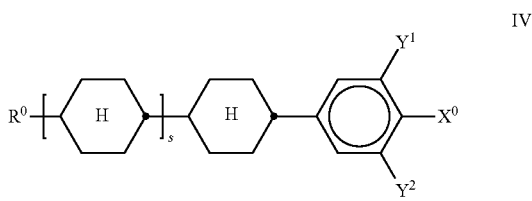
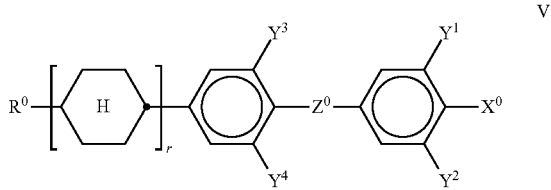
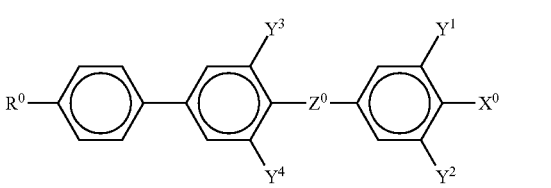
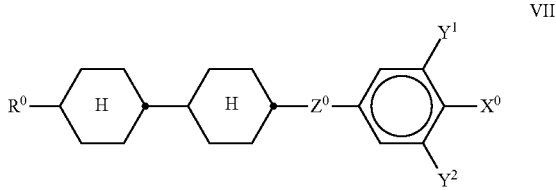

-continued

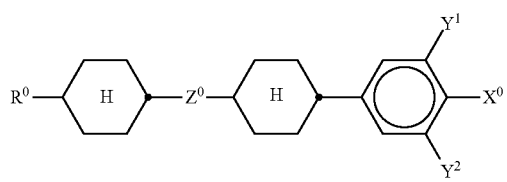

VIII in which
R⁰, X⁰ and Y¹⁻⁴ have the meanings indicated above, and
Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—,
r denotes 0 or 1, and
s denotes 0 or 1;

The medium comprises one or more compounds of the formula IV selected from the following subformulae:

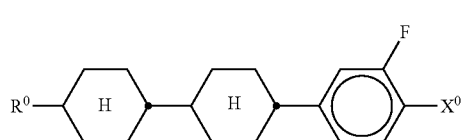

IVa

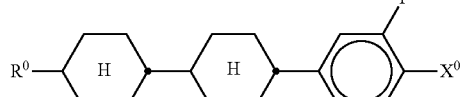

IVb

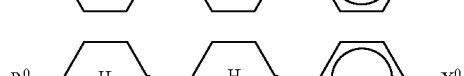

IVc

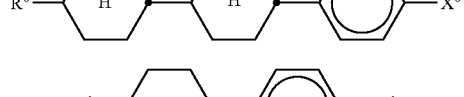

IVd in which R⁰ and X⁰ have the meanings indicated above. R⁰ preferably denotes alkyl having 1 to 6 C atoms. X⁰ preferably denotes F or OCF₃, furthermore OCF=CF₂ or Cl;

The medium comprises one or more compounds of the formula IVa selected from the following subformula:

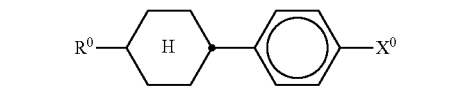

IVa1 in which R⁰ has the meanings indicated above and is preferably propyl or pentyl.

The medium comprises one or more compounds of the formula IVc selected from the following subformula:

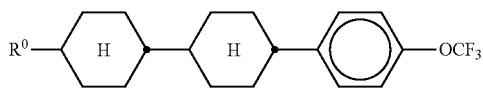

IVc1 in which R⁰ has the meanings indicated above and is preferably propyl or pentyl.

The medium comprises one or more compounds of the formula V selected from the following subformulae:

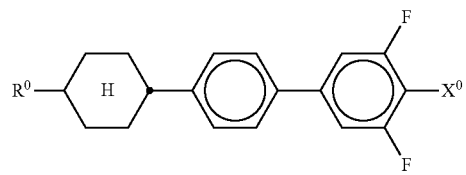

Va

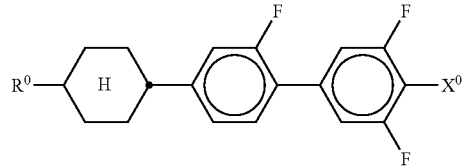

Vb

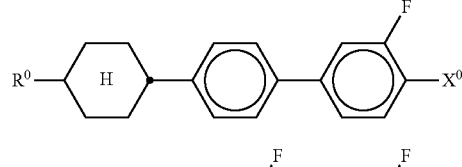

Vc

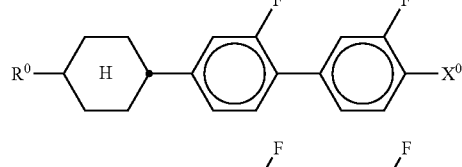

Vd

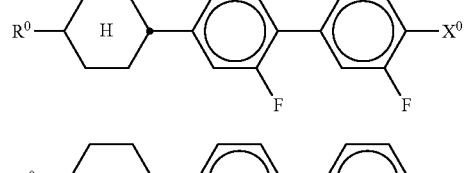

Ve

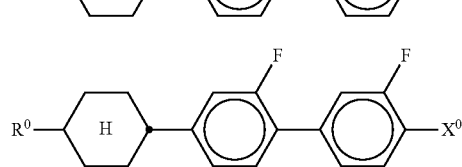

Vf

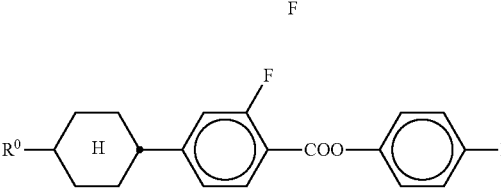

Vg

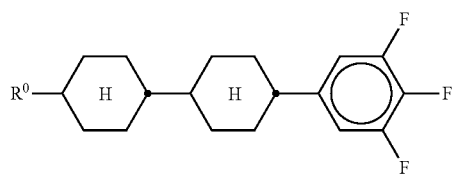

Vh in which R⁰ and X⁰ have the meanings indicated above.

$R^0$ preferably denotes alkyl having 1 to 6 C atoms. $X^0$ preferably denotes F and $OCF_3$, furthermore $OCHF_2$, $CF_3$, $OCF=CF_2$ and $OCH=CF_2$;

The medium comprises one or more compounds of the formula VI selected from the following subformulae:

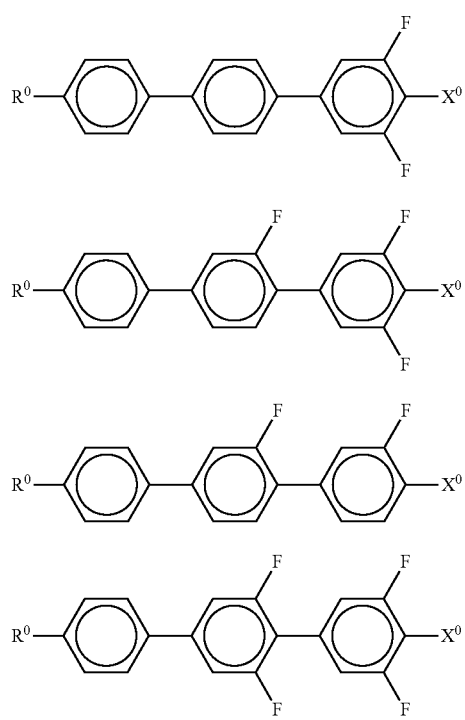

VIa

VIb

VIc

VId in which $R^0$ and $X^0$ have the meanings indicated above.

$R^0$ preferably denotes alkyl having 1 to 6 C atoms. $X^0$ preferably denotes F, furthermore $OCF_3$, $CF_3$, $CF=CF_2$, $OCHF_2$ and $OCH=CF_2$;

The medium comprises one or more compounds of the formula VII selected from the following subformulae:

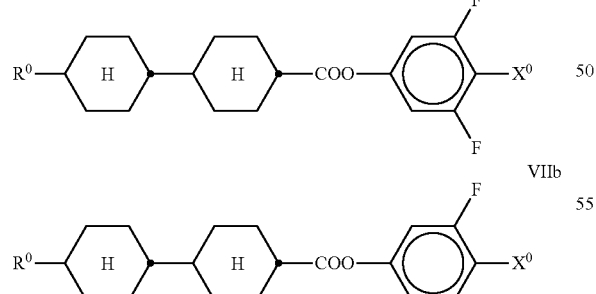

VIIa

VIIb in which $R^0$ and $X^0$ have the meanings indicated above.

$R^0$ preferably denotes alkyl having 1 to 6 C atoms. $X^0$ preferably denotes F, furthermore $OCF_3$, $OCHF_2$ and $OCH=CF_2$.

The medium additionally comprises one or more compounds selected from the following formulae:

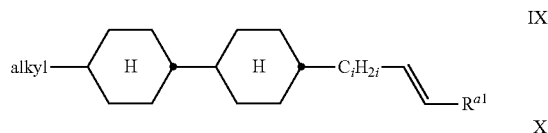

IX

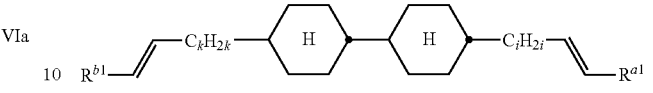

X

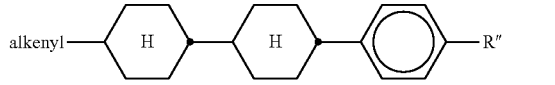

XI

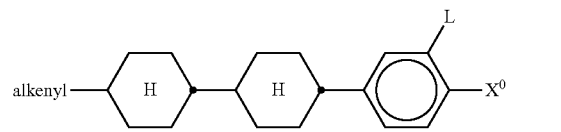

XII in which $X^0$ has the meanings indicated above, and
"alkyl" denotes $C_{1-6}$-alkyl,
"alkenyl" denote $C_{2-6}$-alkenyl,
L denotes H or F,
R" denotes $C_{1-6}$-alkyl, $C_{1-6}$-alkoxy or $C_{2-6}$-alkenyl,
$R^{a1}$, $R^{b1}$ denote independently of each other $CH_3$ or $C_2H_5$,
i, k are independently of each other 0, 1, 2 or 3, The medium comprises one or more compounds of the formulae IX-XII selected from the following subformulae:

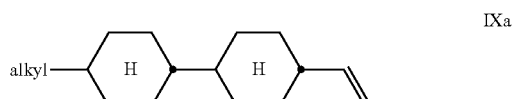

IXa

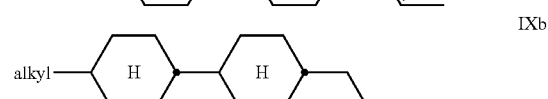

IXb

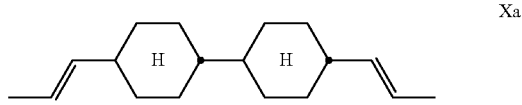

Xa

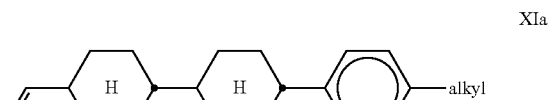

XIa

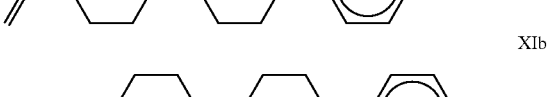

XIb

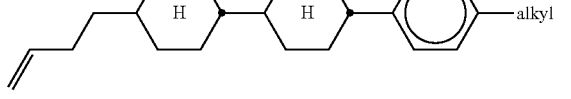

XIIa

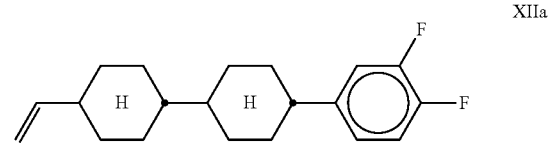

wherein "alkyl" has the meaning given in formula IX.

In formula IX, IXa and IXb "alkyl" preferably denotes $C_2H_5$, n-$C_3H_7$, n-$C_4H_9$ or n-$C_5H_{11}$, in particular n-$C_3H_7$.

In formula IXa and IXb "alkyl" preferably denotes $CH_3$ or $C_2H_5$, in particular $CH_3$.

The medium comprises one or more compounds of formulae IX-XII selected from the following subformulae;

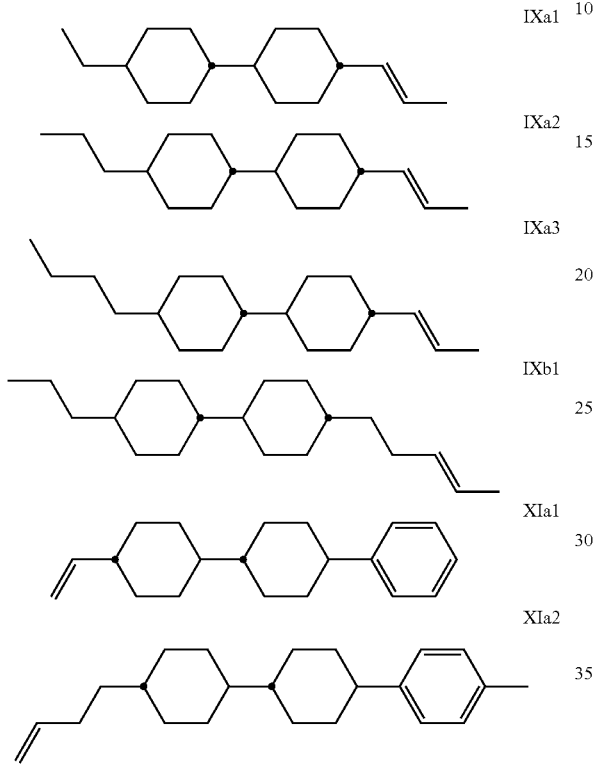

IXa1

IXa2

IXa3

IXb1

XIa1

XIa2

Very preferred are compounds of formula IXa2, IXb1, XIa1 and XIa2.

The medium does not contain any compounds of the following formulae:

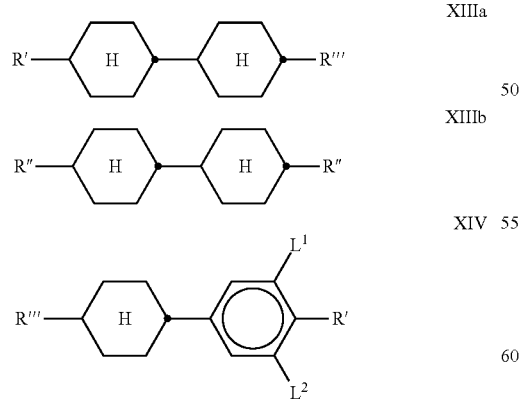

XIIIa

XIIIb

XIV in which $L^1$ and $L^2$ denote independently of one another H or F, R' denotes on each occurrence identically or differently alkyl, or alkoxy with 1 to 12 C atoms, R" denotes on each occurrence identically or differently alkenyl with 2 to 7 C atoms which contains a terminal vinyl group, and R'" denotes R' or R".

The medium additionally comprises one or more compounds selected from the following formula:

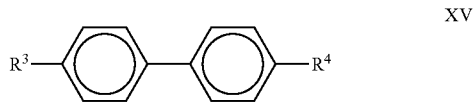

XV in which $R^3$ and $R^4$ each, independently of one another, denote n-alkyl, alkoxy, oxaalkyl, fluoroalkyl or alkenyl, each having up to 6 C atoms, and preferably each, independently of one another, denote alkyl having 1 to 6 C atoms or alkenyl having 2 to 6 C atoms.

The medium comprises one or more compounds of the formula XV selected from the following subformulae:

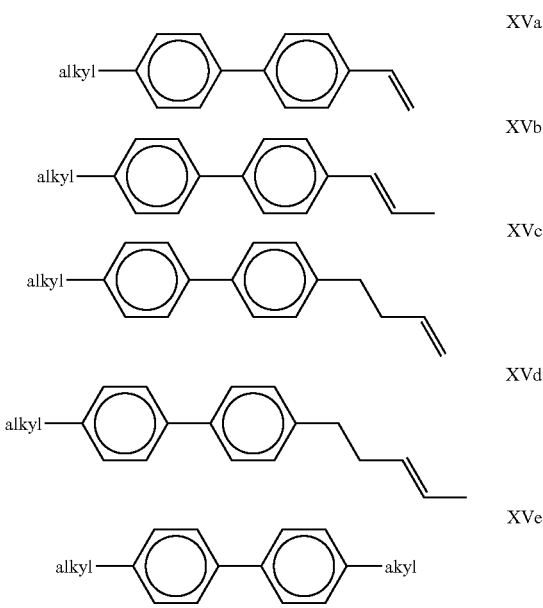

XVa

XVb

XVc

XVd

XVe in which "alkyl" has the meaning indicated above, and preferably denotes methyl, ethyl or propyl.

The medium comprises one or more compounds of the formula XV selected from the following subformulae:

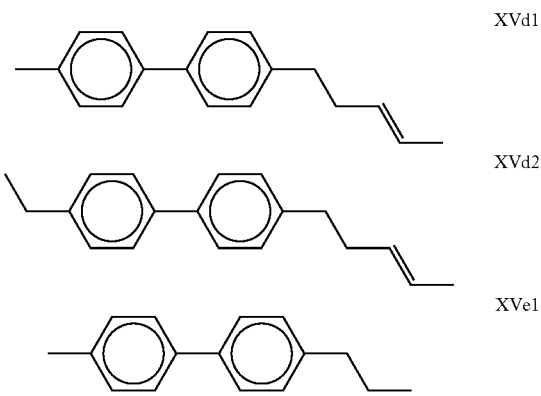

XVd1

XVd2

XVe1

Very preferred are compounds of formula XVd1 and XVe1.

The medium comprises one or more compounds of the formula XVI,

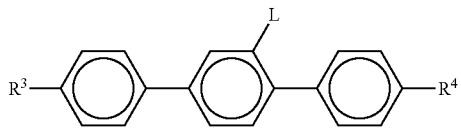

XVI in which L, $R^3$ and $R^4$ have the meanings indicated above and preferably each, independently of one another, denote alkyl having 1 to 6 C atoms.

Particularly preferred compounds of the formula XVI are those of the subformulae

XVIa

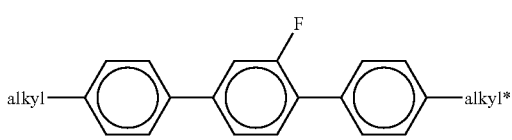

XVIb

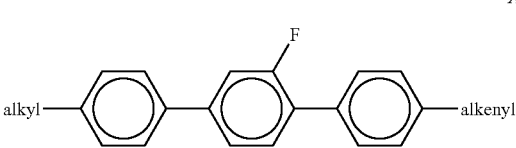

XVIc

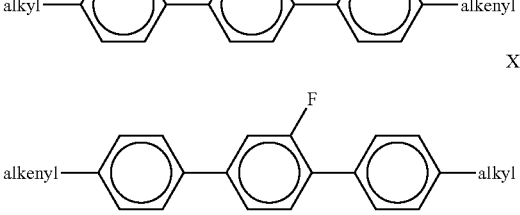

XVId

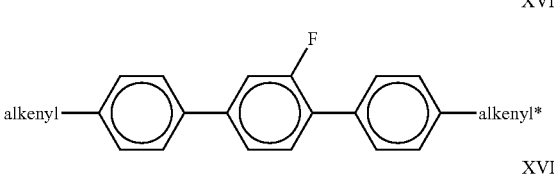

XVIe

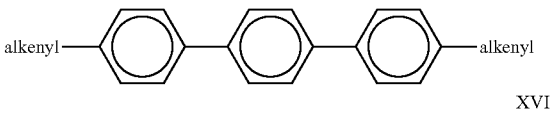

XVIf

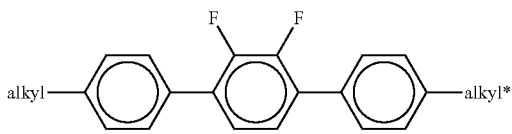

XVIg in which alkyl and alkyl* each, independently of one another, denote a straight-chain alkyl radical having 1-6 C atoms, in particular ethyl, propyl or pentyl, alkenyl and alkenyl* each, independently of one another, denote a straight-chain alkenyl radical having 2-6 C atoms, in particular $CH_2\!=\!CHC_2H_4$, $CH_3CH\!=\!CHC_2H_4$, $CH_2\!=\!CH$ and $CH_3CH\!=\!CH$.

Particular preference is given to the compounds of the formulae XVIb, XVII and XVIg. Very particular preference is given to the compounds of the formulae

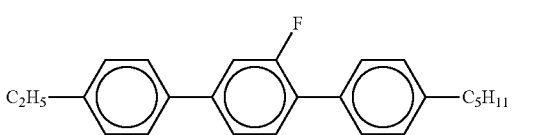

XVIb1

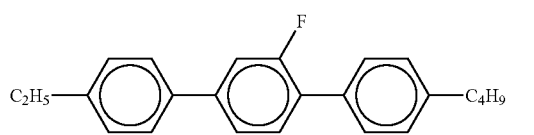

XVIb2

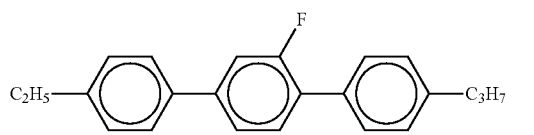

XVIb3

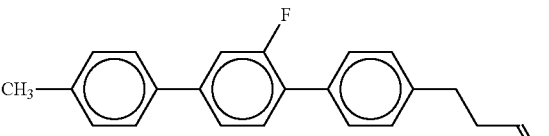

XVIc1

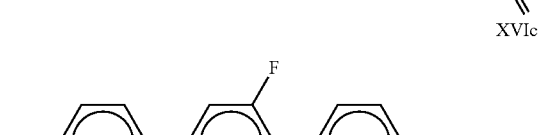

XVIc2

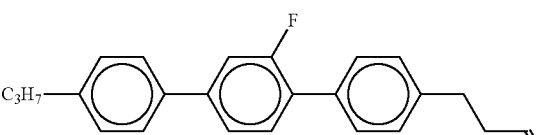

XVIc3

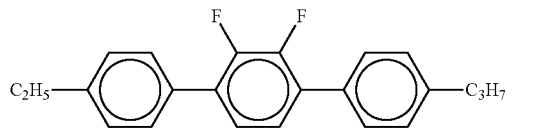

XVIg1

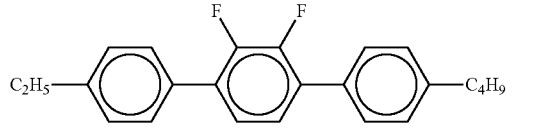

XVIg2

Very preferred are compounds of formula XVIc2, XVIg1 and XVIg2;

The medium comprises one or more compounds of the following formula:

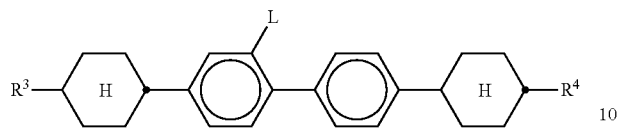

XVII in which $R^3$ and $R^4$ have the meanings indicated above and preferably each, independently of one another, denote alkyl having 1 to 6 C atoms. L denotes H or F;

The medium additionally comprises one or more compounds selected from the following formulae:

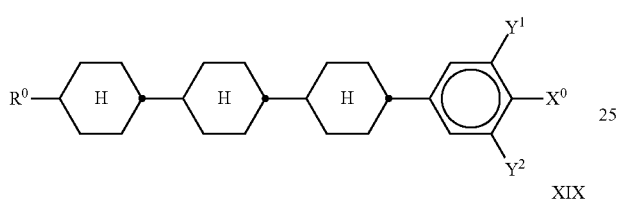

XVIII

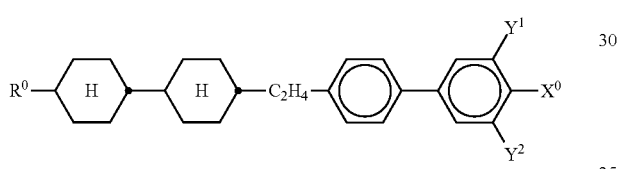

XIX

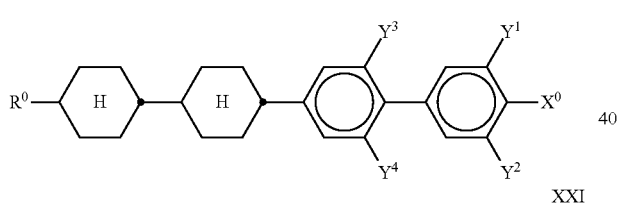

XX

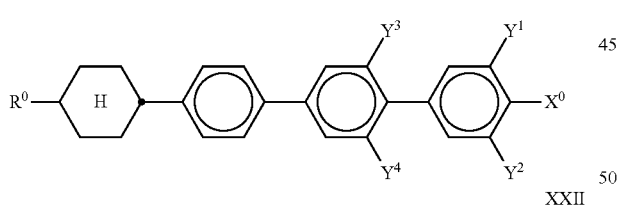

XXI

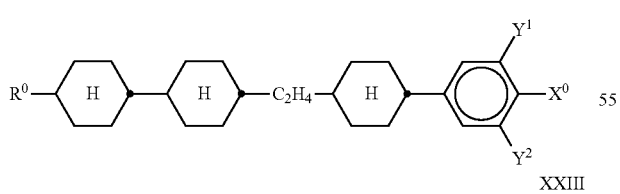

XXII

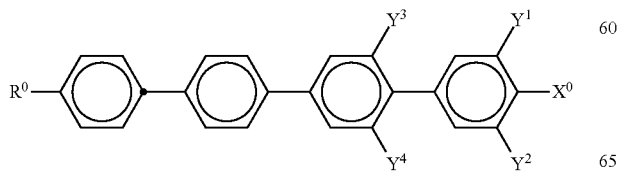

XXIII in which $R^0$ and $X^0$ each, independently of one another, have one of the meanings indicated above, and $Y^{1-4}$ each, independently of one another, denote H or F. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 6 C atoms.

Very preferably the mixture according to the invention comprises one or more compounds of the formula XXIa,

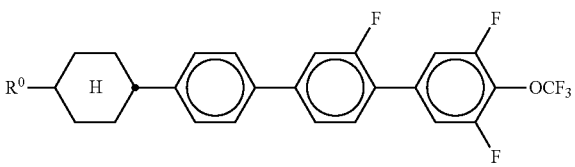

XXIa in which $R^0$ has the meanings indicated above. $R^0$ preferably denotes straight-chain alkyl, in particular ethyl, n-propyl, n-butyl and n-pentyl and very particularly preferably n-propyl. The compound(s) of the formula XXI, in particular of the formula XXIa, is (are) preferably employed in the mixtures according to the invention in amounts of 1-15% by weight, particularly preferably 2-10% by weight.

Further preferably the mixture according to the invention comprises one or more compounds of the formula XXIIIa,

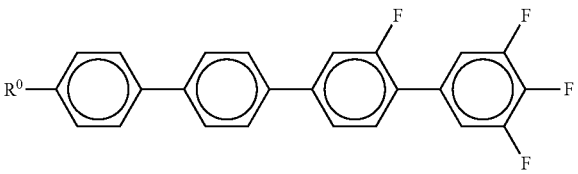

XXIIIa in which $R^0$ has the meanings indicated above. $R^0$ preferably denotes straight-chain alkyl, in particular ethyl, n-propyl, n-butyl and n-pentyl and very particularly preferably n-propyl. The compound(s) of the formula XXIII, in particular of the formula XXIIIa, is (are) preferably employed in the mixtures according to the invention in amounts of 0.5-10% by weight, particularly preferably 0.5-5% by weight.

The medium additionally comprises one or more compounds of the formula XXIV,

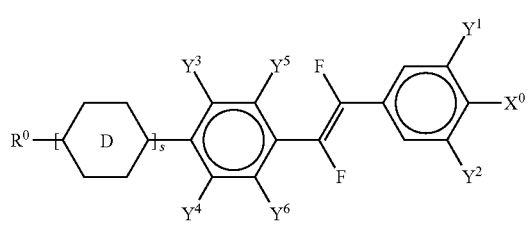

XXIV in which $R^0$, $X^0$ have the meanings indicated in formula I, $Y^{1-6}$ have the meanings indicated in formula III, s denotes 0 or 1, and denotes

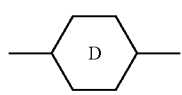

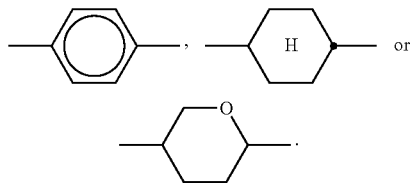

In the formula XXIV, $X^0$ may also denote an alkyl radical having 1-6 C atoms or an alkoxy radical having 1-6 C atoms. The alkyl or alkoxy radical is preferably straight-chain.

$R^0$ preferably denotes alkyl having 1 to 6 C atoms. $X^0$ preferably denotes F, The compounds of the formula XXIV are preferably selected from the following formulae:

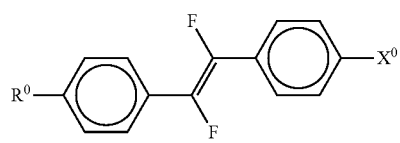
XXIVa

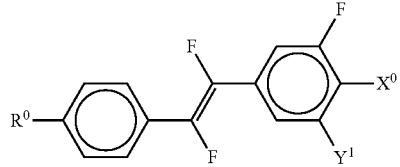
XXIVb

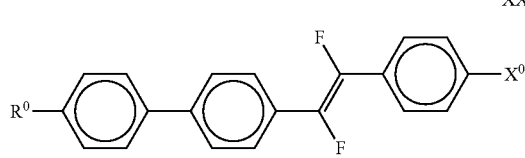
XXIVc

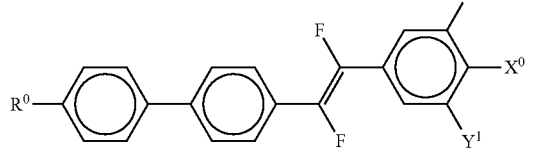
XXIVd

XXIVe

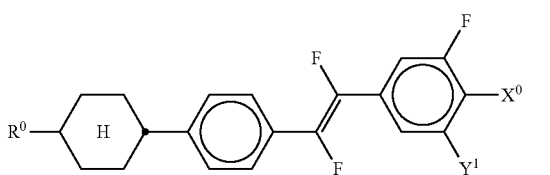
XXIVf

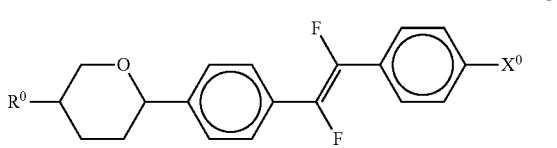
XXIVg

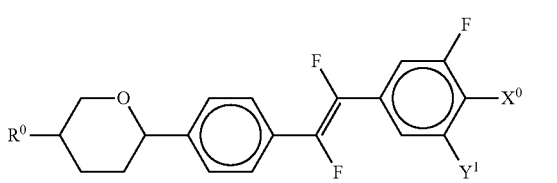
XXIVh in which $R^0$, $X^0$ and $Y^1$ have the meanings indicated above. $R^0$ preferably denotes alkyl having 1 to 6 C atoms. $X^0$ preferably denotes F, and $Y^1$ is preferably F;

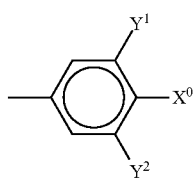

is preferably

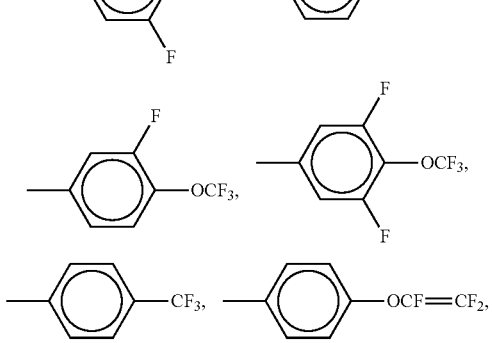

-continued

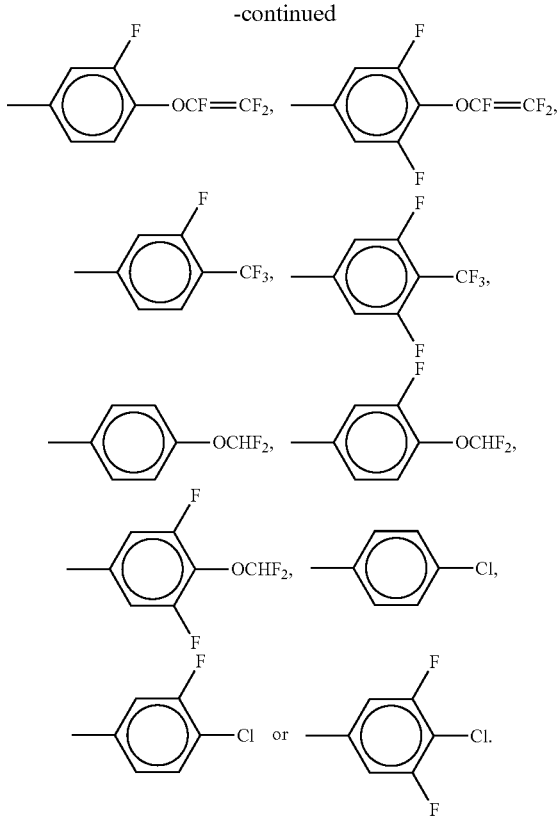

$R^o$ is straight-chain alkyl or alkenyl having 2 to 6 C atoms;
The medium comprises one or more compounds of the following formulae:

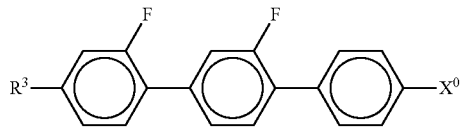
XXV

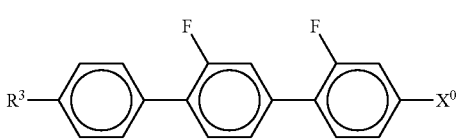
XXVI in which $R^3$ and $X^o$ have the meanings indicated above. $R^3$ preferably denotes alkyl having 1 to 6 C atoms. $X^o$ preferably denotes F or Cl. In the formula XXIV, $X^o$ very particularly preferably denotes Cl.
The medium comprises one or more compounds of the following formulae:

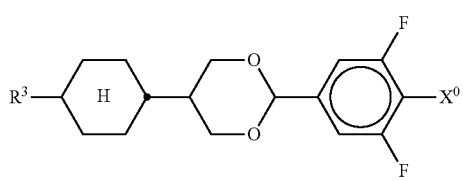
XXVII

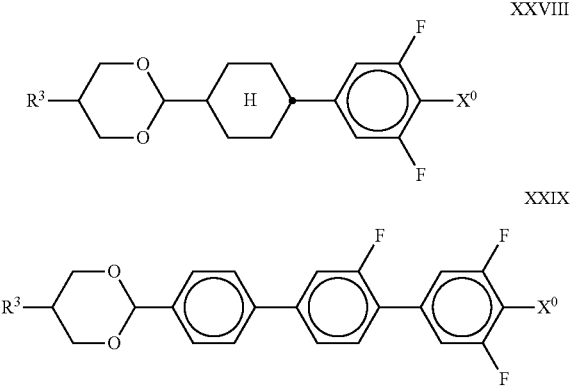

in which $R^3$ and $X^o$ have the meanings indicated above. $R^3$ preferably denotes alkyl having 1 to 6 C atoms. $X^o$ preferably denotes F. The medium according to the invention particularly preferably comprises one or more compounds of the formula XXIX in which $X^o$ preferably denotes F. The compound(s) of the formulae XXVI-XXIX is (are) preferably employed in the mixtures according to the invention in amounts of 1-20% by weight, particularly preferably 1-15% by weight. Particularly preferred mixtures comprise at least one compound of the formula XXIX.

Very preferably the mixture according to the invention comprises one or more compounds of the formula XXIXa, XXIXa

in which $R^3$ has the meanings indicated above, and preferably denotes straight-chain alkyl, in particular ethyl, n-propyl, n-butyl and n-pentyl and very particularly preferably n-propyl. The compound(s) of the formula XXIXa is (are) preferably employed in the mixtures according to the invention in amounts of 1-15% by weight, particularly preferably 2-10% by weight.

The medium comprises one or more compounds of the following formula

XXX in which $R^3$ and $R^4$ have the meanings indicated above, and preferably denote, independently of one another, alkyl having 1 to 6 C atoms, very preferably methyl, ethyl or n-propyl.

Preferred compounds of formula XXX are those of formula XXXa

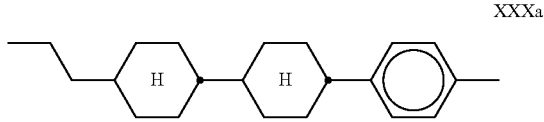

Further preferred LC media are selected from the following preferred embodiments, including any combination thereof:

- The medium comprises one or more compounds of the formula II, preferably selected from formulae II1, II2 and II3, very preferably from formulae II1 and II2. The individual concentration of each of these compounds is preferably from 1 to 15% by weight. The total concentration of these compounds is preferably from 5 to 25% by weight
- The medium comprises one or more compounds of the formula III, preferably selected from formulae III1, III4, III6, III16, III19 and III20, very preferably from formulae III16 and III20. The individual concentration of each of these compounds is preferably from 1 to 15% by weight. The total concentration of these compounds is preferably from 2 to 25% by weight
- The medium comprises one or more compounds of the formula IV, preferably selected from formulae IVa or IVc, very preferably from formula IVa1 or IVc1. The individual concentration of each of these compounds is preferably from 1 to 15% by weight. The total concentration of these compounds is preferably from 5 to 25% by weight.
- The medium comprises one or more compounds of the formula IX, preferably selected from formulae IXa and IXb, very preferably from formulae IXa2 and Xb1. The individual concentration of each of these compounds is preferably from 1 to 15% by weight. The total concentration of these compounds is preferably from 5 to 25% by weight.
- The medium comprises one or more compounds of the formula XI, preferably selected from formulae XIa and XIb. The individual concentration of each of these compounds is preferably from 1 to 20% by weight. The total concentration of these compounds is preferably from 5 to 25% by weight.
- The medium comprises one or more compounds of the formula XII, preferably of formula XIIa. The total concentration of these compounds is preferably from 3 to 20% by weight.
- The medium comprises one or more compounds of the formula XV, preferably selected from formulae formulae XVd and XVe, very preferably from formulae XVd1 and XVe1. The individual concentration of each of these compounds is preferably from 1 to 10% by weight. The total concentration of these compounds is preferably from 2 to 15% by weight.
- The medium comprises one or more compounds of the formula XVII, preferably of formula XVIc2. The concentration of these compounds is preferably from 1 to 15% by weight.
- The medium comprises one or more compounds of the formula XVIg, preferably of the formula XVIg1 and/or XVIg2. The concentration of these compounds is preferably from 5 to 25% by weight.
- The medium comprises one or more compounds of the formula XVIIa or XVIIb. The concentration of these compounds is preferably from 0.5 to 5% by weight.
- The medium comprises one or more compounds of the formula XXI, preferably of the formula XXIa. The concentration of these compounds is preferably from 0.5 to 8% by weight.
- The medium comprises one or more compounds of the formula XXIII, preferably of the formula XXIIIa. The concentration of these compounds is preferably from 0.5 to 5% by weight.
- The medium comprises one or more compounds of the formula XXIX, preferably of the formula XXIXa. The concentration of these compounds is preferably from 2 to 10% by weight.
- The medium comprises one or more compounds of the formula XXX, preferably of the formula XXXa. The concentration of these compounds is preferably from 2 to 10% by weight.
- The medium comprises one or more compounds of formula I and one or more compounds selected from the group consisting of the formulae II, III, IV, IX, XI, XII, XV, XVI, XXI, XXIX and XXX.
- The medium comprises one or more compounds of formula I and one or more compounds selected from the group consisting of the formulae II1, II2, II3, III1, III4, III6, III16, III19, III20, IVa, IVc, IXa, IXb, XIa, XIb, XIIa, XVd, XVe, XVIc, XXIa, XXIXa and XXXa.
- The proportion of compounds of the formulae II, III, IV, IX, XI, XII, XV, XVI, XXI, XXIX and XXX in the mixture as a whole is 90 to 99% by weight.
- The proportion of compounds of the formulae II1, II2, II3, III1, III4, III6, III16, III9, III20, IVa, IVc, IXa, IXb, XIa, XIb, XIIa, XVd, XVe, XVIc, XXIa, XXIXa and XXXa in the mixture as a whole is 90 to 99% by weight.

The term "alkyl" or "alkyl*" in this application encompasses straight-chain and branched alkyl groups having 1-6 carbon atoms, in particular the straight-chain groups methyl, ethyl, propyl, butyl, pentyl and hexyl. Groups having 2-5 carbon atoms are generally preferred.

The term "alkenyl" or "alkenyl*" encompasses straight-chain and branched alkenyl groups having 2-6 carbon atoms, in particular the straight-chain groups. Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2$=CH, $CH_3CH$=CH.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high Δε values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the LC media according to the invention is not crucial. The mixtures can therefore comprise one or more further components for the purposes of optimisation of various properties. However, the observed effect on the desired improvement in the properties of the medium is generally greater, the higher the total concentration of compounds of the above-mentioned formulae.

In a particularly preferred embodiment, the LC media according to the invention comprise compounds of the formulae IV to VIII (preferably IV and V) in which $X^0$ denotes F, OCF$_3$, OCHF$_2$, OCH=CF$_2$, OCF=CF$_2$ or OCF$_2$—CF$_2$H. A favourable synergistic action with the compounds of the formulae IA, IIA, IB and IIB results in particularly advantageous properties. In particular, mixtures comprising compounds of the formulae IA or IIA and IB or IIB are distinguished by their low threshold voltage.

The individual compounds of the above-mentioned formulae and the subformulae thereof which can be used in the LC media according to the invention are either known or can be prepared analogously to the known compounds.

In another preferred embodiment of the present invention the LC medium additionally comprises one or more polymerisable compounds. The polymerisable compounds are preferably selected from formula M $$R^a-B^1—(Z^b-B^2)_m—R^b \qquad M$$

in which the individual radicals, on each occurrence identically or differently, and each, independently of one another, have the following meaning:

$R^a$ and Rb P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if B$^1$ and/or B$^2$ contain a saturated C atom, $R^a$ and/or Rb may also denote a radical which is spiro-linked to this saturated C atom, wherein at least one of the radicals $R^a$ and Rb denotes or contains a group P or P-Sp-, P a polymerisable group, Sp a spacer group or a single bond, B$^1$ and B$^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, R$^0$ and R$^{00}$ each, independently of one another, denote H or alkyl having 1 to 12 C atoms, m denotes 0, 1, 2, 3 or 4, n1 denotes 1, 2, 3 or 4, L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I are those in which B$^1$ and B$^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by 0 and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which B$^1$ and B$^2$ each, independently of one another, denote 1,4-phenylene, 1,3-phenylene, naphthalene-1,4-diyl or naphthalene-2,6-diyl, Very preferred compounds of formula M are selected from the following formulae:

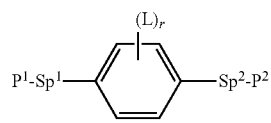

M1

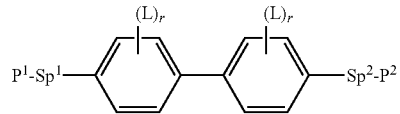

M2

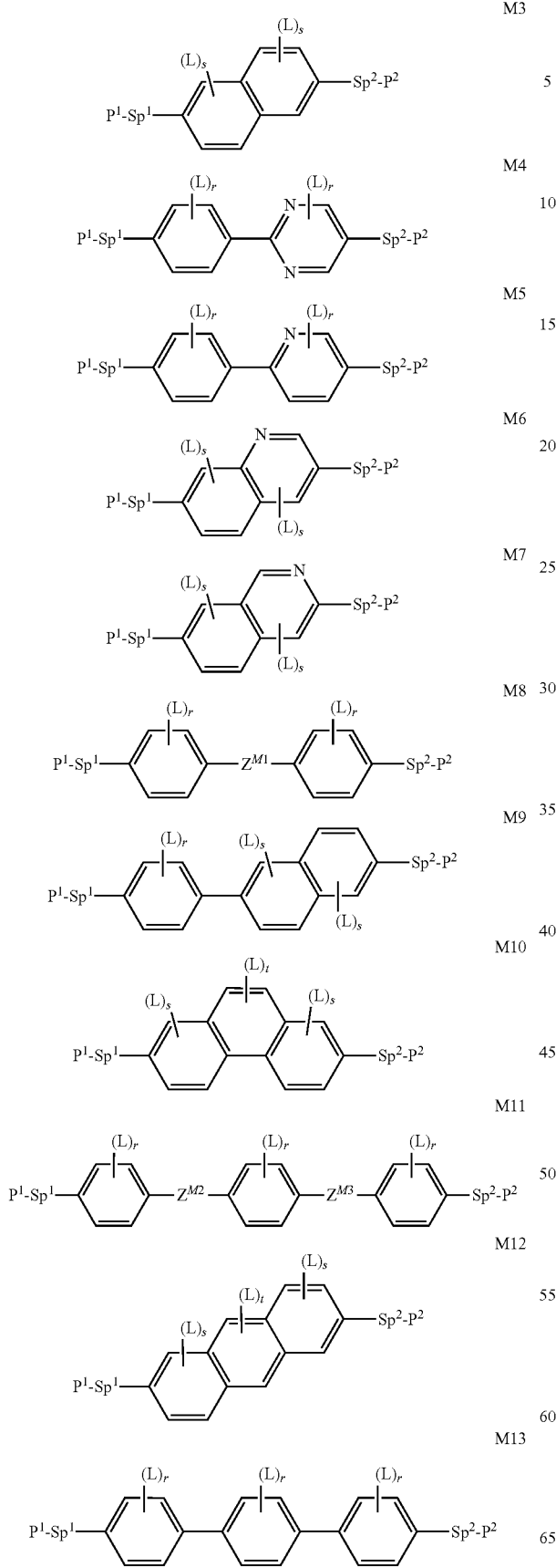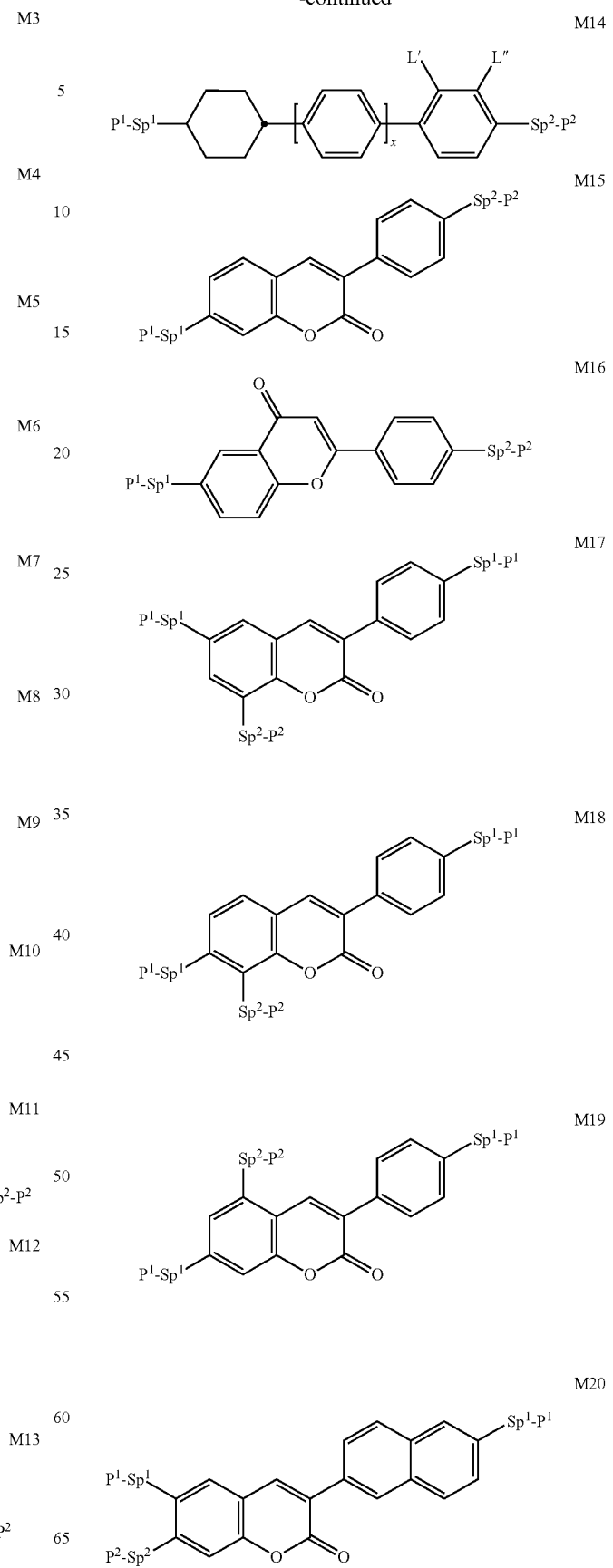

M21 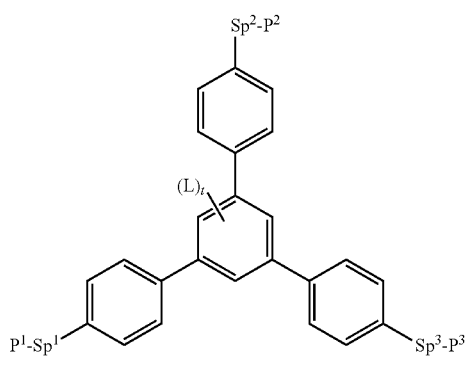

M22 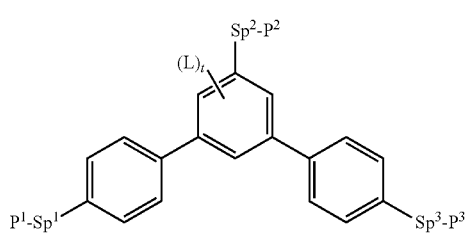

M23 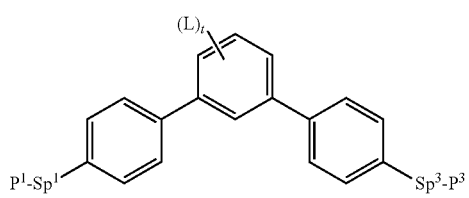

M24 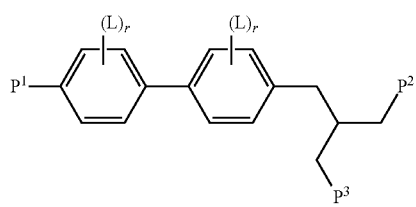

M25 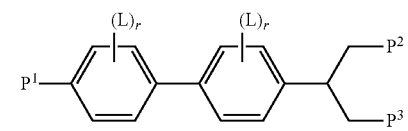

M26 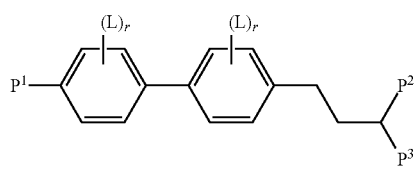

M27 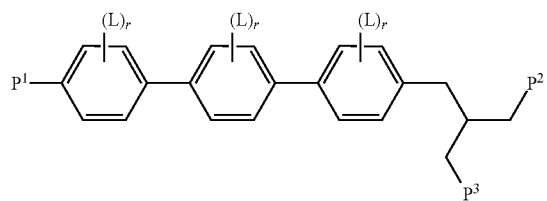

M28 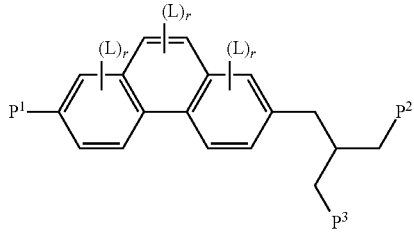

M29 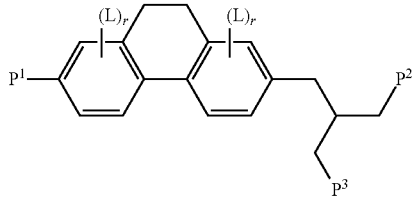

M30 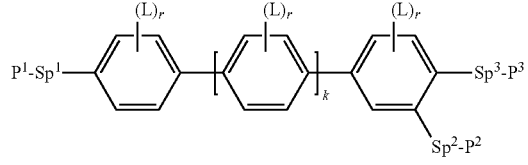

M31 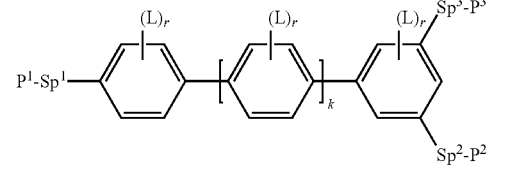

M32 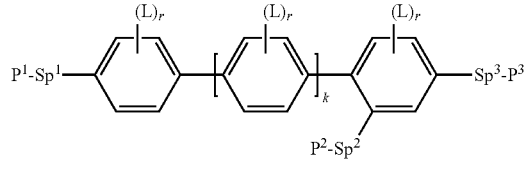

in which the individual radicals, on each occurrence identically or differently, and each, independently of one another, have the following meaning:

$P^1$, $P^2$, $P^3$ a polymerisable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$—$Sp^1$-, $P^1$—$Sp^2$- and $P^3$—$Sp^3$- may denote $R^{aa}$, with the proviso that at least one of the radicals $P^1$—$Sp^1$-, $P^2$—$Sp^2$ and $P^3$—$Sp^3$- present is different from $R^{aa}$, preferably —(CH$_2$)$_{p1}$—, —(CH$_2$)$_{p1}$—O—, —(CH$_2$)$_{p1}$—CO—O— or —(CH$_2$)$_{p1}$—O—CO—O— bedeuten, wherein p1 is an integer from 1 to 12, $R^{aa}$ H, F, Cl, CN or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$—$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^{M1}$ —O—, —CO—, —C($R^yR^z$)— or —$CF_2CF_2$—, $Z^{M2}$, $Z^{M3}$ —CO—O—, —O—CO—, —$CH_2$O—, —$OCH_2$—, —$CF_2$O—, —$OCF_2$— or —$(CH_2)_n$—, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Especially preferred are compounds of formulae M2 and M13.

Further preferred are trireactive compounds M15 to M31, in particular M17, M18, M19, M22, M23, M24, M25, M30, M31 and M32.

In the compounds of formulae M1 to M32 the group

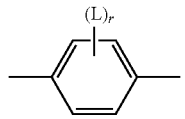

is preferably

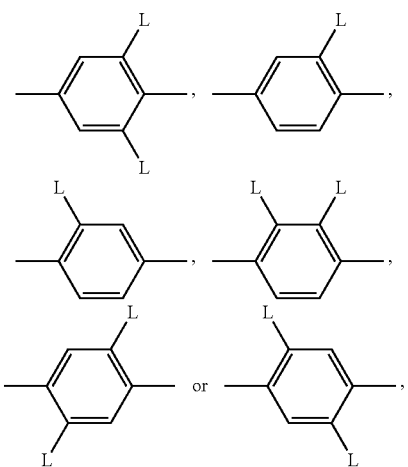

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Preferred compounds of formulae M1 to M32 are those wherein $P^1$, $P^2$ and $P^3$ denote an acrylate, methacrylate, oxetane or epoxy group, very preferably an acrylate or methacrylate group.

Further preferred compounds of formulae M1 to M32 are those wherein $Sp^1$, $Sp^2$ and $Sp^3$ are a single bond.

Further preferred compounds of formulae M1 to M32 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M32 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O—, —O—CO—O— or a single bond.

Further preferred polymerisable compounds of formulae M1 to M32 are those selected from Table D below.

Particular preference is given to LC media comprising one, two or three polymerisable compounds of formula M, preferably selected from formulae M1 to M32.

Preferably the proportion of polymerisable compounds, including those of formula M and its subformulae, in the LC medium is from 0.01 to 5%, very preferably from 0.05 to 1%, most preferably from 0.1 to 0.5%.

It was observed that the addition of one or more polymerisable compounds of formula M to the LC medium leads to advantageous properties like fast response times. Such an LC medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerisable compounds it is possible to increase the absorption of the LC medium at longer UV wavelengths, so that it is possible to use such longer UV wavelengths for polymerisation, which is advantageous for the display manufacturing process.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—,

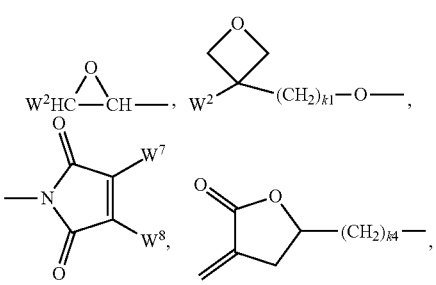

$CH_2$=$CW^2$—(O)$_{k3}$—, $CW^1$=CH—CO—(O)$_{k3}$—, $CW^1$=CH—CO—NH—, $CH_2$=$CW^1$—CO—NH—,

CH₃—CH=CH—O—, (CH₂=CH)₂CH—OCO—, (CH₂=CH—CH₂)₂CH—OCO—, (CH₂=CH)₂CH—O—, (CH₂=CH—CH₂)₂N—, (CH₂=CH—CH₂)₂N—CO—, HO—CW²W³—, HS—CW²W³—, HW²N—, HO—CW²W³—NH—, CH₂=CW¹—CO—NH—, CH₂=CH—(COO)$_{k1}$-Phe-(O)$_{k2}$—, CH₂=CH—(CO)$_{k1}$-Phe—(O)$_{k2}$—, Phe-CH=CH—, HOOC—, OCN— and W⁴W⁵W⁶Si—, in which W¹ denotes H, F, Cl, CN, CF₃, phenyl or alkyl having 1 to 5 C atoms, in particular H, F, Cl or CH₃, W² and W³ each, independently of one another, denote H or alkyl having 1 to 5 C atoms, in particular H, methyl, ethyl or n-propyl, W⁴, W⁵ and W⁶ each, independently of one another, denote Cl, oxaalkyl or oxacarbonylalkyl having 1 to 5 C atoms, W⁷ and W⁸ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of CH₂=CW¹—CO—O—, CH₂=CW¹—CO—,

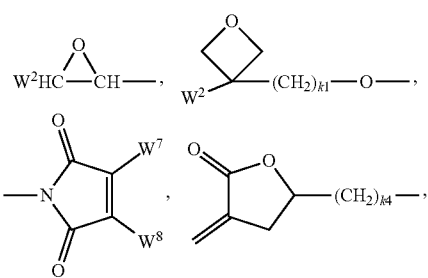

CH₂=CW²—O—, CH₂=CW²—, CW¹=CH—CO—(O)$_{k3}$—, CW¹=CH—CO—NH—, CH₂=CW¹—CO—NH—, (CH₂=CH)₂CH—OCO—, (CH₂=CH—CH₂)₂CH—OCO—, (CH₂=CH)₂CH—O—, (CH₂=CH—CH₂)₂N—, (CH₂=CH—CH₂)₂N—CO—, CH₂=CW¹—CO—NH—, CH₂=CH—(COO)$_{k1}$-Phe—(O)$_{k2}$—, CH₂=CH—(CO)$_{k1}$-Phe—(O)$_{k2}$—, Phe-CH=CH— and W⁴W⁵W⁶Si—, in which W¹ denotes H, F, Cl, CN, CF₃, phenyl or alkyl having 1 to 5 C atoms, in particular H, F, Cl or CH₃, W² and W³ each, independently of one another, denote H or alkyl having 1 to 5 C atoms, in particular H, methyl, ethyl or n-propyl, W⁴, W⁵ and W⁶ each, independently of one another, denote Cl, oxaalkyl or oxacarbonylalkyl having 1 to 5 C atoms, W⁷ and W⁸ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of CH₂=CW¹—CO—O—, in particular CH₂=CH—CO—O—, CH₂=C(CH₃)—CO—O— and CH₂=CF—CO—O—, furthermore CH₂=CH—O—, (CH₂=CH)₂CH—O—CO—, (CH₂=CH)₂CH—O—,

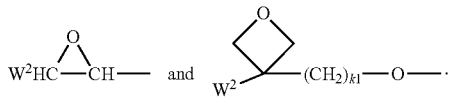

Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent CH₂ groups may each be replaced, independently of one another, by —O—, —S—, —NH—, —N(R⁰)—, —Si(R⁰R⁰⁰)—, —CO—, —CO—O—, —O—CO—, —O—CO—O—, —S—CO—, —CO—S—, —N(R⁰⁰)—CO—O—, —O—CO—N(R⁰)—, —N(R⁰)—CO—N(R⁰⁰)—, —CH=CH— or —C≡C— in such a way that O and/or S atoms are not linked directly to one another, X" denotes —O—, —S—, —CO—, —CO—O—, —O—CO—, —O—CO—O—, —CO—N(R⁰)—, —N(R⁰)—CO—, —N(R⁰)—CO—N(R⁰⁰)—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH=N—, —N=CH—, —N=N—, —CH=CR⁰—, —CY²=CY³—, —C≡C—, —CH=CH—CO—O—, —O—CO—CH=CH— or a single bond, R⁰ and R⁰⁰ each, independently of one another, denote H or alkyl having 1 to 20 C atoms, and Y² and Y³ each, independently of one another, denote H, F, Cl or CN.

X" is preferably —O—, —S—, —CO—, —COO—, —OCO—, —O—COO—, —CO—NR⁰—, —NR⁰—CO—, —NR⁰—CO—NR⁰⁰— or a single bond.

Typical spacer groups Sp and -Sp"-X"— are, for example, —(CH₂)$_{p1}$—, —(CH₂CH₂O)$_{q1}$—CH₂CH₂—, —CH₂CH₂—S—CH₂CH₂—, —CH₂CH₂—NH—CH₂CH₂— or —(SiR⁰R⁰⁰—O)$_{p1}$—, in which P¹ is an integer from 1 to 12, q1 is an integer from 1 to 3, and R⁰ and R⁰⁰ have the meanings indicated above.

Particularly preferred groups Sp and -Sp"-X"— are —(CH₂)$_{p1}$—, —(CH₂)$_{p1}$—O—, —(CH₂)$_{p1}$—O—CO—, —(CH₂)$_{p1}$—CO—O—, —(CH₂)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the LC media according to the invention at the same time as constantly high clearing points and high VHR values.

The use of LC media containing polymerisable compounds allows the rapid establishment of a particularly low pretilt angle in PSA displays. In particular, the LC media exhibit significantly shortened response times, in particular also the grey-shade response times, in PSA displays compared with the media from the prior art.

Preference is generally given to LC media which have a nematic LC phase, and preferably have no chiral liquid crystal phase.

The invention also relates to the use of an LC medium according to the present invention as described above and below for electro-optical purposes, in particular for the use is in shutter glasses, for 3D applications, in IPS, PS-IPS, FFS, PS-FFS, HB-FFS, U-IPS, TN, PS-TN, STN or TN-TFT displays, and to electro-optical displays, in particular of the aforementioned types, containing an LC medium according to the present invention as described above and below, in particular an IPS, PS-IPS, FFS, PS-FFS, HB-FFS, U-IPS, TN, PS-TN, STN or TN-TFT display.

The invention also relates to electro-optical displays, such as, for example, STN or MLC displays, having two plane-parallel outer plates, which, together with a frame, form a cell, integrated non-linear elements for switching individual pixels on the outer plates, and a nematic LC mixture having positive dielectric anisotropy and high specific resistance located in the cell, wherein the a nematic LC mixture is an LC medium according to the present invention as described above and below.

The LC media according to the invention enable a significant broadening of the available parameter latitude. The achievable combinations of clearing point, viscosity at low temperature, thermal and UV stability and high optical anisotropy are far superior to previous materials from the prior art.

The LC media according to the invention are suitable for mobile applications and TFT applications, such as, for example, mobile telephones and PDAs. Furthermore, the LC media according to the invention are particularly suitably for use in FFS and IPS displays.

The LC media according to the invention preferably retain the nematic phase down to −20° C. very preferably down to −30° C., most preferably down to −40° C. The LC media according to the invention preferably have a clearing point 85° C., very preferably ≥95° C., most preferably ≥105° C.

The LC media according to the invention preferably have a rotational viscosity $\gamma_1$ of 130 mPa·s, very preferably 115 mPa·s, enabling excellent MLC displays having fast response times to be achieved. The rotational viscosities are determined at 20° C.

In a preferred embodiment, the dielectric anisotropy $\Delta\varepsilon$ of the LC media according to the invention at 20° C. is preferably ≥+4, very preferably ≥+6, most preferably ≥+8.

The birefringence $\Delta n$ of the LC media according to the invention at 20° C. is preferably in the range of from 0.080 to 0.150, more preferably from 0.090 to 0.140, particularly preferably 0.100 to 0.130.

The nematic phase range of the LC media according to the invention preferably has a width of at least 100°, more preferably of at least 110° C., in particular at least 130°. This range preferably extends at least from −25° to +105° C.

It goes without saying that, through a suitable choice of the components of the LC media according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain LC media having a higher $\Delta\varepsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of LC media comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that LC media according to the invention comprising compounds of the formulae ST-1, ST-2, RV, IA and IB exhibit a significantly smaller decrease in the HR on UV exposure than analogous mixtures comprising cyano-phenylcyclohexanes of the formula

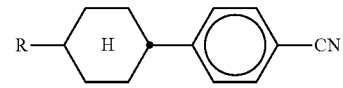

or esters of the formula

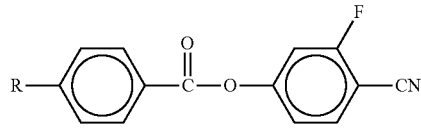

instead of the compounds of the formulae I ST-1, ST-2, RV, IA and IB.

The light stability and UV stability of the LC media according to the invention are considerably better, i.e. they exhibit a significantly smaller decrease in the HR on exposure to light, heat or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the LC parameters of the LC layer.

The LC media which can be used in accordance with the invention are prepared in a manner conventional per se, for example by mixing one or more compounds of claim 1 with one or more compounds of the formulae IV-XXX or with further LC compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC media may also comprise further additives known to the person skilled in the art and described in the literature, such as, for example, polymerisation initiators, inhibitors, surface-active substances, light stabilisers, antioxidants, e.g. BHT, TEMPOL, microparticles, free-radical scavengers, nanoparticles, etc. For example, 0-15% of pleochroic dyes or chiral dopants or initiators like Irgacure651® or Irgacure907® can be added. Suitable stabilisers and dopants are mentioned below in Tables C and D.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

In another preferred embodiment of the present invention the LC media contain one or more further stabilisers, preferably selected from the group consisting of the following formulae wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, $CH_3$, OH or O•, $A^S$ straight-chain, branched or cyclic alkylene with 1 to 20 C atoms which is optionally substituted, n an integer from 1 to 6, preferably 3.

Preferred stabilisers of formula S3 are selected from formula S3A

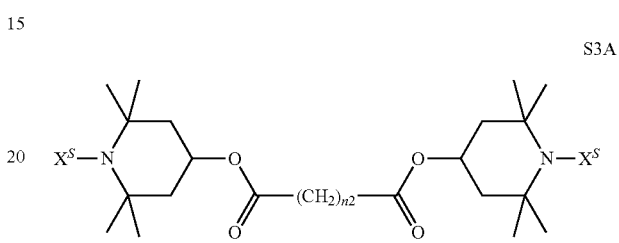

wherein n2 is an integer from 1 to 12, and wherein one or more H atoms in the group $(CH_2)_n2$ are optionally replaced by methyl, ethyl, propyl, butyl, pentyl or hexyl.

Very preferred stabilisers are selected from the group consisting of the following formulae

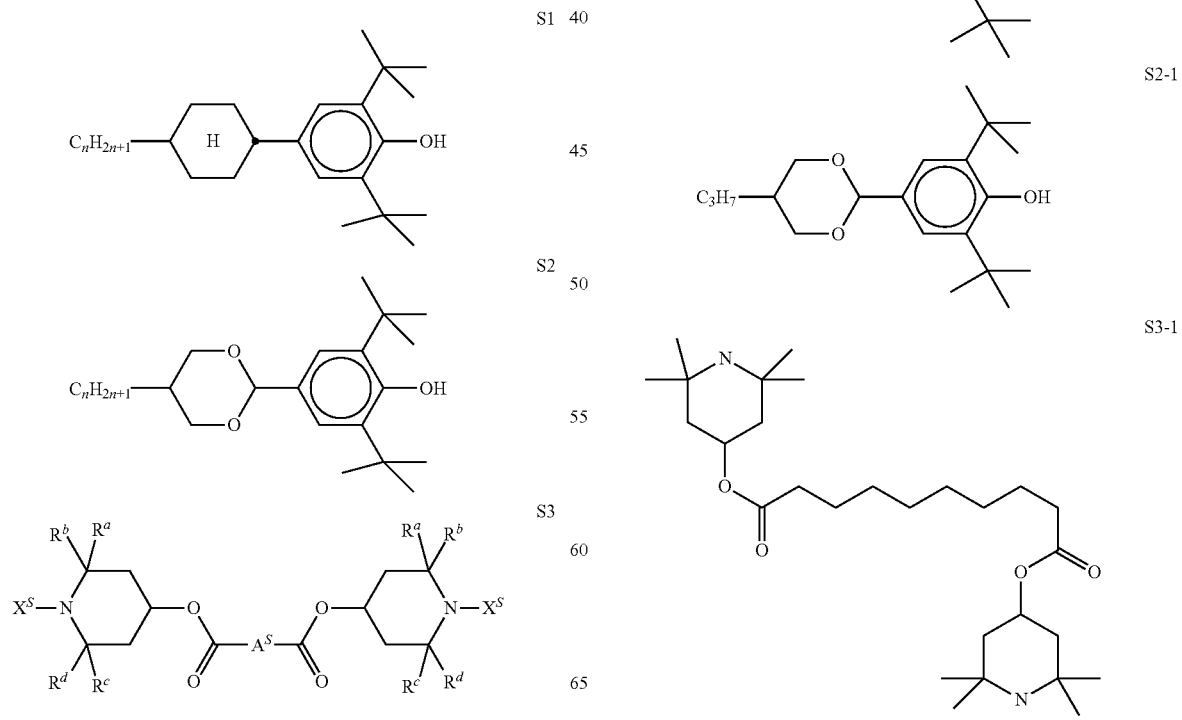

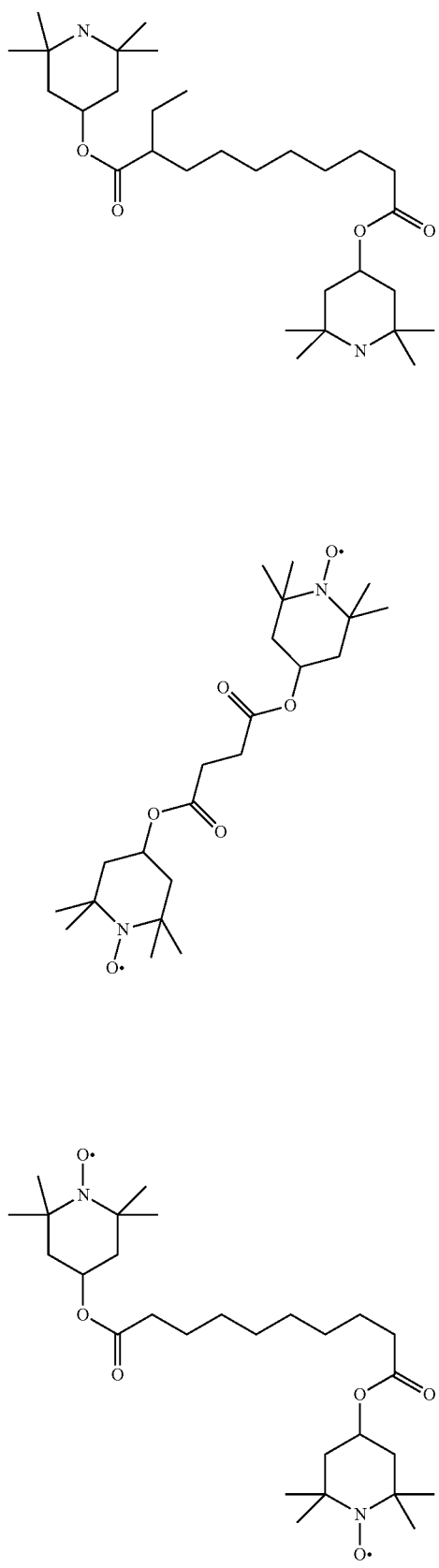
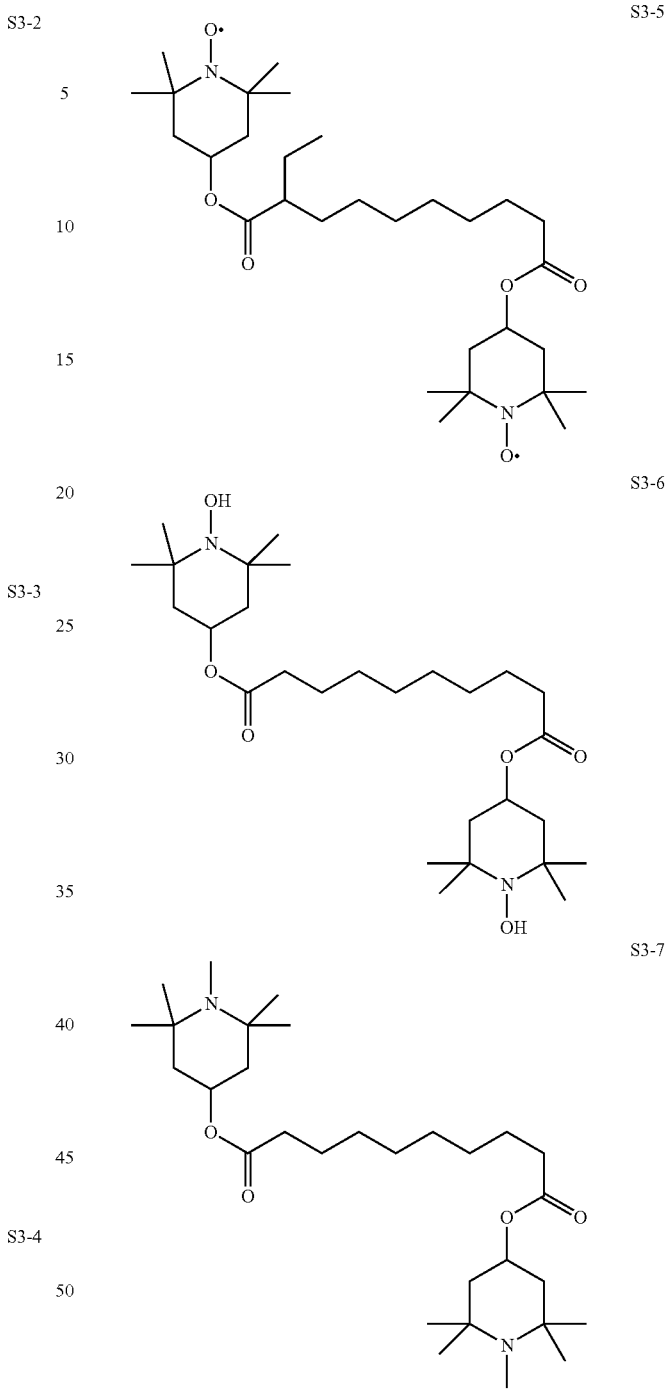

In a preferred embodiment the LC medium comprises one or more stabilisers selected from the group consisting of formulae S1-1, S2-1, S3-1, S3-1 and S3-3.

In a preferred embodiment the LC medium comprises one or more stabilisers selected from Table D.

Preferably the proportion of stabilisers, like those of formula S1-S3, in the LC medium is from 10 to 500 ppm, very preferably from 20 to 100 ppm.

In another preferred embodiment the LC medium according to the present invention contains a self-aligning (SA) additive, preferably in a concentration of 0.1 to 2.5%.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerisable groups which are attached, optionally via spacer groups, to the mesogenic group. These polymerisable SA additives can be polymerised in the LC medium under similar conditions as applied for the RMs in the PSA process.

Suitable SA additives are disclosed for example in US 2013/0182202 A1, US 2014/0838581 A1, US 2015/0166890 A1 and US 2015/0252265 A1.

In another preferred embodiment an LC medium or a polymer stabilised display according to the present invention contains one or more self-aligning additives selected from Table E below.

In a preferred embodiment the display according to the present invention does not contain an alignment layer.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

In the present application and in the examples below, the structures of the LC compounds are indicated by means of acronyms, the transformation into chemical formulae taking place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.

TABLE A

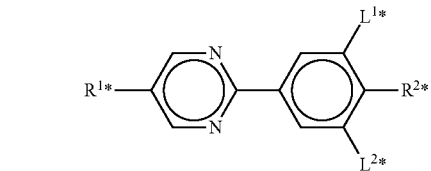

PYP

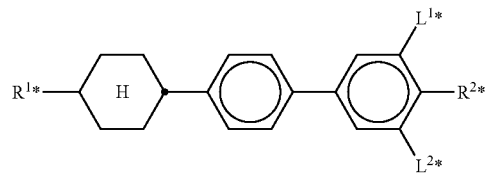

BCH, CPP

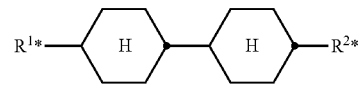

CCH, CC

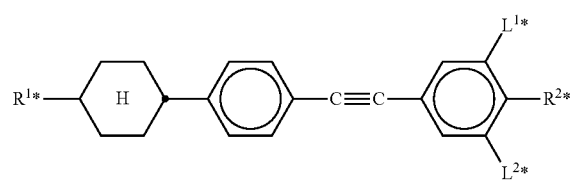

TABLE A-continued
CPTP
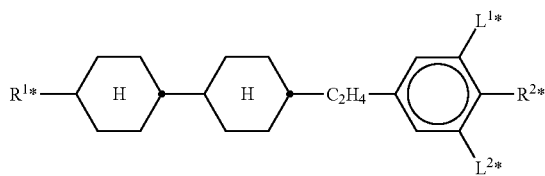
ECCP
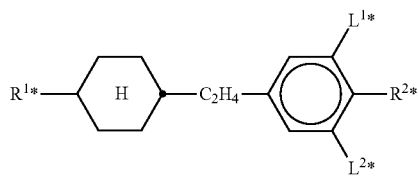
EPCH
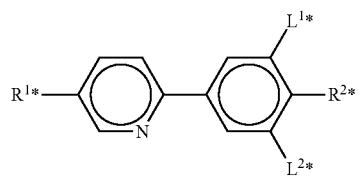
PYRP
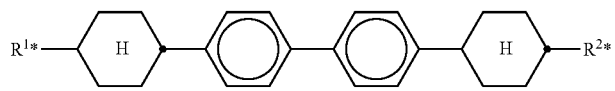
CBC
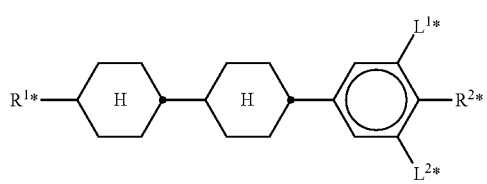
CCP
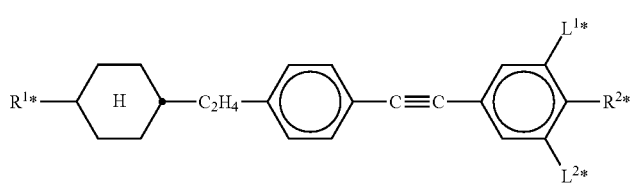
CEPTP
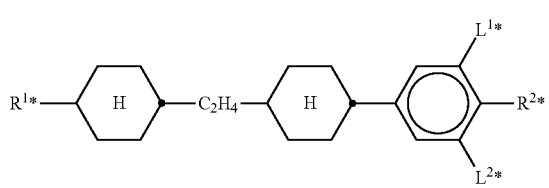
CECP TABLE A-continued
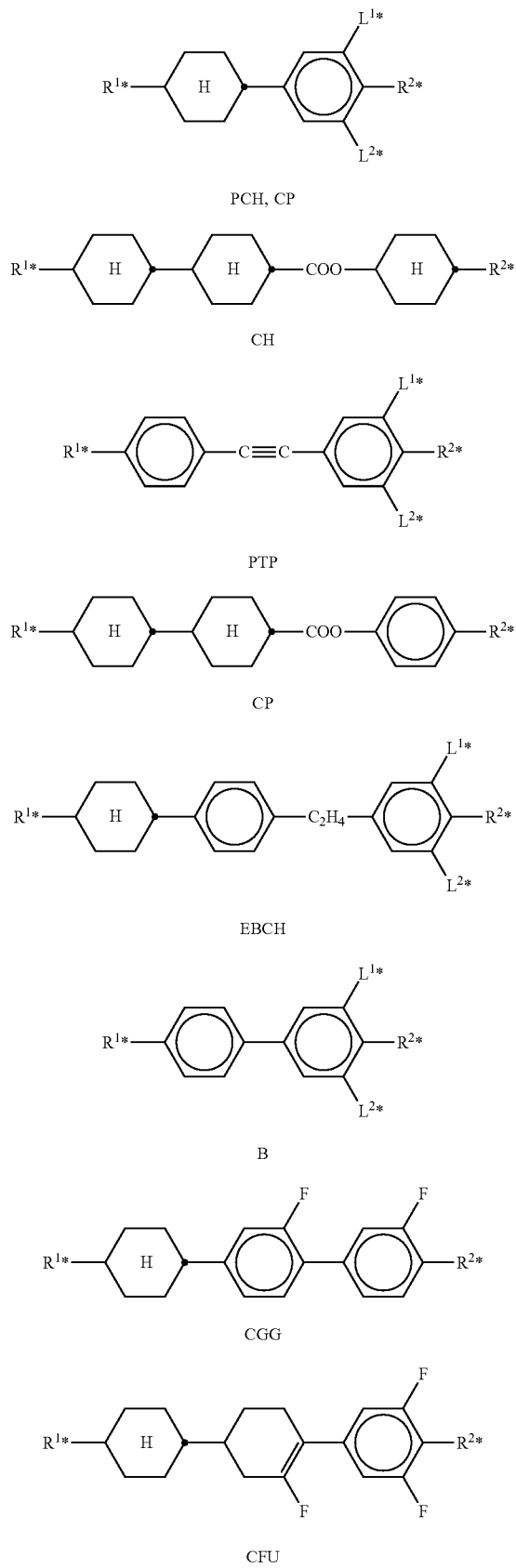
PCH, CP
CH
PTP
CP
EBCH
B
CGG
CFU TABLE A-continued
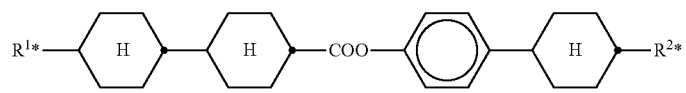
CCPC
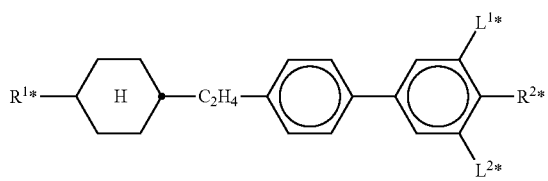
BECH
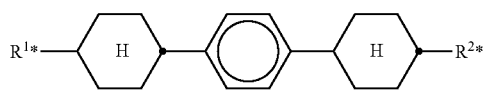
CPC
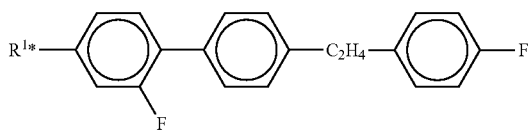
FET-nF
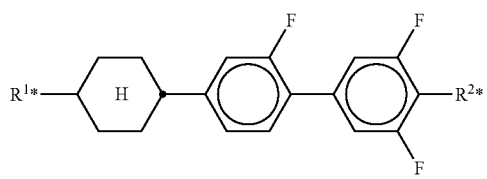
CGU
TABLE B
In the following formulae, n and m each, independently of one another, denote 0, 1, 2, 3, 4, 5, 6, 7, 8, 9, 10, 11 or 12, in particular 2, 3, 5, furthermore 0, 4, 6.
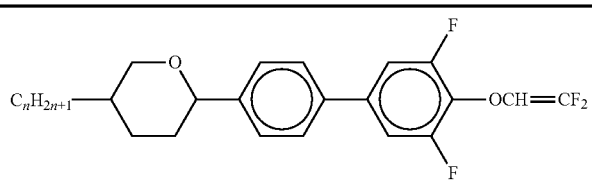
APU-n-OXF
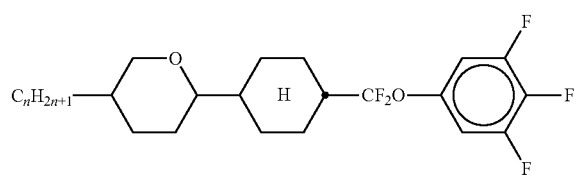
ACQU-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
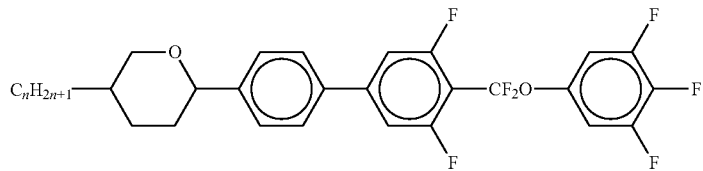
APUQU-n-F
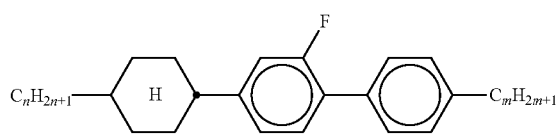
BCH-n.Fm
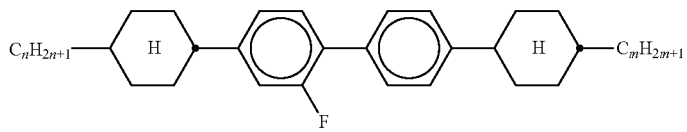
CBC-nmF
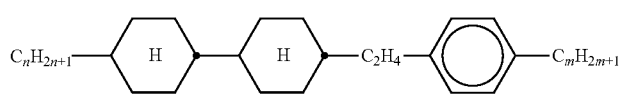
ECCP-nm
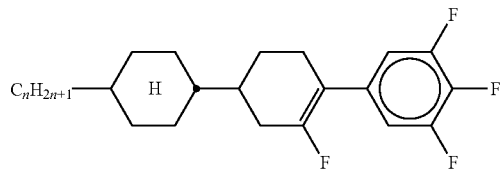
CFU-n-F
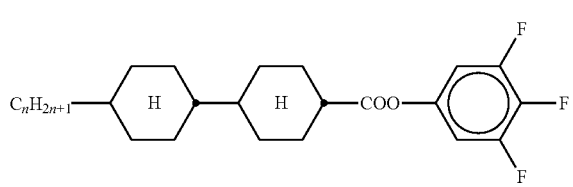
CCZU-n-F
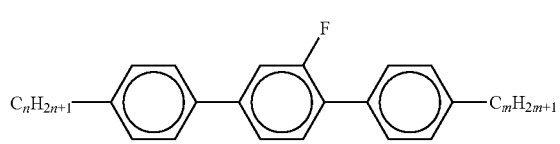
PGP-n-m
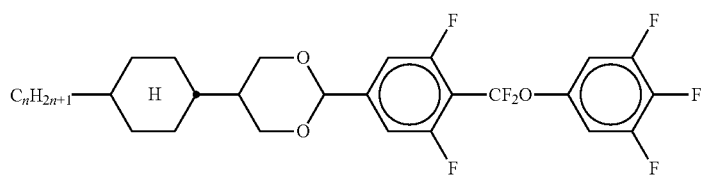
CDUQU-n-F TABLE B-continued
In the following formulae, n and m each, independently of one another, denote
0, 1, 2, 3, 4, 5, 6, 7, 8, 9, 10, 11 or 12, in particular 2, 3, 5, furthermore 0, 4, 6.
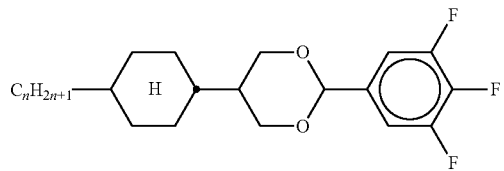
CDU-n-F
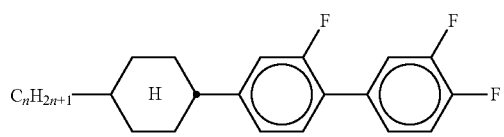
CGG-n-F
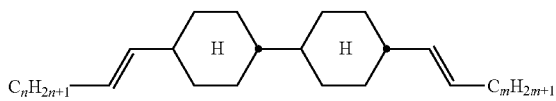
CC-nV-Vm
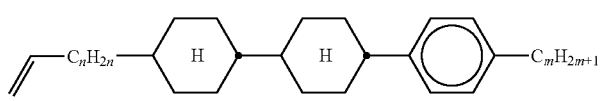
CCP-Vn-m
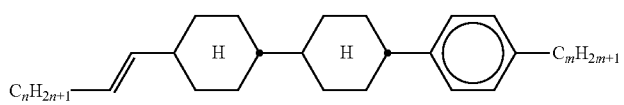
CCP-nV-m
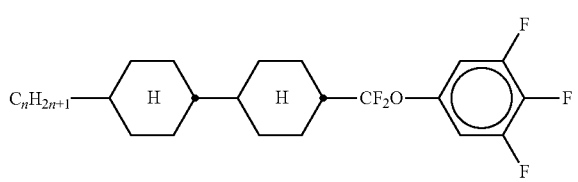
CCQU-n-F
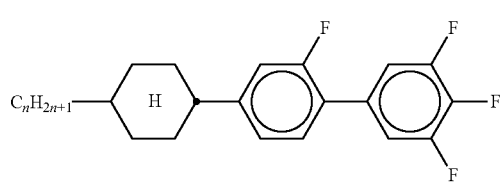
CGU-n-F
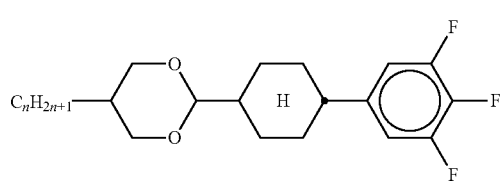
DCU-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
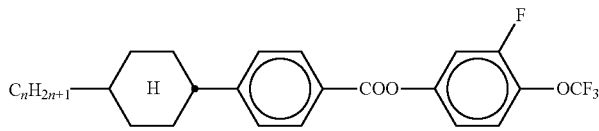
CPZG-n-OT
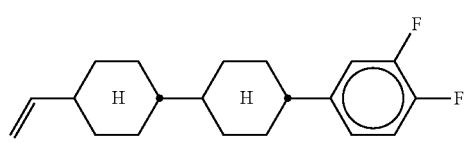
CCG-V-F
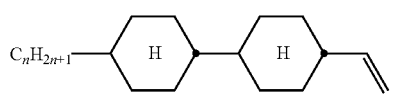
CC-n-V
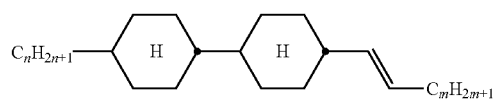
CC-n-Vm
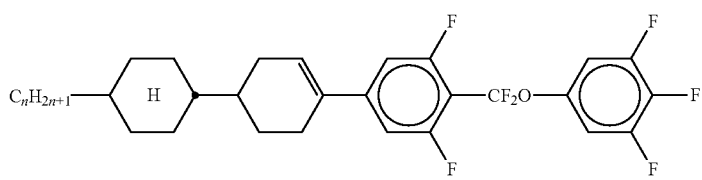
CLUQU-n-F
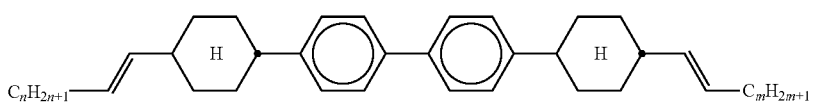
CPPC-nV-Vm
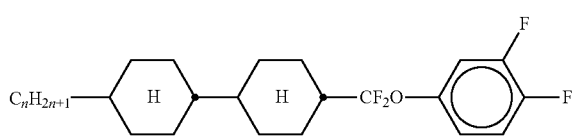
CCQG-n-F
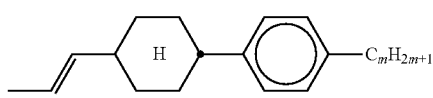
CP-1V-m
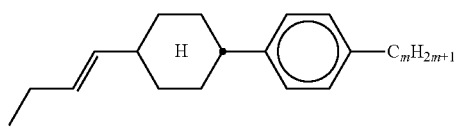
CP-2V-m TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
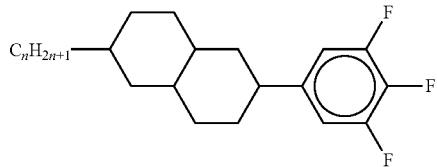
Dec-U-n-F
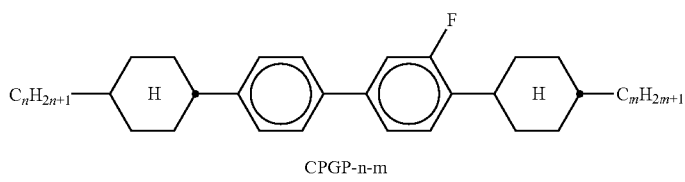
CPGP-n-m
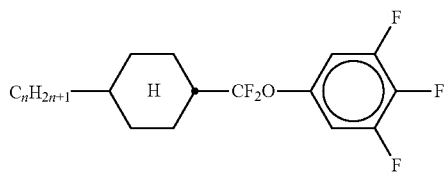
CQU-n-F
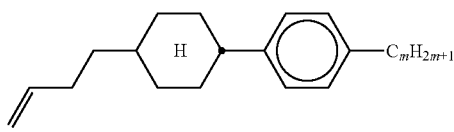
P-V2-m
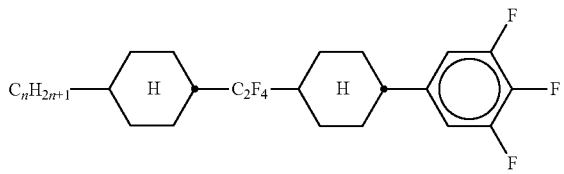
CWCU-n-F
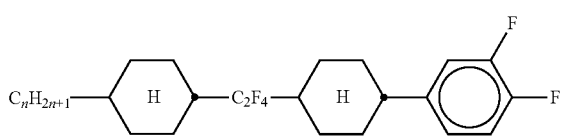
CWCG-n-F
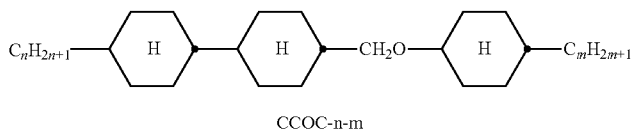
CCOC-n-m
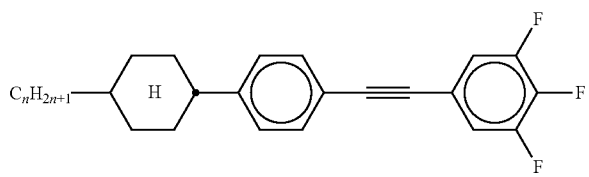
CPTU-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
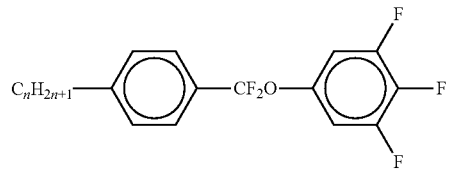
PQU-n-F
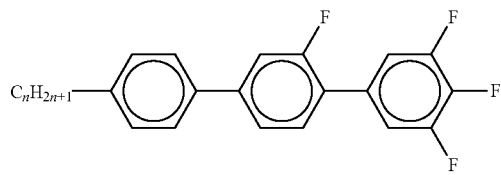
PGU-n-F
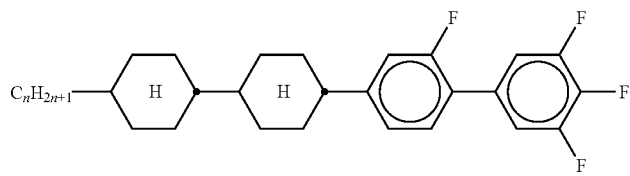
CCGU-n-F
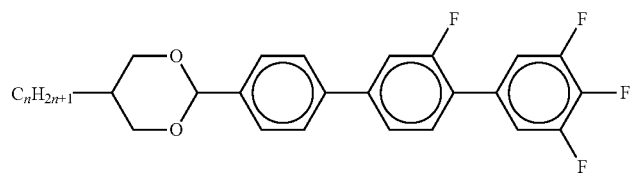
DPGU-n-F
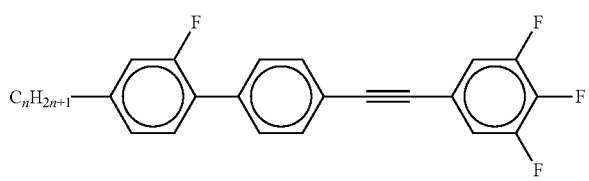
GPTU-n-F
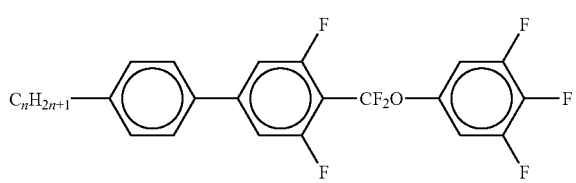
PUQU-n-F
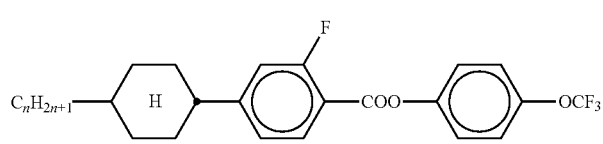
CGZP-n-OT TABLE B-continued
In the following formulae, n and m each, independently of one another, denote
0, 1, 2, 3, 4, 5, 6, 7, 8, 9, 10, 11 or 12, in particular 2, 3, 5, furthermore 0, 4, 6.
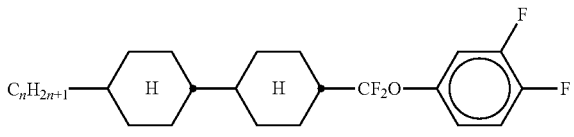
CCQG-n-F
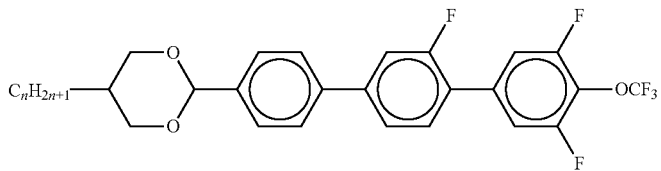
DPGU-n-OT
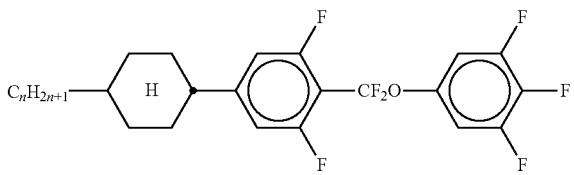
CUQU-n-F
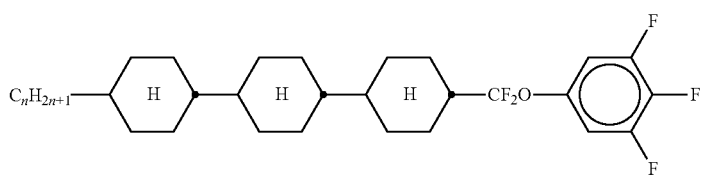
CCCQU-n-F
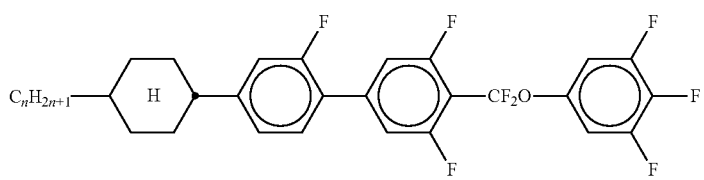
CGUQU-n-F
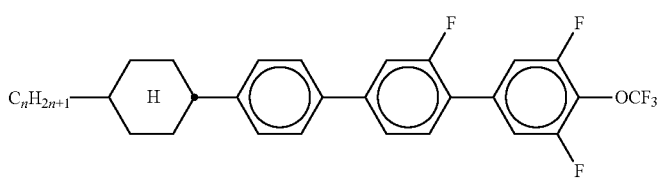
CPGU-n-OT
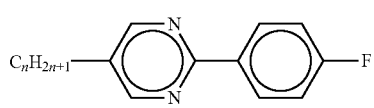
PYP-nF

TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
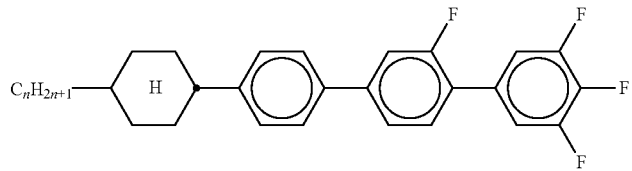
CPGU-n-F
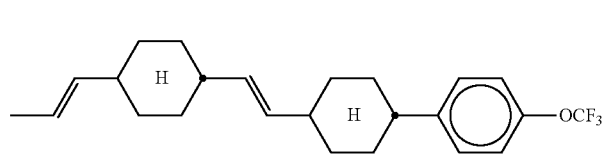
CVCP-1V-OT
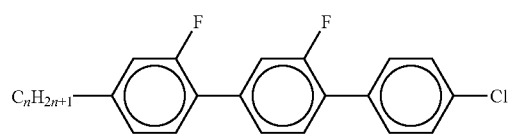
GGP-n-Cl
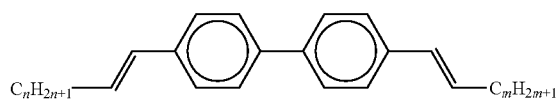
PP-nV-Vm
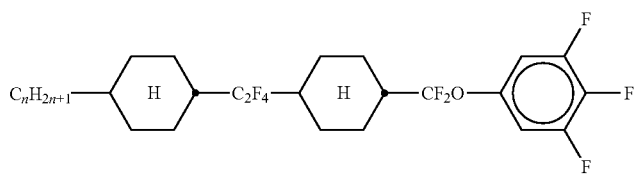
CWCQU-n-F
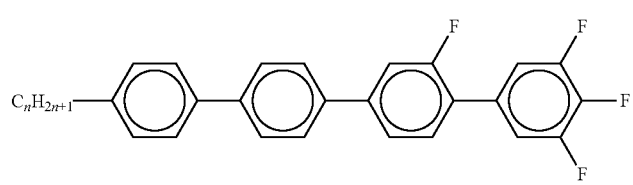
PPGU-n-F
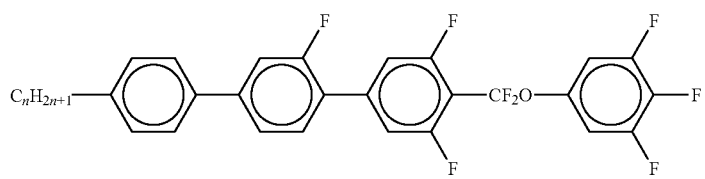
PGUQU-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
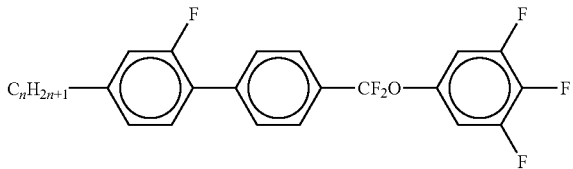
GPQU-n-F
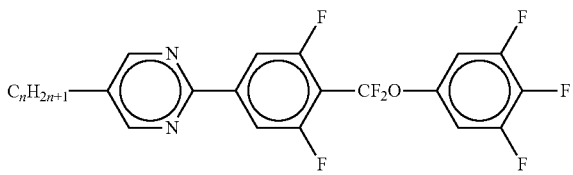
MUQU-n-F
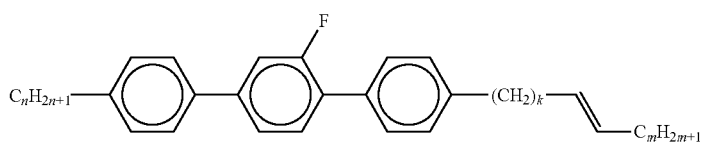
PGP-n-kVm
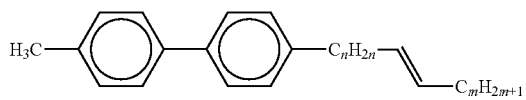
PP-1-nVm
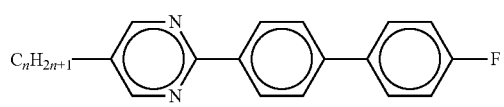
MPP-n-F
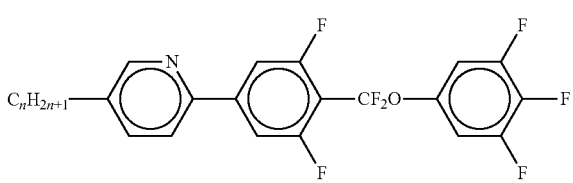
NUQU-n-F
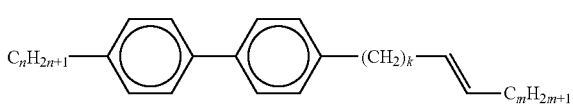
PP-n-kVm
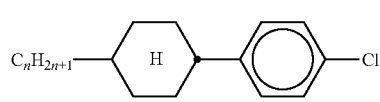
PCH-nCl, CP-n-Cl TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
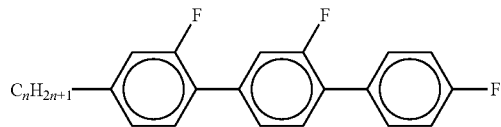
GGP-n-F
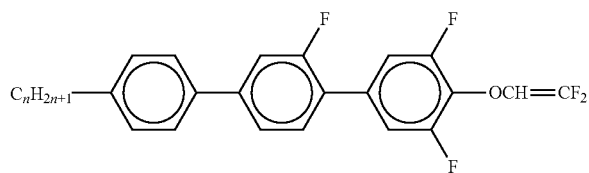
PGU-n-OXF
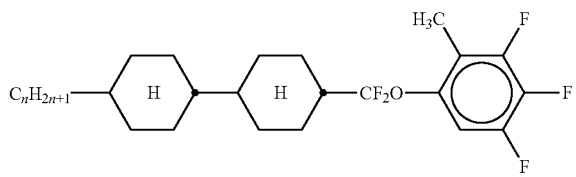
CCQU-n-F(1)
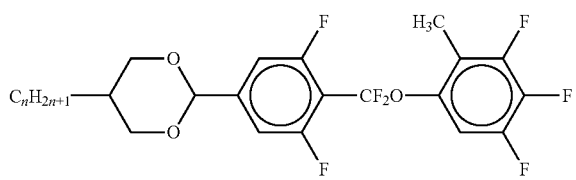
DUQU-n-F(1)
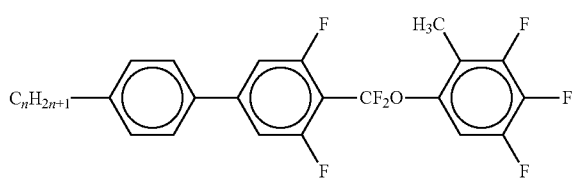
PUQU-n-F(1)
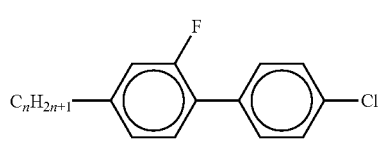
GP-n-Cl
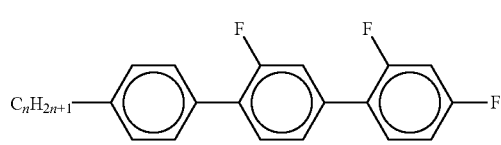
PGIGI-n-F TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
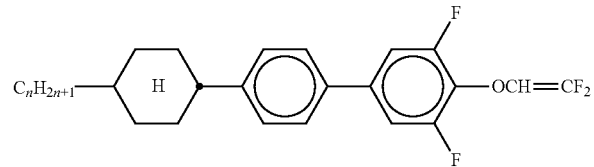
CPU-n-OXF
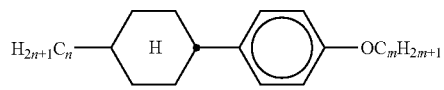
PCH-nOm, CP-n-Om
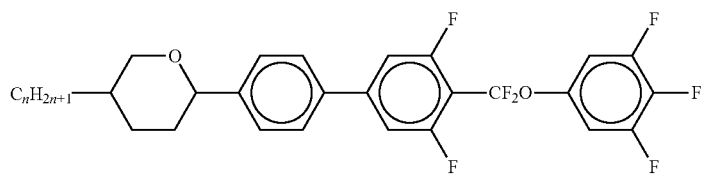
APUQU-n-F(1)
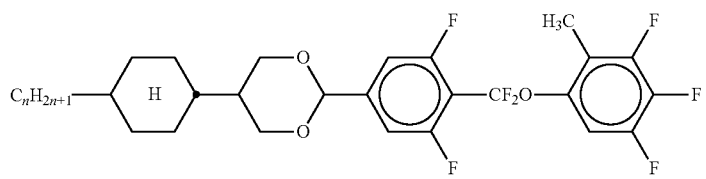
CDUQU-n-F(1)
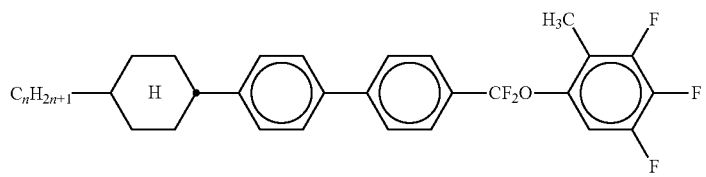
CPPQU-n-F(1)
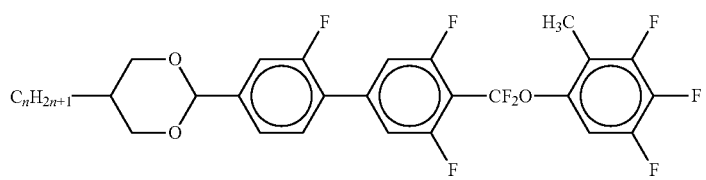
DGUQU-n-F(1)
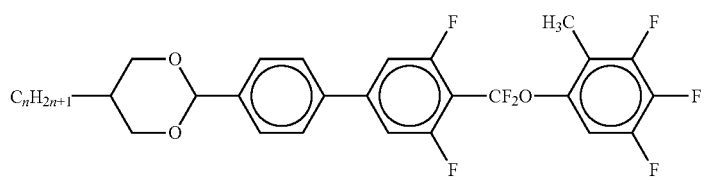
DPUQU-n-F(1)

TABLE B-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
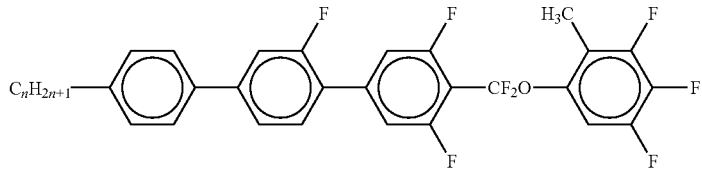
PGUQU-n-F(1)
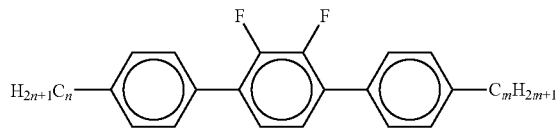
PYP-n-m
Particular preference is given to LC media which, besides the compounds of the formula I, comprise at least one, two, three, four or more compounds from Table B.
TABLE C
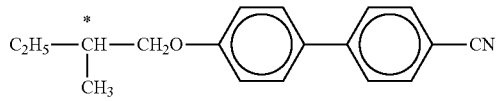
C 15
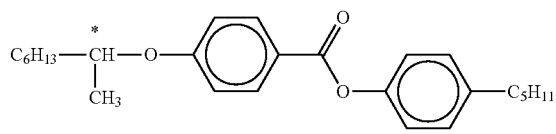
CM 21
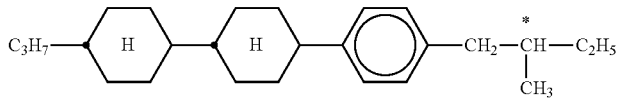
CM 44
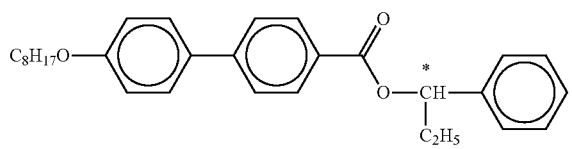
CM 47
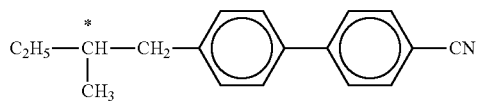
CB 15

TABLE C-continued
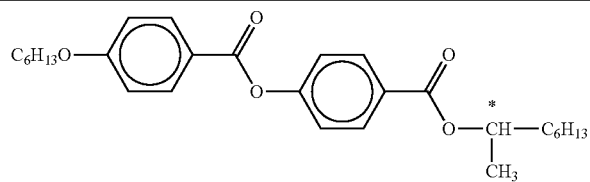
R/S-811
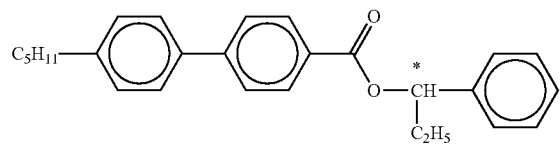
CM 45
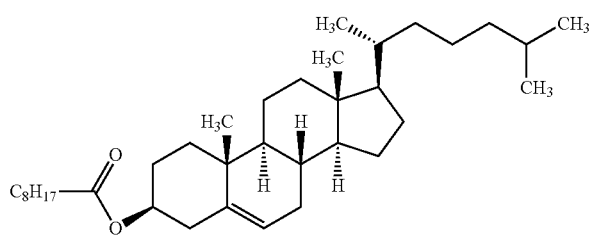
CN
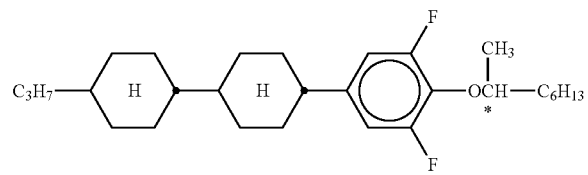
R/S-2011
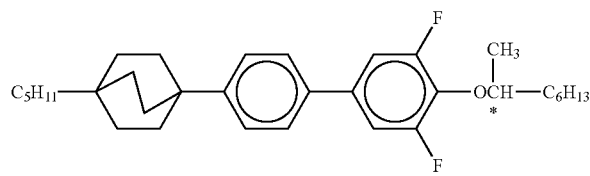
R/S-4011
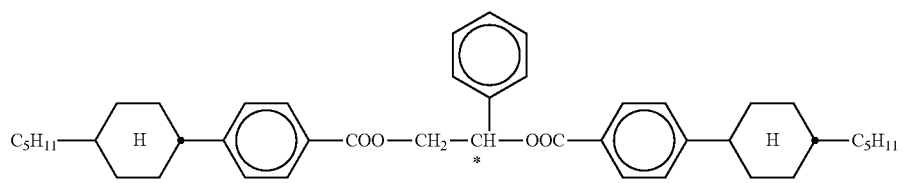
R/S-1011
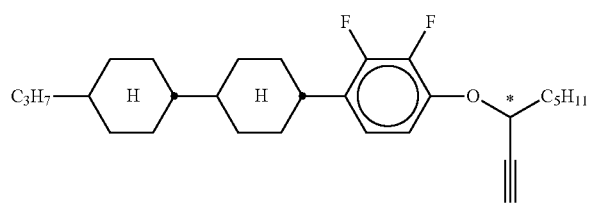
R/S-3011

TABLE C-continued

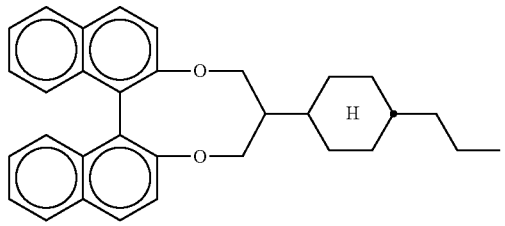

R/S-5011

Table C indicates possible dopants which are generally added to the LC media according to the invention. The LC media preferably comprise 0-10% by weight, in particular 0.01-5% by weight and particularly preferably 0.01-3% by weight of dopants.

Stabilisers, which can additionally be added, for example, to the LC media according to the invention in amounts of 0-10% by weight, are mentioned below.

TABLE D

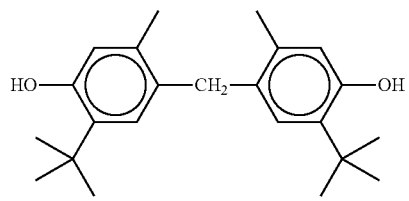

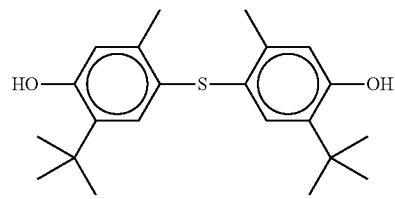

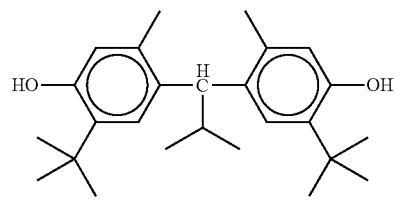

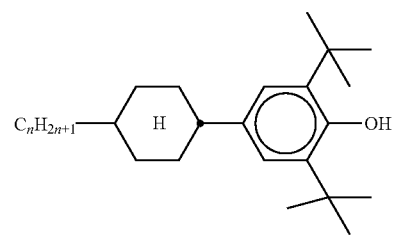

n = 1, 2, 3, 4, 5, 6 or 7

TABLE D-continued
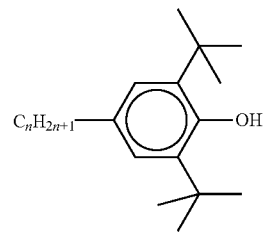
n = 1, 2, 3, 4, 5, 6 or 7
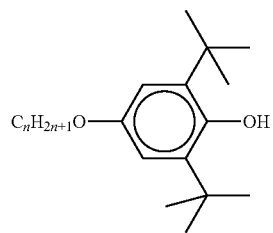
n = 1, 2, 3, 4, 5, 6 or 7
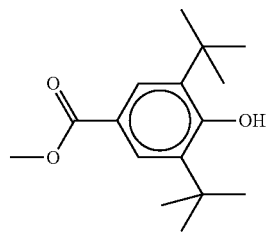
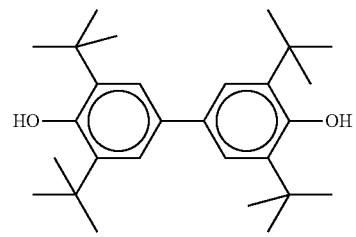
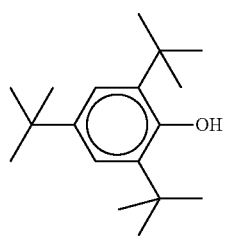
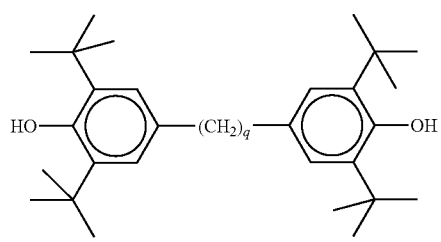
q = 1, 2, 3, 4, 5, 6 or 7

TABLE D-continued
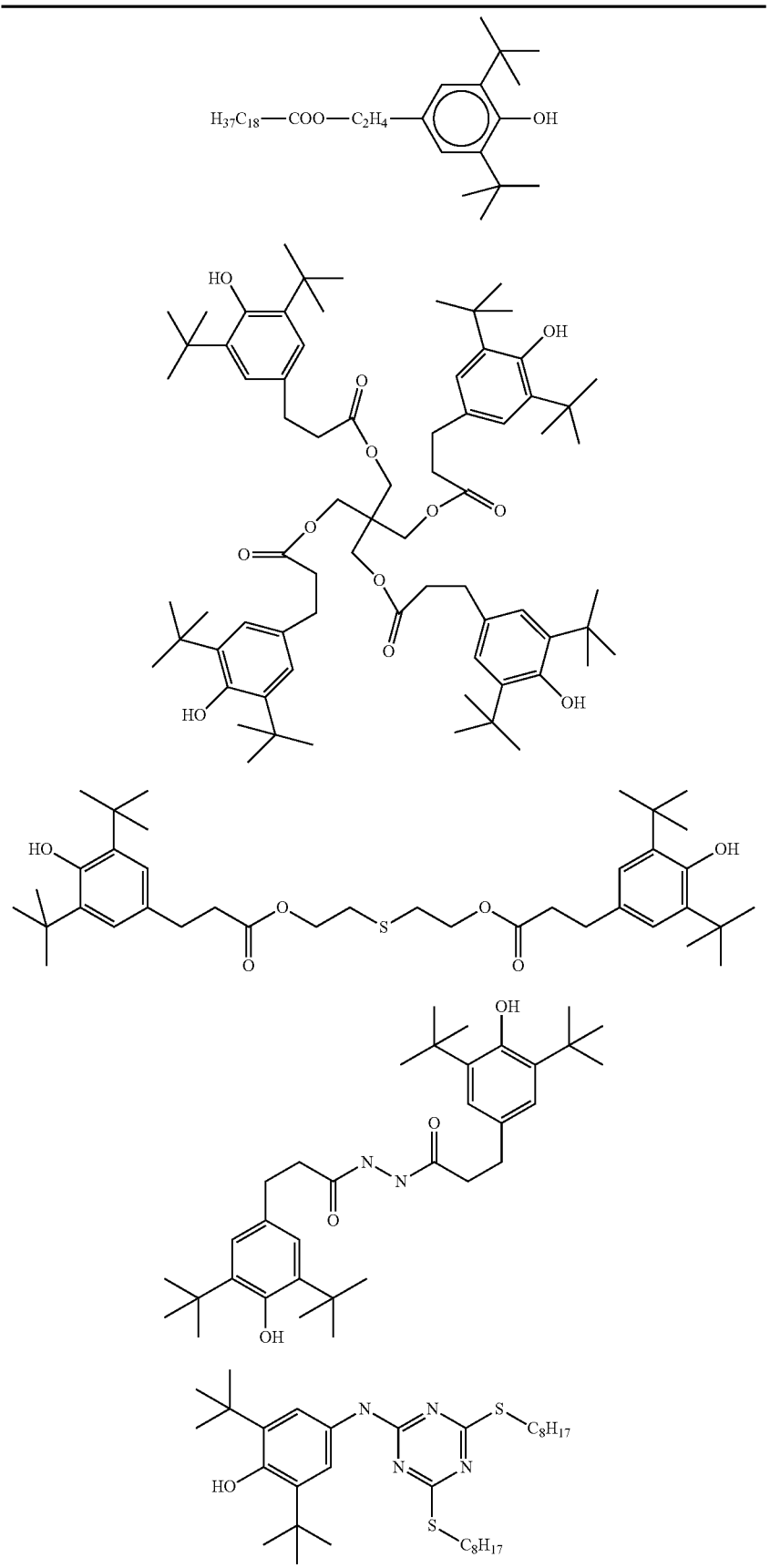

TABLE D-continued
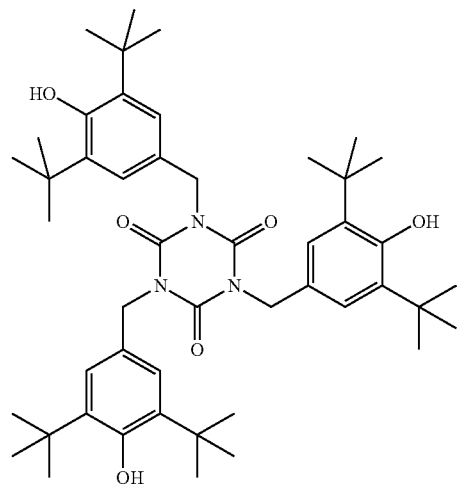 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
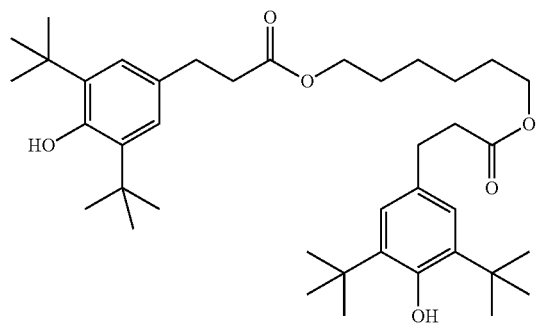 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
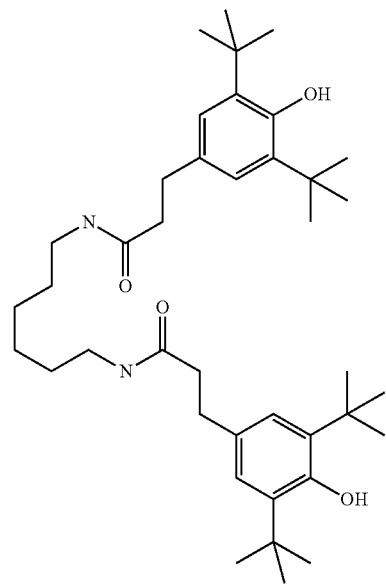 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE D-continued
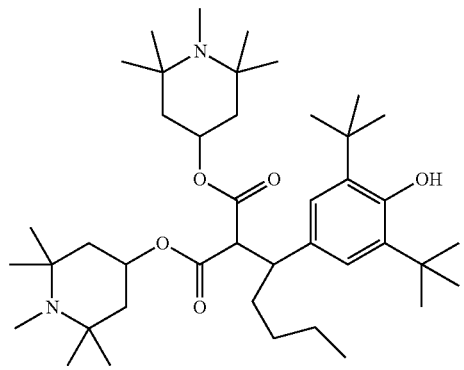 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
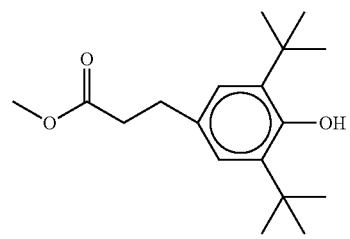
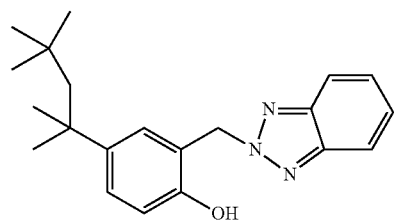 [SMILES: CC(C)(C)CC(C)(C)c1ccc(O)c(Cn2nc3ccccc3n2)c1]
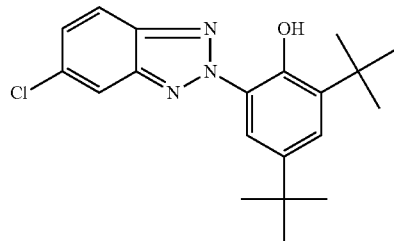 [SMILES: CC(C)(C)c1cc(-n2nc3ccc(Cl)cc3n2)c(O)c(C(C)(C)C)c1]
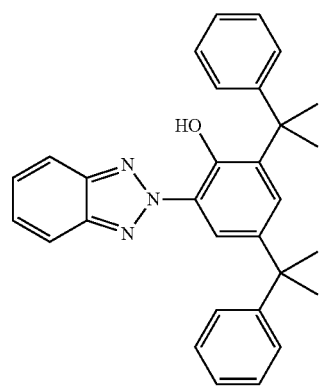 [SMILES: CC(C)(c1ccccc1)c1cc(-n2nc3ccccc3n2)c(O)c(C(C)(C)c2ccccc2)c1]

TABLE D-continued
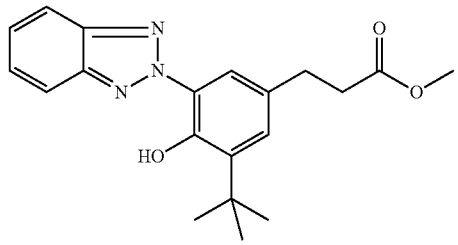 [SMILES: COC(=O)CCc1cc(-n2nc3ccccc3n2)c(O)c(C(C)(C)C)c1]
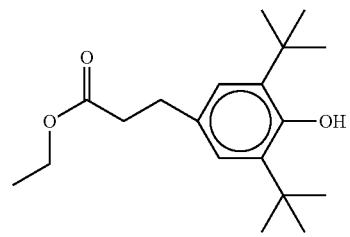
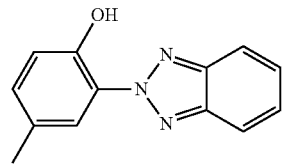 [SMILES: Cc1ccc(O)c(-n2nc3ccccc3n2)c1]
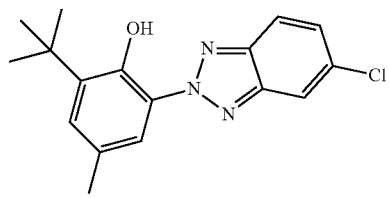 [SMILES: Cc1cc(-n2nc3ccc(Cl)cc3n2)c(O)c(C(C)(C)C)c1]
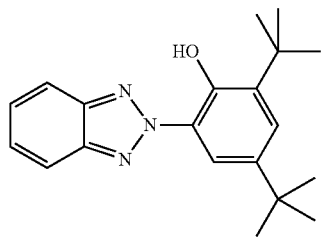 [SMILES: CC(C)(C)c1cc(-n2nc3ccccc3n2)c(O)c(C(C)(C)C)c1]
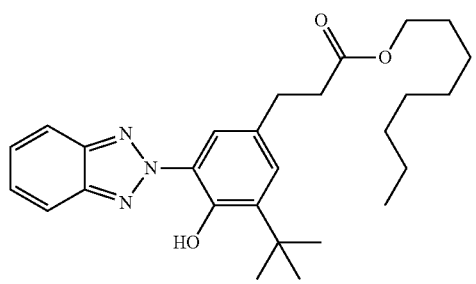 [SMILES: CCCCCCCCOC(=O)CCc1cc(-n2nc3ccccc3n2)c(O)c(C(C)(C)C)c1]

TABLE D-continued
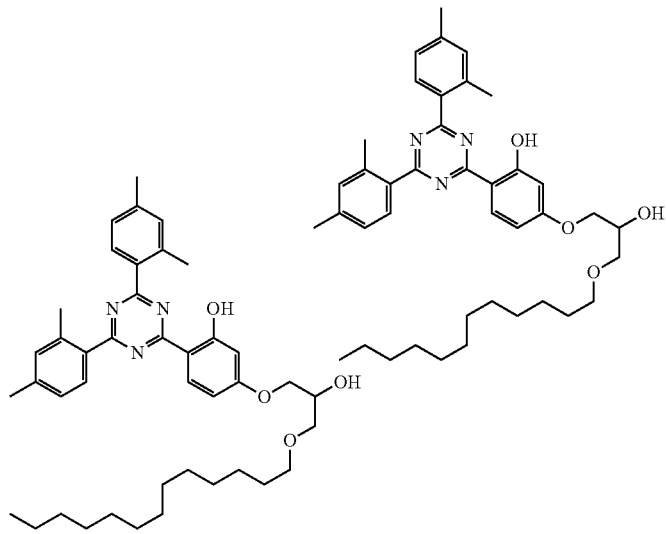
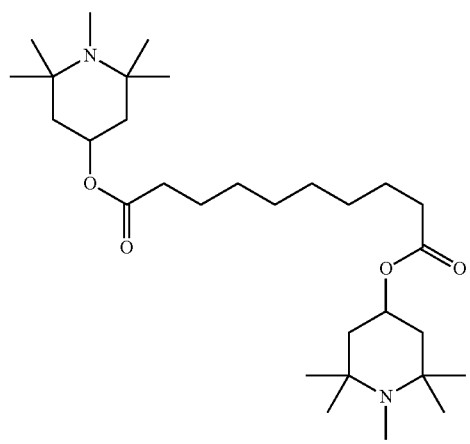
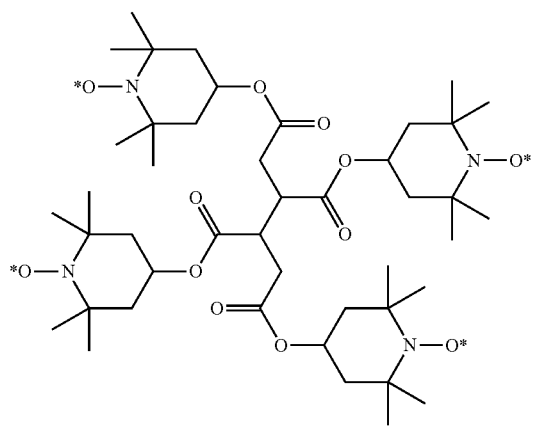

TABLE D-continued
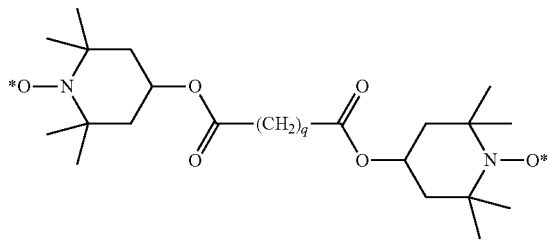
q = 1, 2, 3, 4, 5, 6, 7, 8, 9 or 10
Table E shows illustrative reactive mesogenic compounds (RMs) which can be used in the LC media in accordance with the present invention.
TABLE E
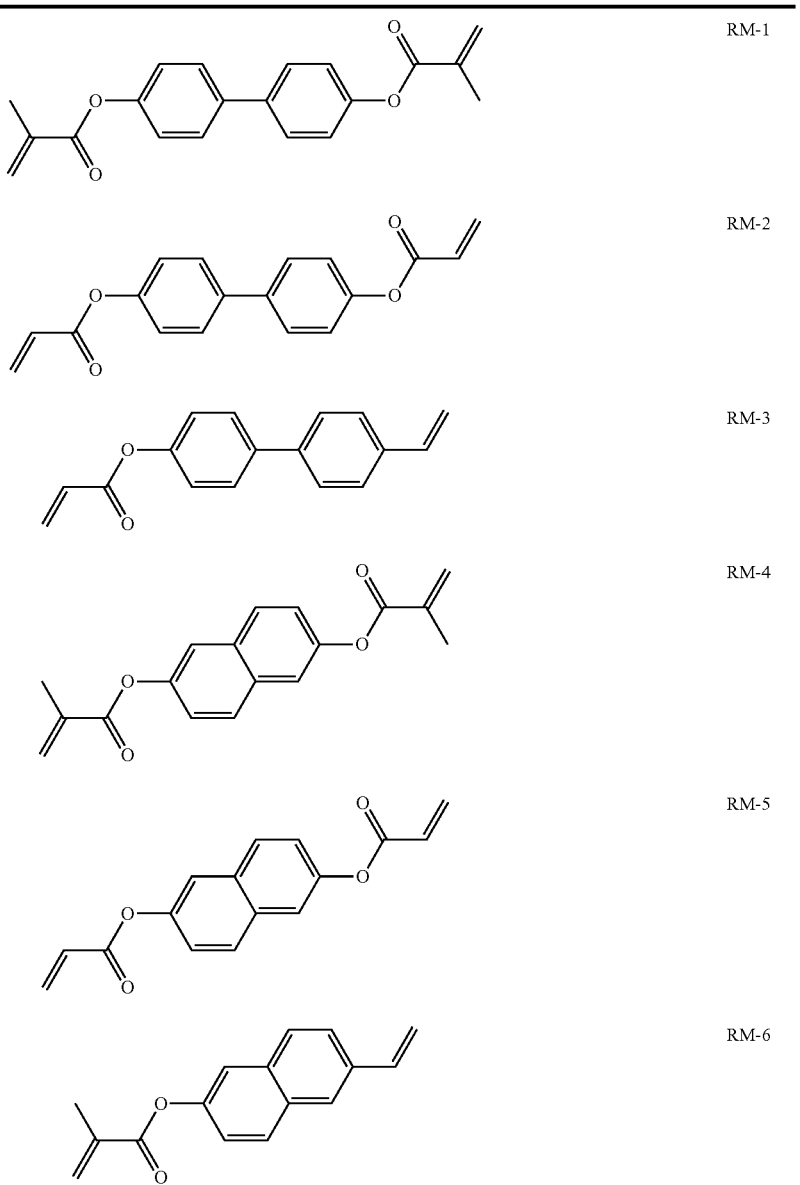

TABLE E-continued
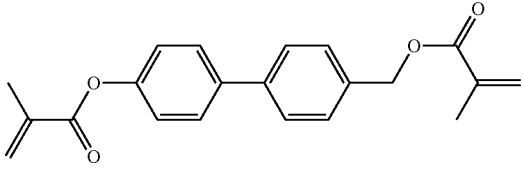 [SMILES: C=C(C)C(=O)OCc1ccc(-c2ccc(OC(=O)C(=C)C)cc2)cc1] RM-7
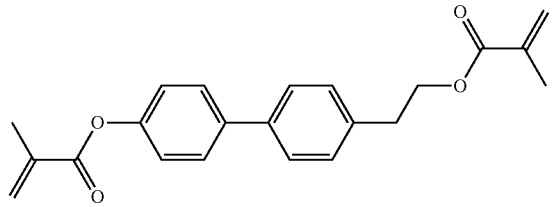 [SMILES: C=C(C)C(=O)OCCc1ccc(-c2ccc(OC(=O)C(=C)C)cc2)cc1] RM-8
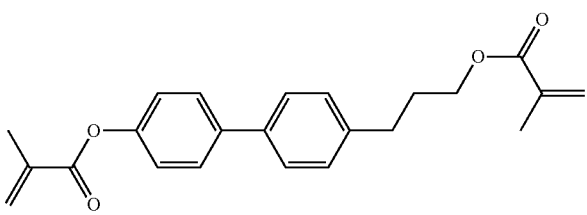 [SMILES: C=C(C)C(=O)OCCCc1ccc(-c2ccc(OC(=O)C(=C)C)cc2)cc1] RM-9
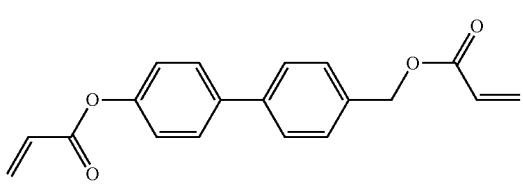 [SMILES: C=CC(=O)OCc1ccc(-c2ccc(OC(=O)C=C)cc2)cc1] RM-10
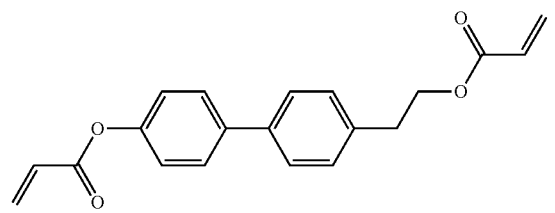 [SMILES: C=CC(=O)OCCc1ccc(-c2ccc(OC(=O)C=C)cc2)cc1] RM-11
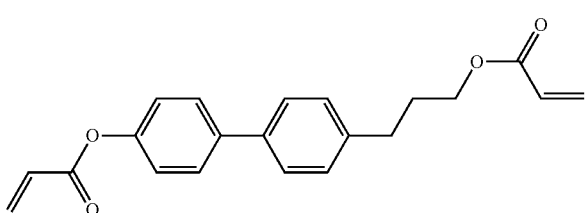 RM-12
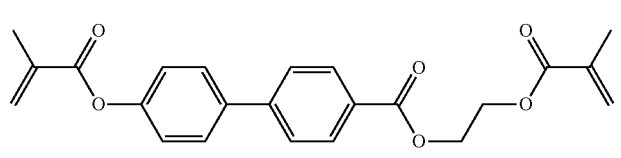 RM-13
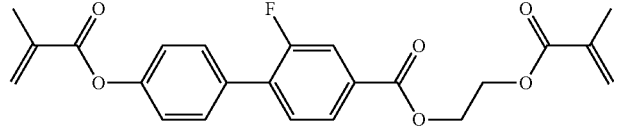 [SMILES: C=C(C)C(=O)OCCOC(=O)c1ccc(-c2ccc(OC(=O)C(=C)C)cc2)cc1] RM-14

TABLE E-continued
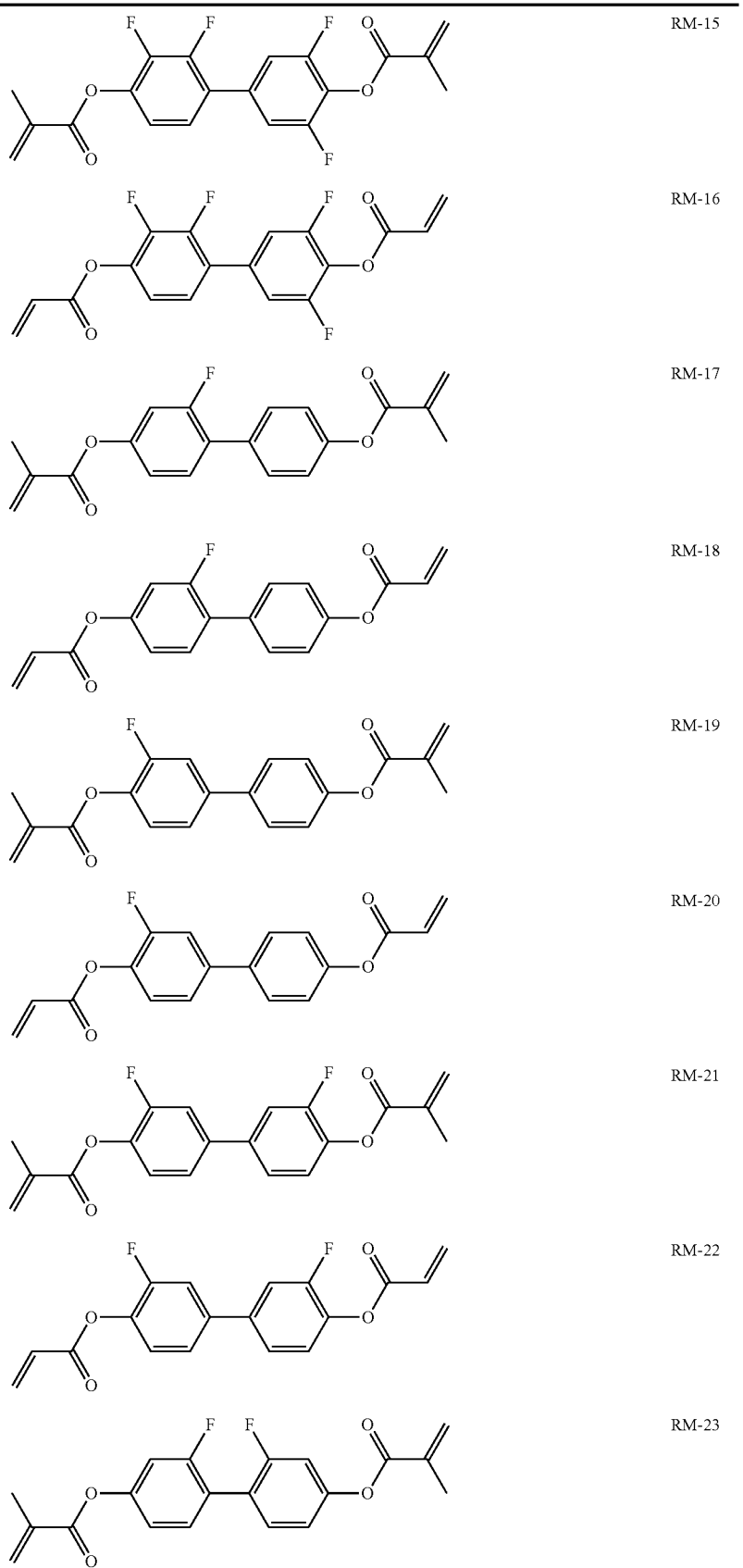

TABLE E-continued
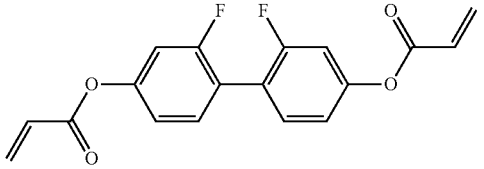 RM-24
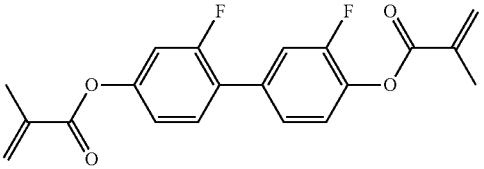 [SMILES: C=C(C)C(=O)Oc1ccc(-c2ccc(OC(=O)C(=C)C)c(F)c2)c(F)c1] RM-25
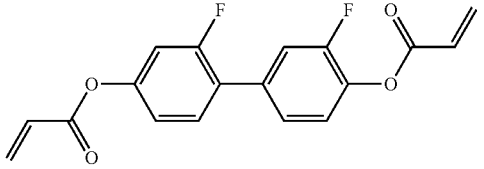 [SMILES: C=CC(=O)Oc1ccc(-c2ccc(OC(=O)C=C)c(F)c2)c(F)c1] RM-26
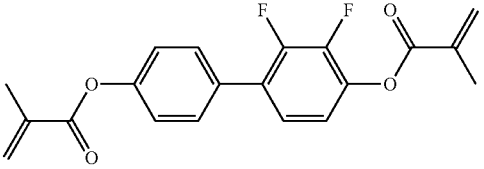 RM-27
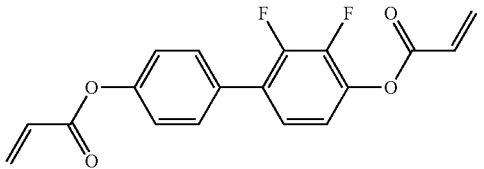 RM-28
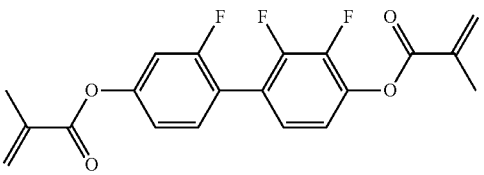 [SMILES: C=C(C)C(=O)Oc1ccc(-c2ccc(OC(=O)C(=C)C)c(F)c2F)c(F)c1] RM-29
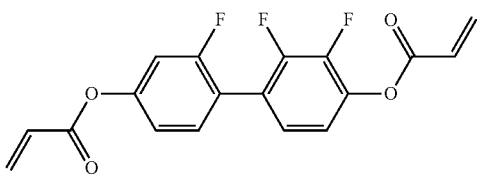 RM-30
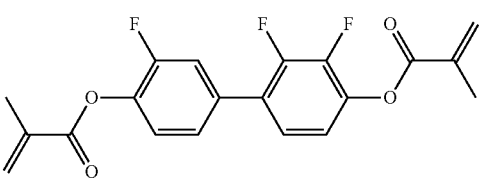 RM-31
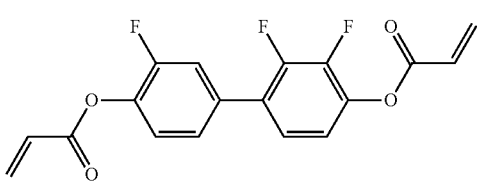 [SMILES: C=CC(=O)Oc1ccc(-c2ccc(OC(=O)C=C)c(F)c2F)cc1F] RM-32

TABLE E-continued
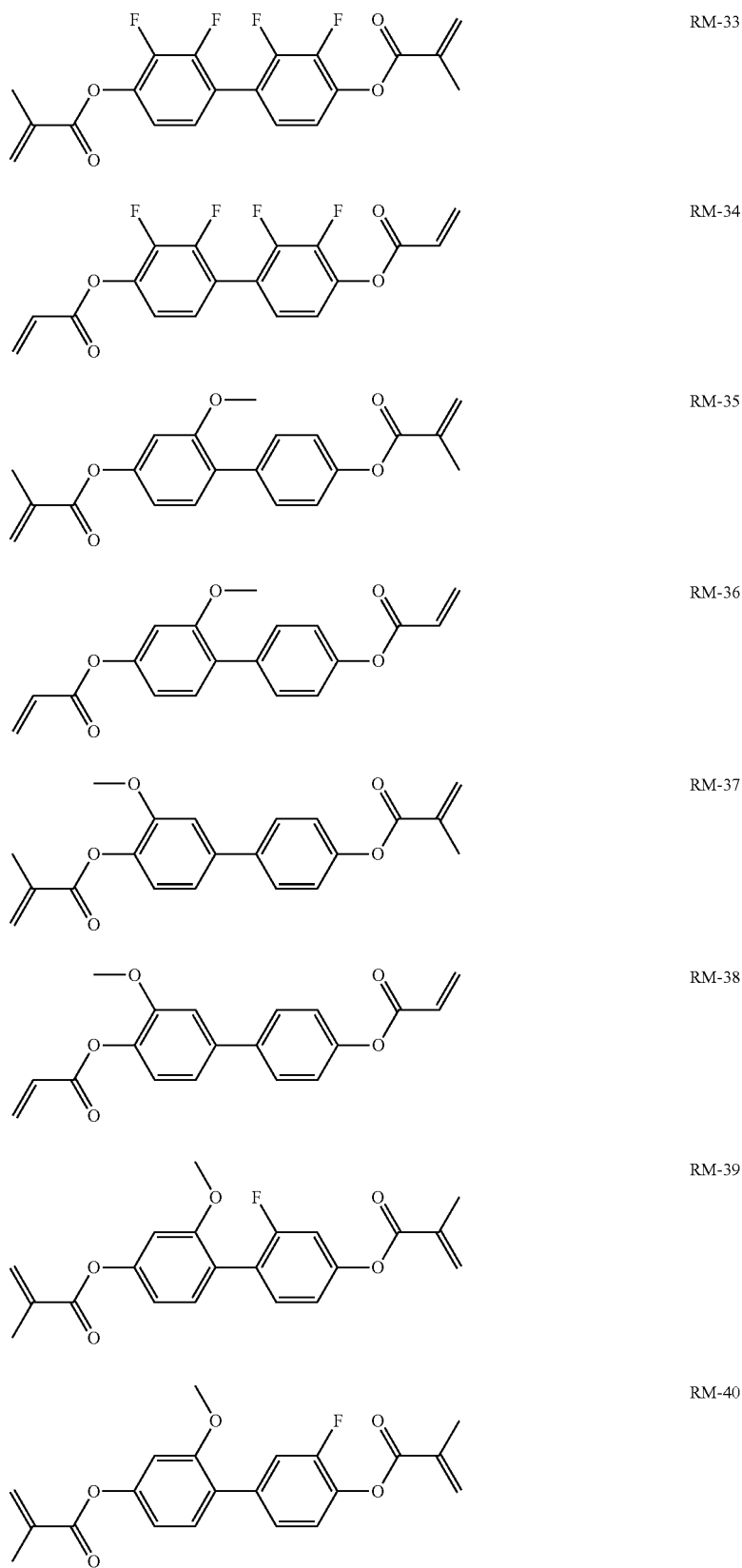
RM-33
RM-34
RM-35
RM-36
RM-37
RM-38
RM-39
RM-40

TABLE E-continued
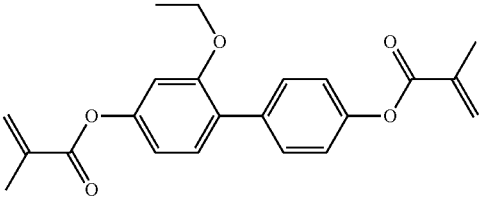 [SMILES: C=C(C)C(=O)Oc1ccc(-c2ccc(OC(=O)C(=C)C)cc2OCC)cc1]
RM-41
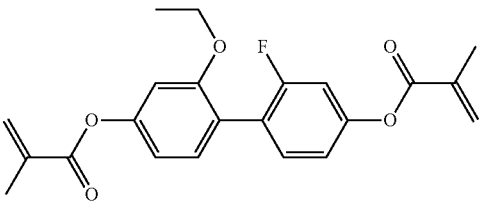 [SMILES: C=C(C)C(=O)Oc1ccc(-c2ccc(OC(=O)C(=C)C)cc2OCC)c(F)c1]
RM-42
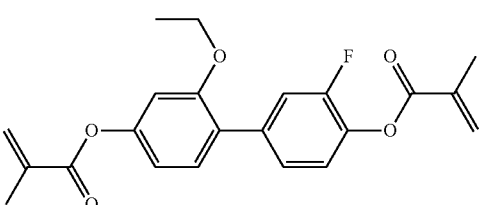
RM-43
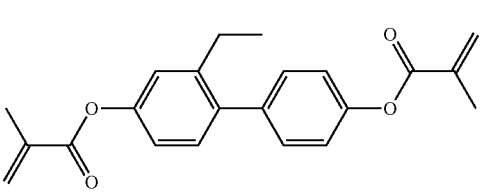
RM-44
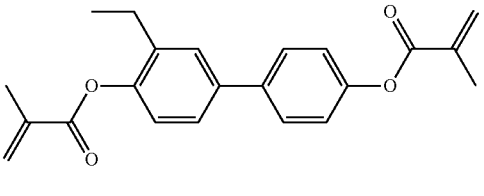 [SMILES: C=C(C)C(=O)Oc1ccc(-c2ccc(OC(=O)C(=C)C)c(C)c2)cc1]
RM-45
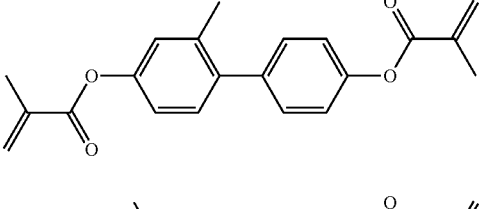
RM-46
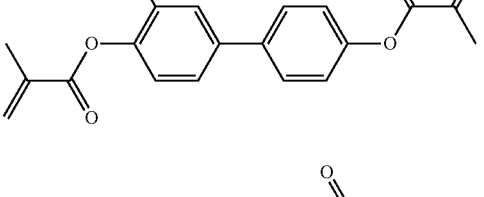
RM-47
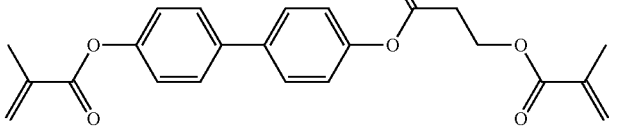
RM-48

TABLE E-continued

| | |
|---|---|
| (structure) | RM-49 |
| (structure) | RM-50 |
| (structure) | RM-51 |
| (structure) | RM-52 |
| (structure) | RM-53 |
| (structure) | RM-54 |
| (structure) | RM-55 |
| (structure) | RM-56 |

TABLE E-continued
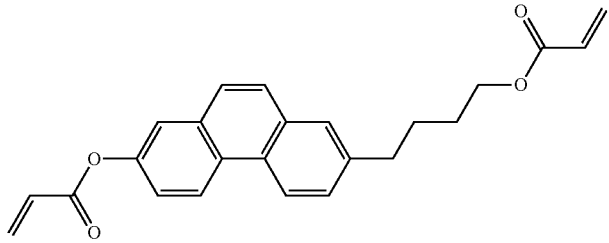 [SMILES: C=CC(=O)OCCCCc1ccc2c(ccc3cc(OC(=O)C=C)ccc32)c1]
RM-57
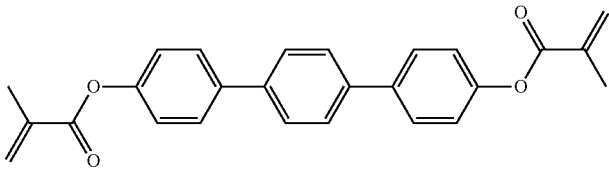
RM-58
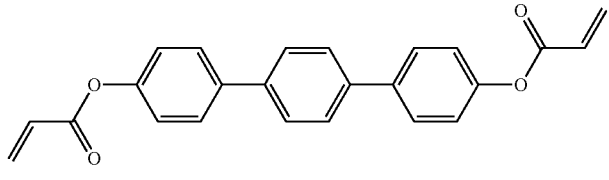
RM-59
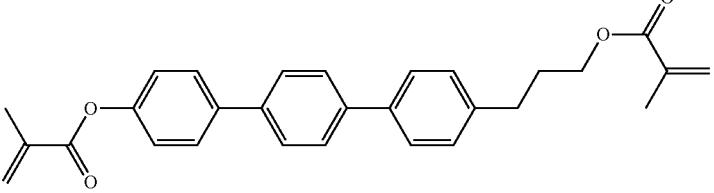
RM-60
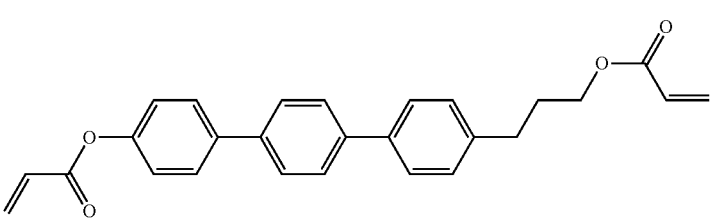 [SMILES: C=CC(=O)OCCCc1ccc(-c2ccc(-c3ccc(OC(=O)C=C)cc3)cc2)cc1]
RM-61
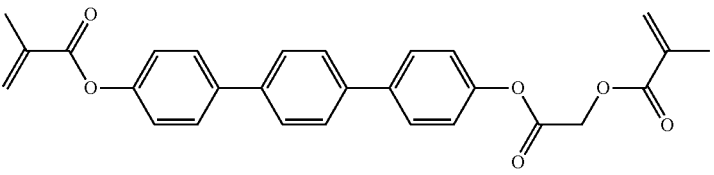 [SMILES: C=C(C)C(=O)OCC(=O)Oc1ccc(-c2ccc(-c3ccc(OC(=O)C(=C)C)cc3)cc2)cc1]
RM-62
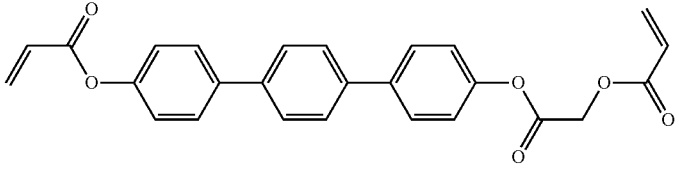 [SMILES: C=CC(=O)OCC(=O)Oc1ccc(-c2ccc(-c3ccc(OC(=O)C=C)cc3)cc2)cc1]
RM-63
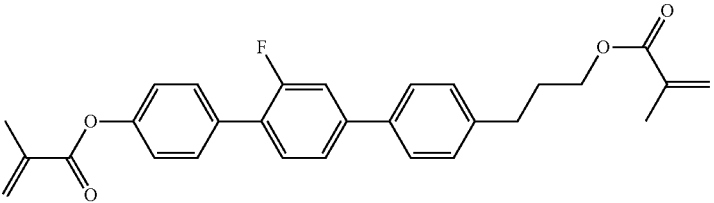 [SMILES: C=C(C)C(=O)OCCCc1ccc(-c2ccc(-c3ccc(OC(=O)C(=C)C)cc3)c(F)c2)cc1]
RM-64

TABLE E-continued
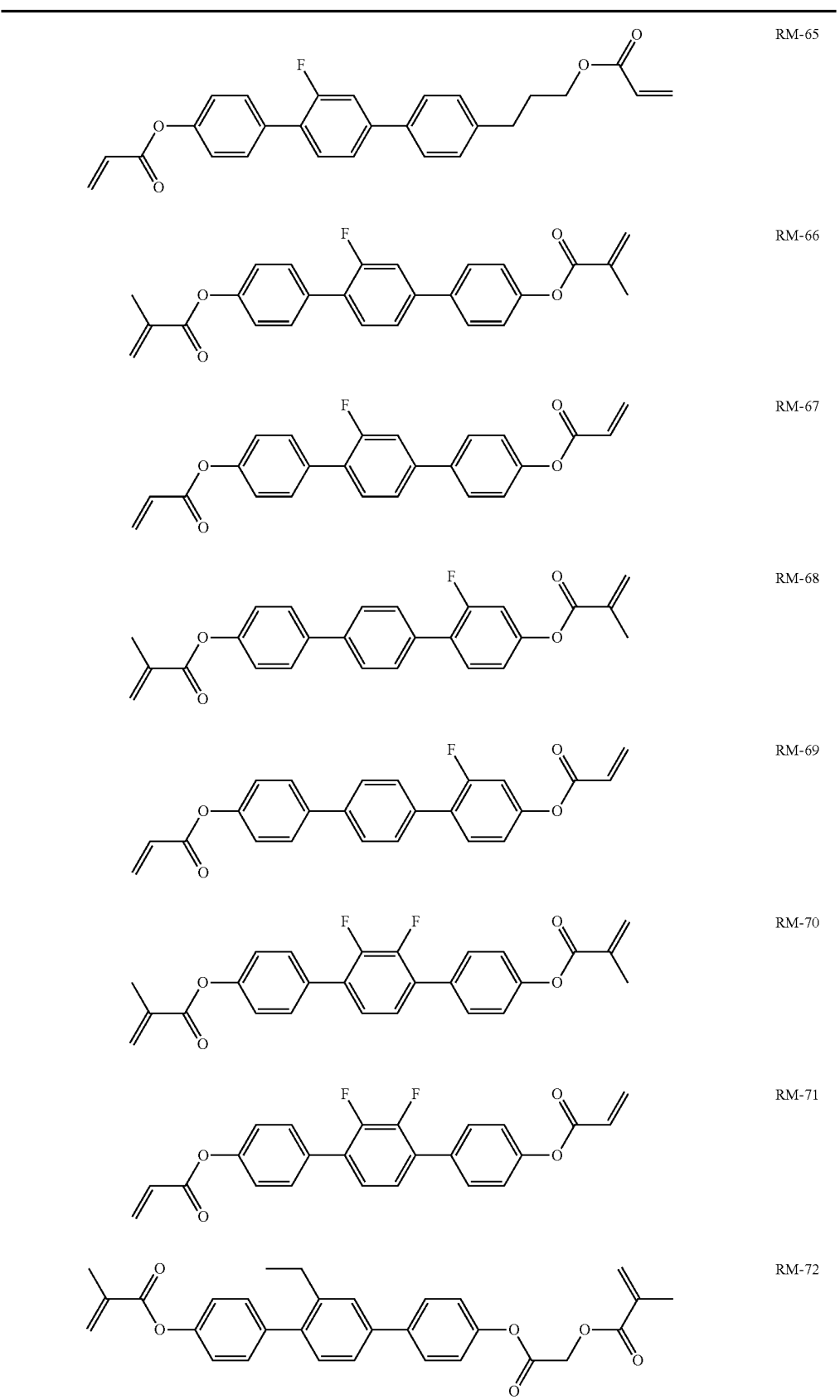

TABLE E-continued

| Structure | ID |
|---|---|
| (structure) | RM-73 |
| (structure) | RM-74 |
| (structure) | RM-75 |
| (structure) | RM-76 |
| (structure) | RM-77 |
| (structure) | RM-78 |
| (structure) | RM-79 |
| (structure) | RM-80 |
| (structure) | RM-81 |

TABLE E-continued
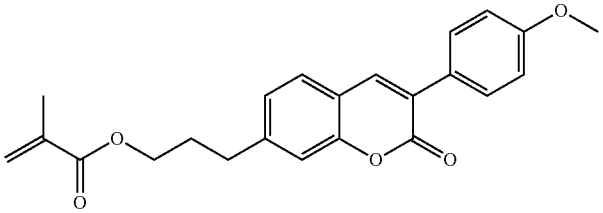 [SMILES: C=C(C)C(=O)OCCCc1ccc2cc(-c3ccc(OC)cc3)c(=O)oc2c1] RM-82
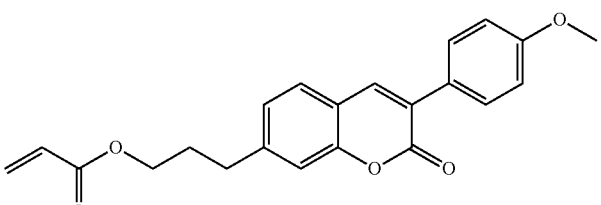 RM-83
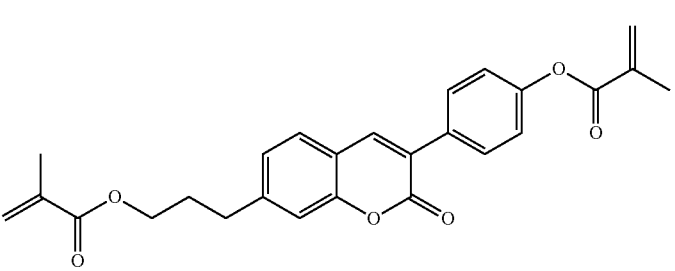 [SMILES: C=C(C)C(=O)OCCCc1ccc2cc(-c3ccc(OC(=O)C(=C)C)cc3)c(=O)oc2c1] RM-84
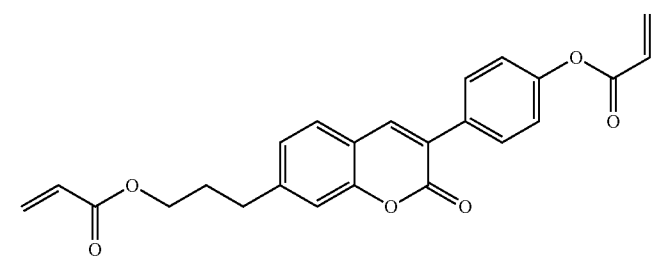 [SMILES: C=CC(=O)OCCCc1ccc2cc(-c3ccc(OC(=O)C=C)cc3)c(=O)oc2c1] RM-85
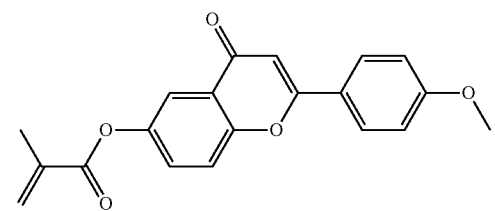 [SMILES: C=C(C)C(=O)Oc1ccc2oc(-c3ccc(OC)cc3)cc(=O)c2c1] RM-86
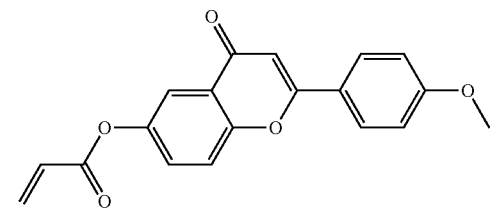 [SMILES: C=CC(=O)Oc1ccc2oc(-c3ccc(OC)cc3)cc(=O)c2c1] RM-87
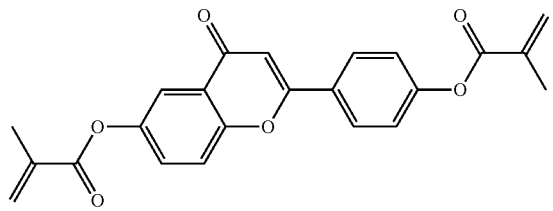 [SMILES: C=C(C)C(=O)Oc1ccc(-c2cc(=O)c3cc(OC(=O)C(=C)C)ccc3o2)cc1] RM-88

TABLE E-continued
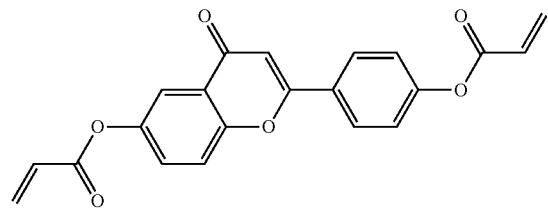 [SMILES: C=CC(=O)Oc1ccc(-c2cc(=O)c3cc(OC(=O)C=C)ccc3o2)cc1]
RM-89
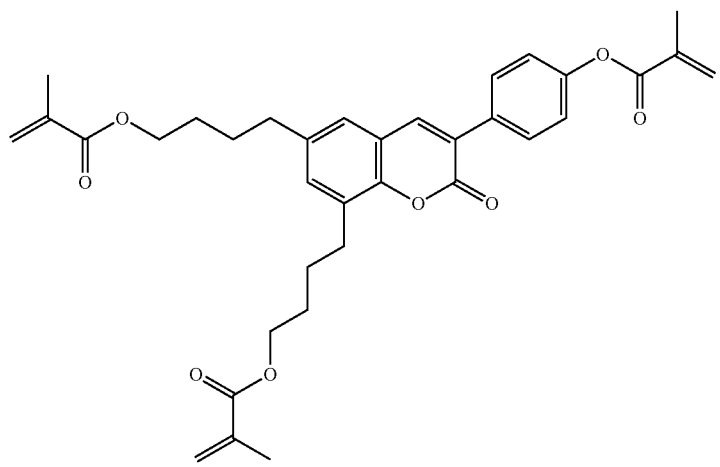 [SMILES: C=C(C)C(=O)OCCCCc1cc(CCCCOC(=O)C(=C)C)c2oc(=O)c(-c3ccc(OC(=O)C(=C)C)cc3)cc2c1]
RM-90
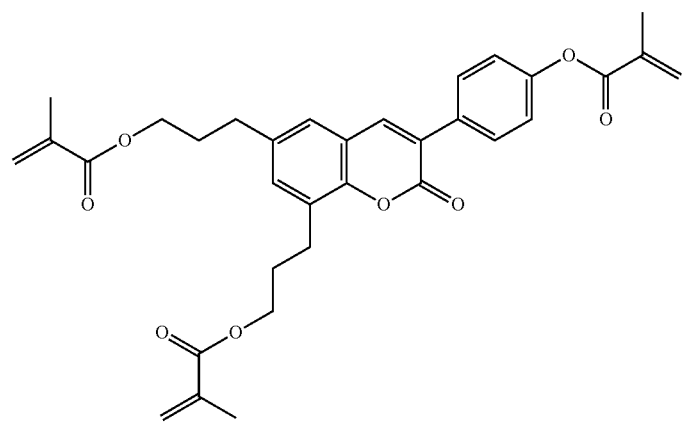 [SMILES: C=C(C)C(=O)OCCCc1cc(CCCOC(=O)C(=C)C)c2oc(=O)c(-c3ccc(OC(=O)C(=C)C)cc3)cc2c1]
RM-91
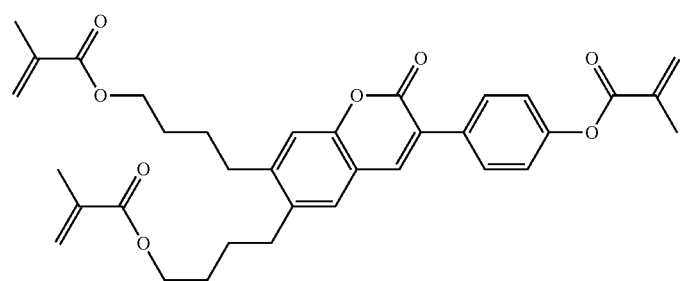 [SMILES: C=C(C)C(=O)OCCCCc1cc2cc(-c3ccc(OC(=O)C(=C)C)cc3)c(=O)oc2cc1CCCCOC(=O)C(=C)C]
RM-92

TABLE E-continued
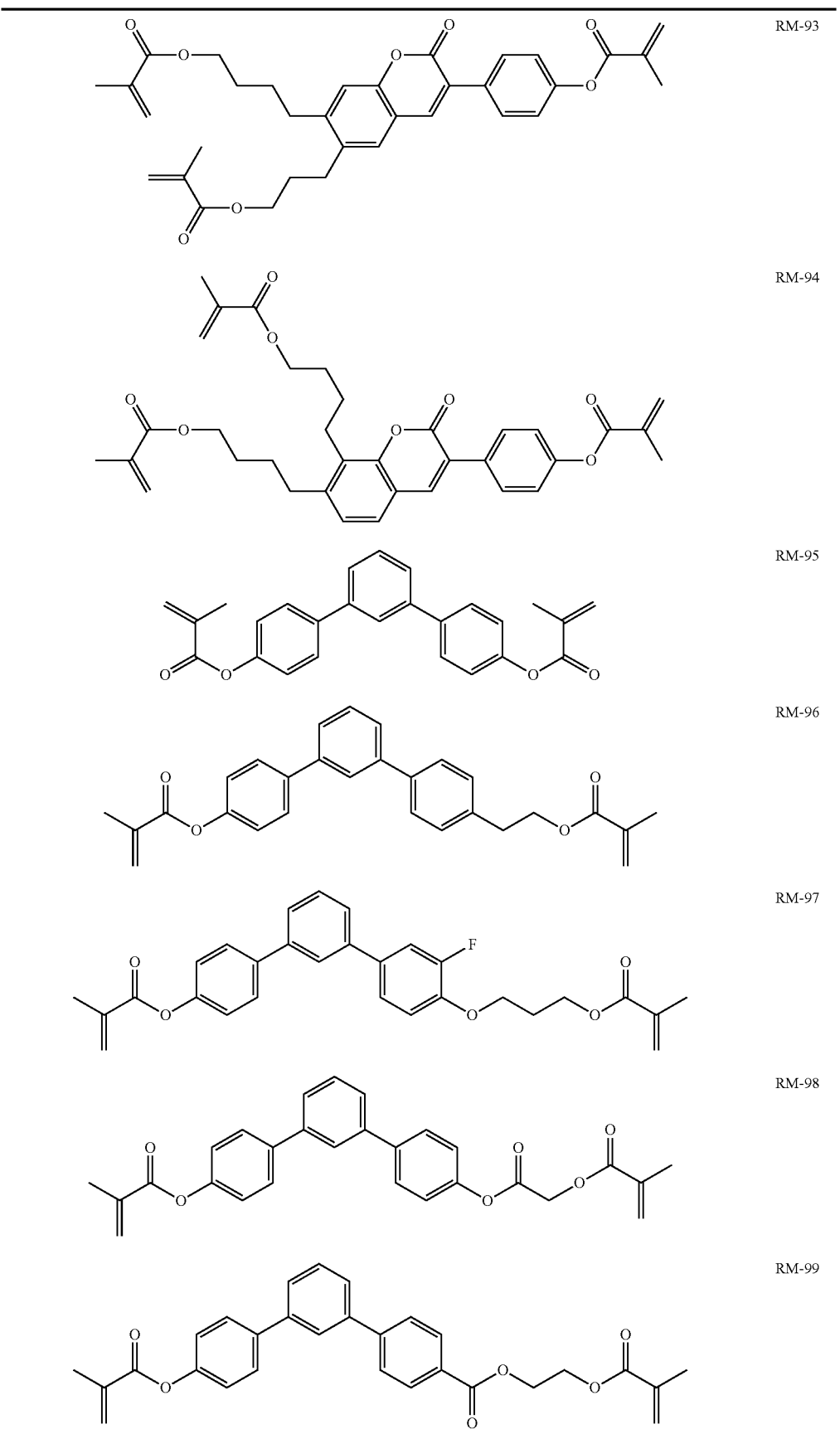
RM-93
RM-94
RM-95
RM-96
RM-97
RM-98
RM-99

TABLE E-continued
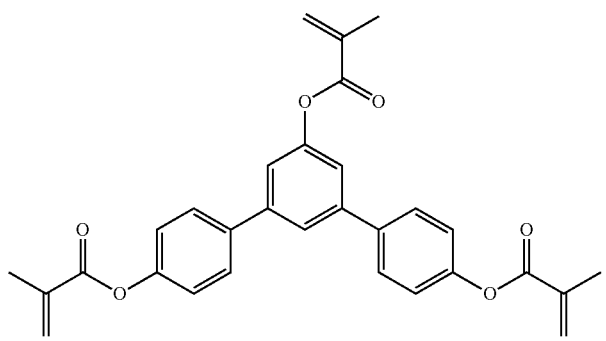 [SMILES: C=C(C)C(=O)Oc1ccc(-c2cc(OC(=O)C(=C)C)cc(-c3ccc(OC(=O)C(=C)C)cc3)c2)cc1]
RM-100
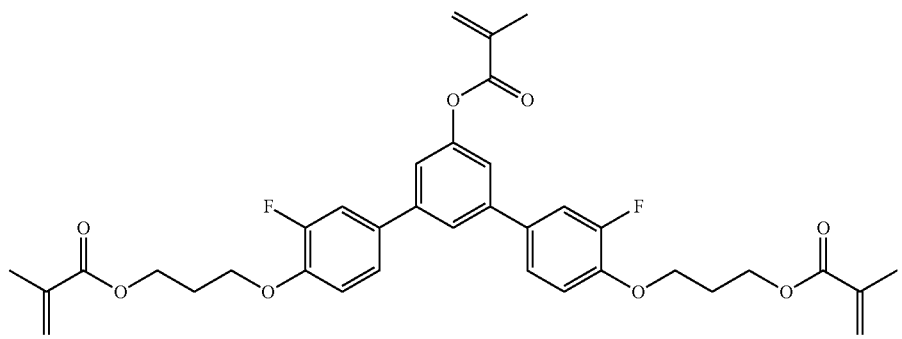 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101
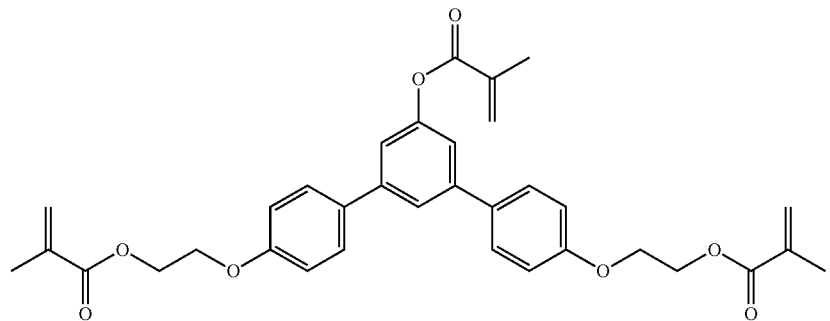 [SMILES: C=C(C)C(=O)OCCOc1ccc(-c2cc(OC(=O)C(=C)C)cc(-c3ccc(OCCOC(=O)C(=C)C)cc3)c2)cc1]
RM-102
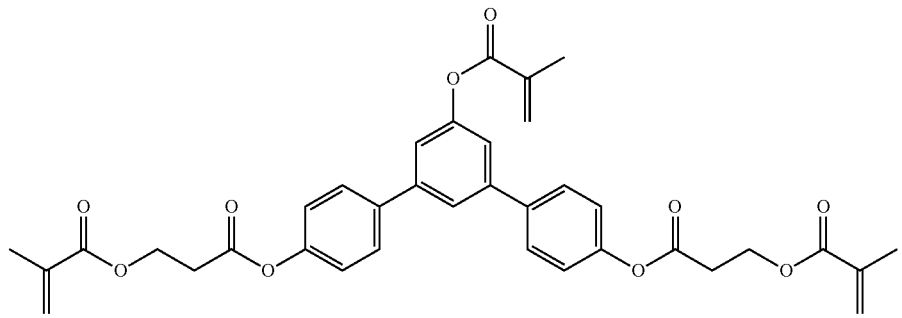 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-103

TABLE E-continued
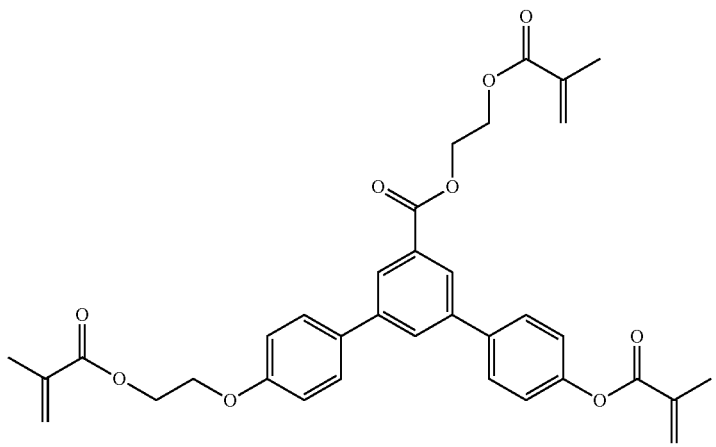 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-104
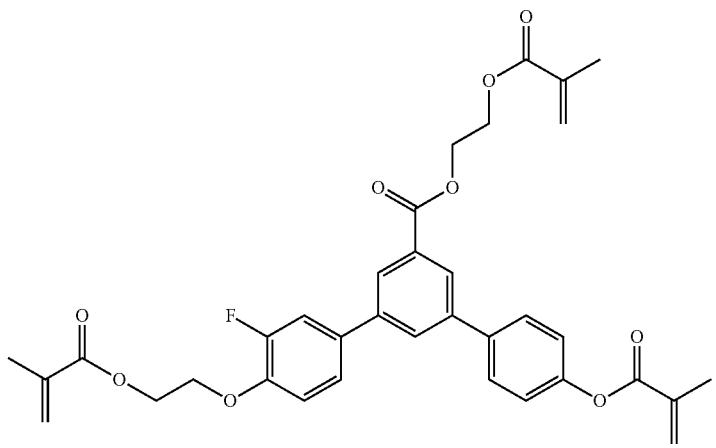 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-105
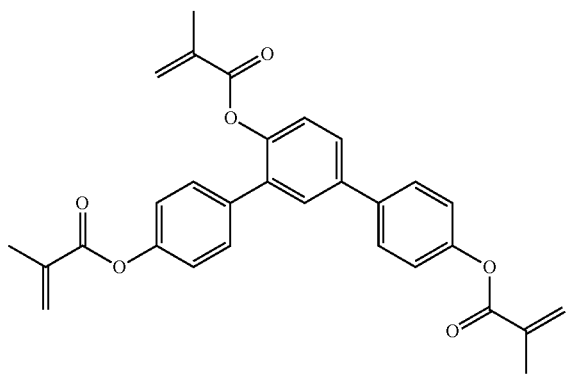 [SMILES: C=C(C)C(=O)Oc1ccc(-c2ccc(OC(=O)C(=C)C)c(-c3ccc(OC(=O)C(=C)C)cc3)c2)cc1]
RM-106
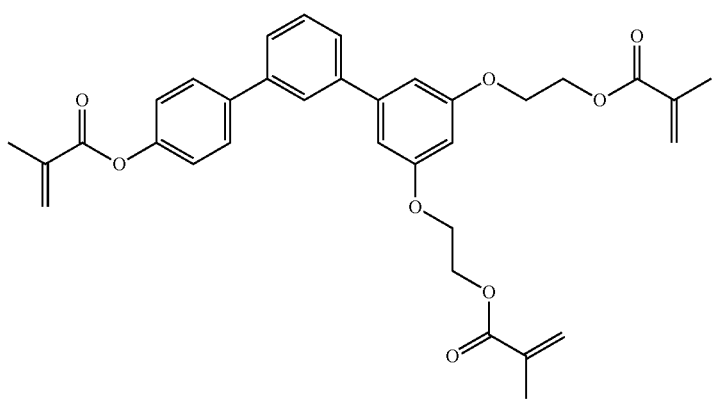 [SMILES: C=C(C)C(=O)OCCOc1cc(OCCOC(=O)C(=C)C)cc(-c2cccc(-c3ccc(OC(=O)C(=C)C)cc3)c2)c1]
RM-107

TABLE E-continued
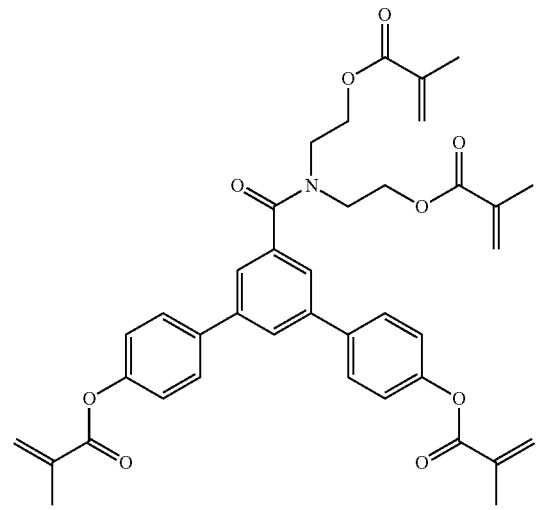 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
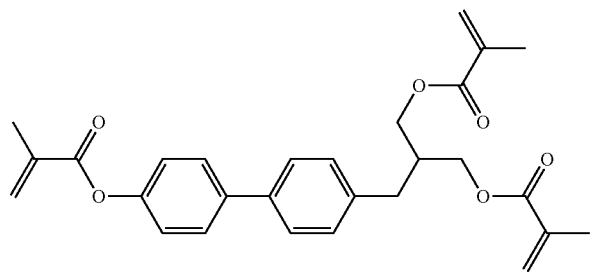 [SMILES: C=C(C)C(=O)OCC(COC(=O)C(=C)C)Cc1ccc(-c2ccc(OC(=O)C(=C)C)cc2)cc1]
RM-109
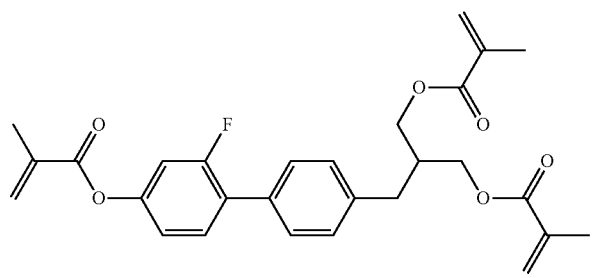
RM-110
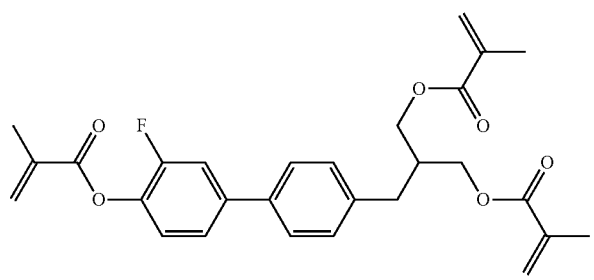 [SMILES: C=C(C)C(=O)OCC(COC(=O)C(=C)C)Cc1ccc(-c2ccc(OC(=O)C(=C)C)c(F)c2)cc1]
RM-111
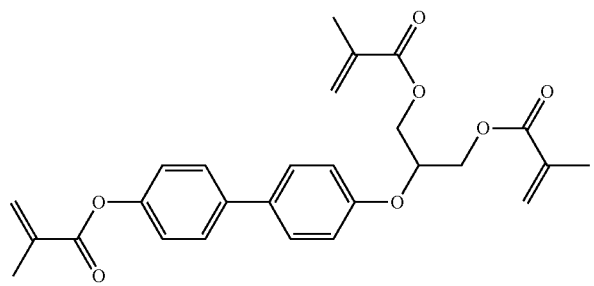 [SMILES: C=C(C)C(=O)OCC(COC(=O)C(=C)C)Oc1ccc(-c2ccc(OC(=O)C(=C)C)cc2)cc1]
RM-112

TABLE E-continued
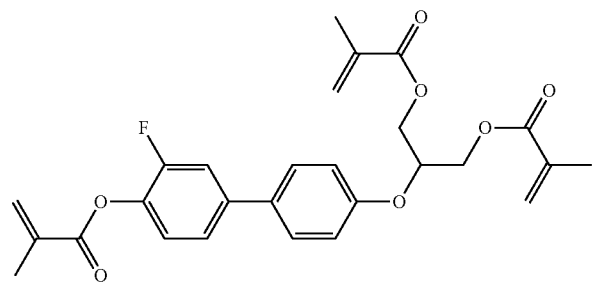 [SMILES: C=C(C)C(=O)OCC(COC(=O)C(=C)C)Oc1ccc(-c2ccc(OC(=O)C(=C)C)c(F)c2)cc1]
RM-113
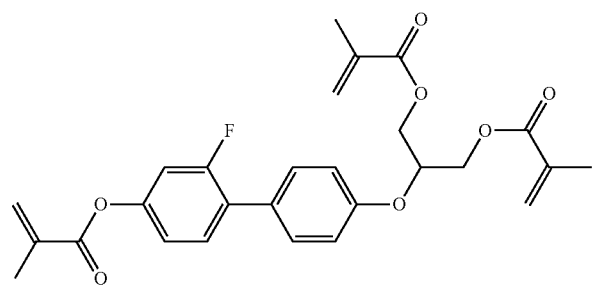 [SMILES: C=C(C)C(=O)OCC(COC(=O)C(=C)C)Oc1ccc(-c2ccc(OC(=O)C(=C)C)cc2F)cc1]
RM-114
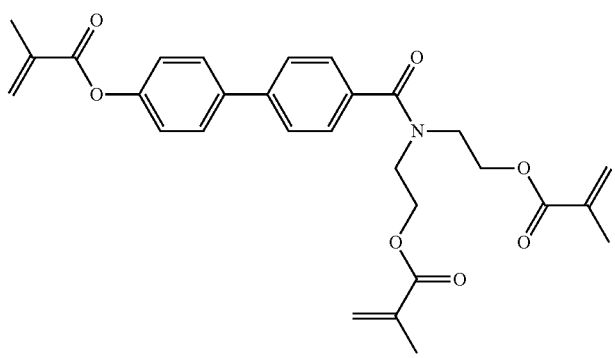 [SMILES: C=C(C)C(=O)OCCN(CCOC(=O)C(=C)C)C(=O)c1ccc(-c2ccc(OC(=O)C(=C)C)cc2)cc1]
RM-115
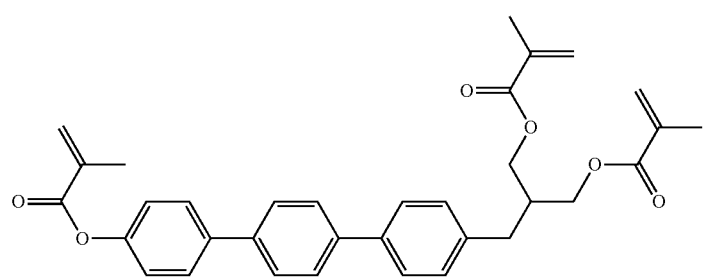 [SMILES: C=C(C)C(=O)OCC(COC(=O)C(=C)C)Cc1ccc(-c2ccc(-c3ccc(OC(=O)C(=C)C)cc3)c(F)c2)cc1]
RM-116
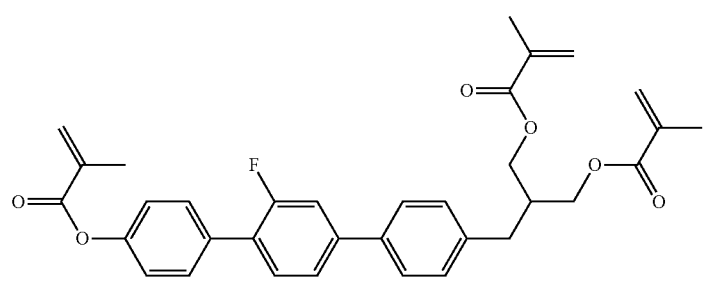
RM-117

TABLE E-continued
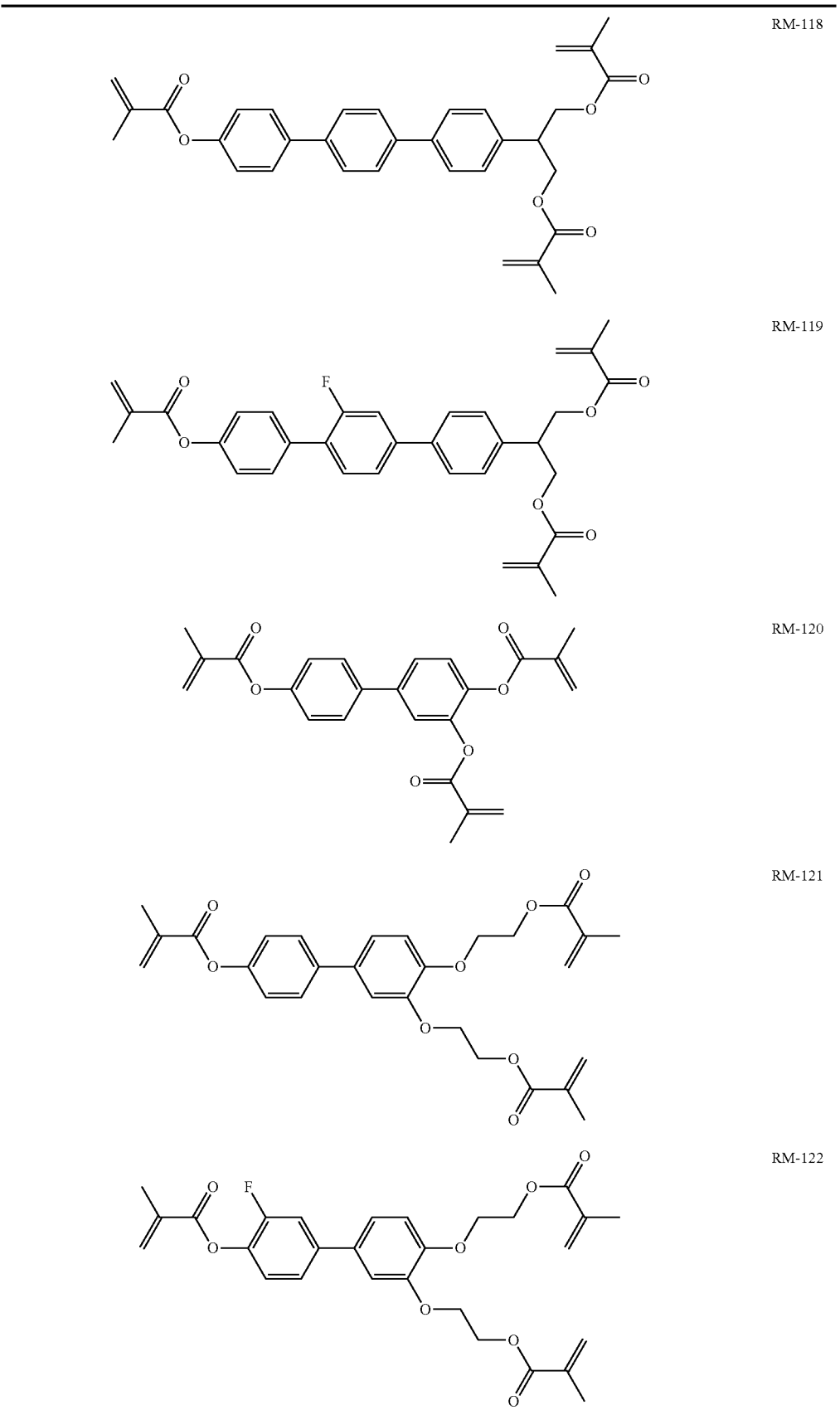
RM-118
RM-119
RM-120
RM-121
RM-122

TABLE E-continued
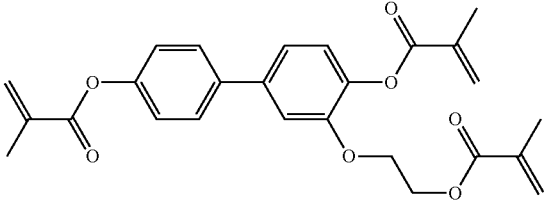 [SMILES: C=C(C)C(=O)OCCOc1cc(-c2ccc(OC(=O)C(=C)C)cc2)ccc1OC(=O)C(=C)C]
RM-123
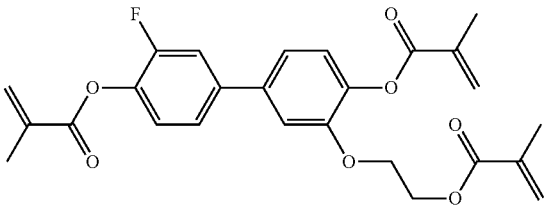 [SMILES: C=C(C)C(=O)OCCOc1cc(-c2ccc(OC(=O)C(=C)C)c(F)c2)ccc1OC(=O)C(=C)C]
RM-124
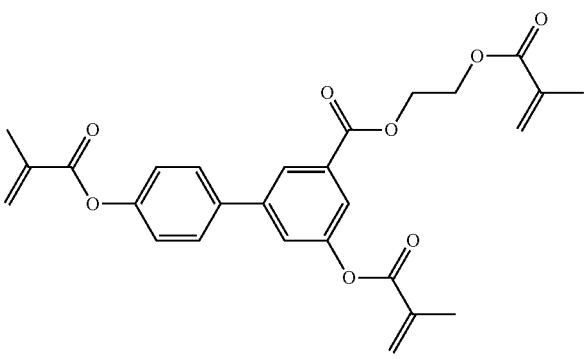 [SMILES: C=C(C)C(=O)OCCOC(=O)c1cc(OC(=O)C(=C)C)cc(-c2ccc(OC(=O)C(=C)C)cc2)c1]
RM-125
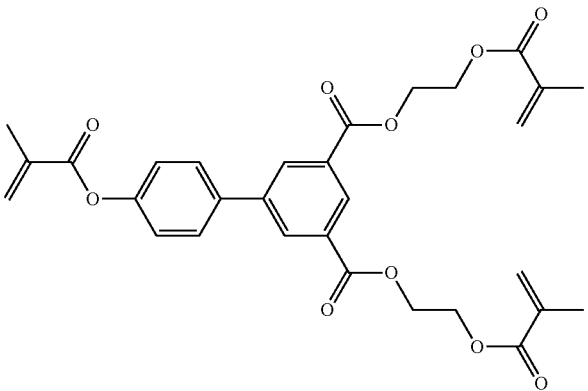 [SMILES: C=C(C)C(=O)OCCOC(=O)c1cc(C(=O)OCCOC(=O)C(=C)C)cc(-c2ccc(OC(=O)C(=C)C)cc2)c1]
RM-126
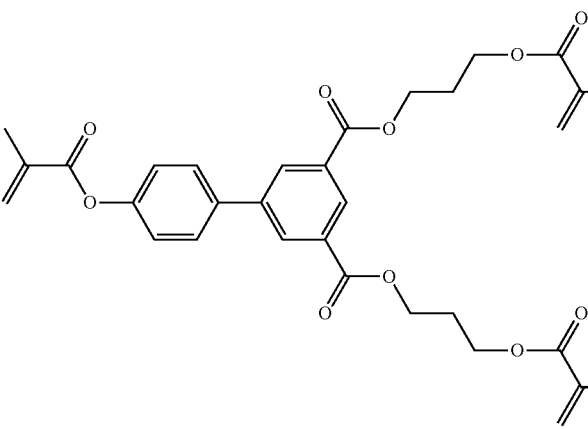
RM-127

TABLE E-continued
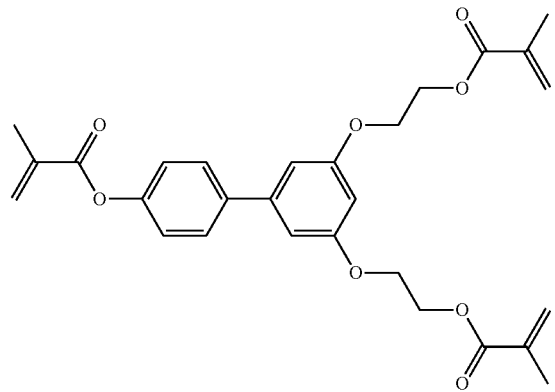 [SMILES: C=C(C)C(=O)OCCOc1cc(OCCOC(=O)C(=C)C)cc(-c2ccc(OC(=O)C(=C)C)cc2)c1]
RM-128
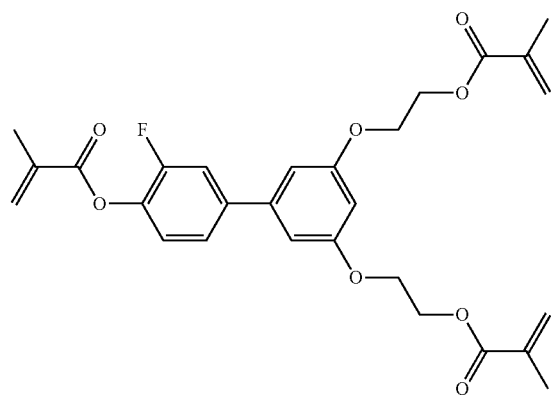 [SMILES: C=C(C)C(=O)OCCOc1cc(OCCOC(=O)C(=C)C)cc(-c2ccc(OC(=O)C(=C)C)c(F)c2)c1]
RM-129
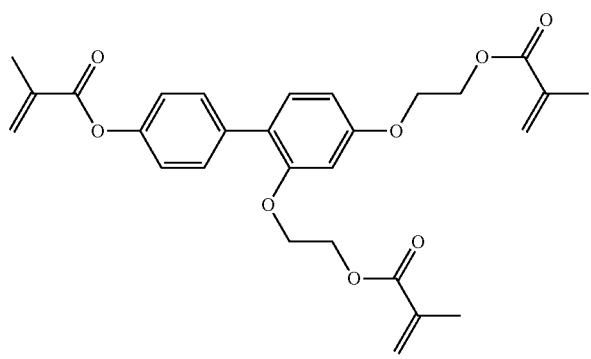 [SMILES: C=C(C)C(=O)OCCOc1ccc(-c2ccc(OC(=O)C(=C)C)cc2)c(OCCOC(=O)C(=C)C)c1]
RM-130
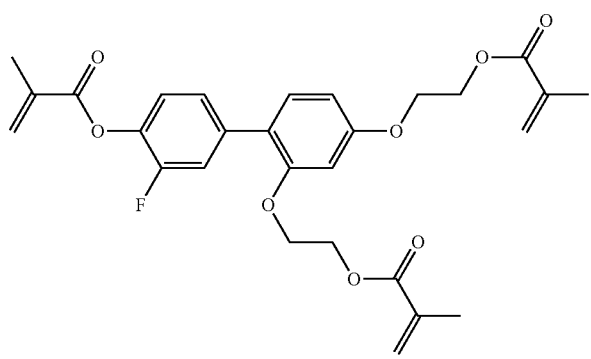 [SMILES: C=C(C)C(=O)OCCOc1ccc(-c2ccc(OC(=O)C(=C)C)c(F)c2)c(OCCOC(=O)C(=C)C)c1]
RM-131

TABLE E-continued
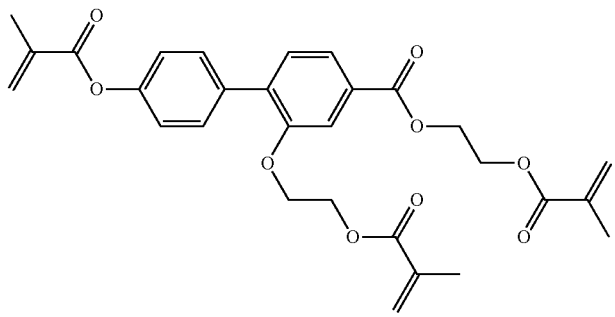 [SMILES: C=C(C)C(=O)OCCOC(=O)c1ccc(-c2ccc(OC(=O)C(=C)C)cc2)c(OCCOC(=O)C(=C)C)c1]
RM-132
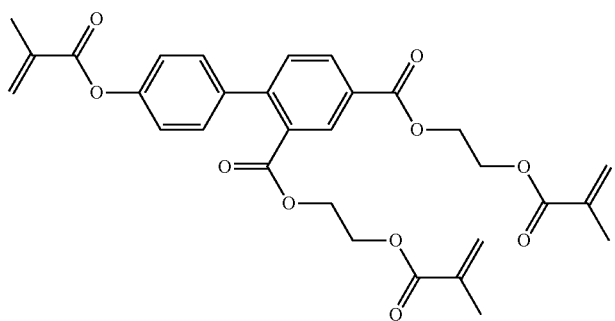 [SMILES: C=C(C)C(=O)OCCOC(=O)c1ccc(-c2ccc(OC(=O)C(=C)C)cc2)c(C(=O)OCCOC(=O)C(=C)C)c1]
RM-133
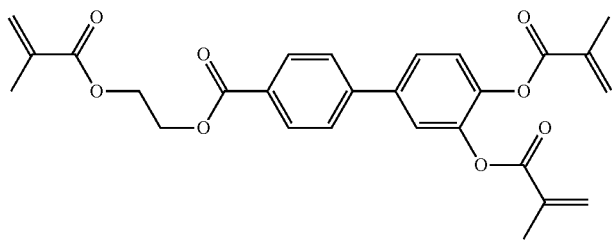 [SMILES: C=C(C)C(=O)OCCOC(=O)c1ccc(-c2ccc(OC(=O)C(=C)C)c(OC(=O)C(=C)C)c2)cc1]
RM-134
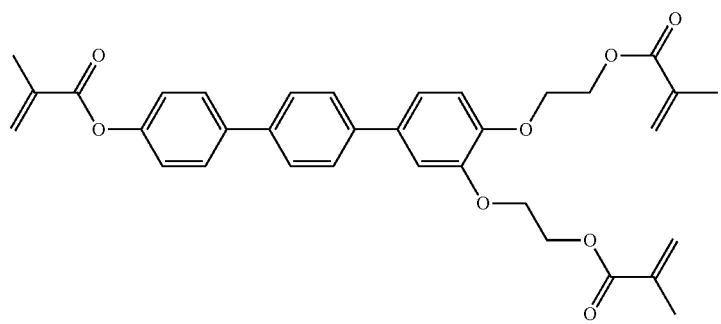
RM-135
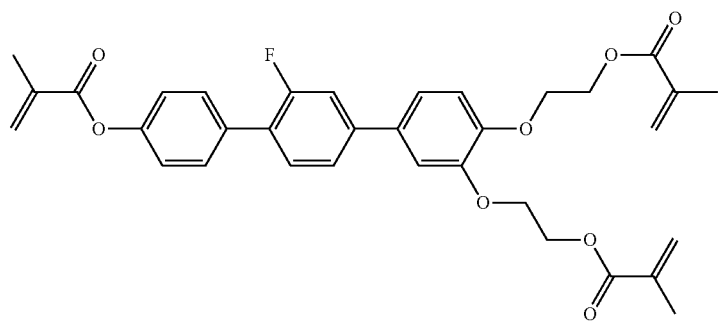 [SMILES: C=C(C)C(=O)OCCOc1ccc(-c2ccc(-c3ccc(OC(=O)C(=C)C)cc3)cc2)cc1OCCOC(=O)C(=C)C]
RM-136

TABLE E-continued
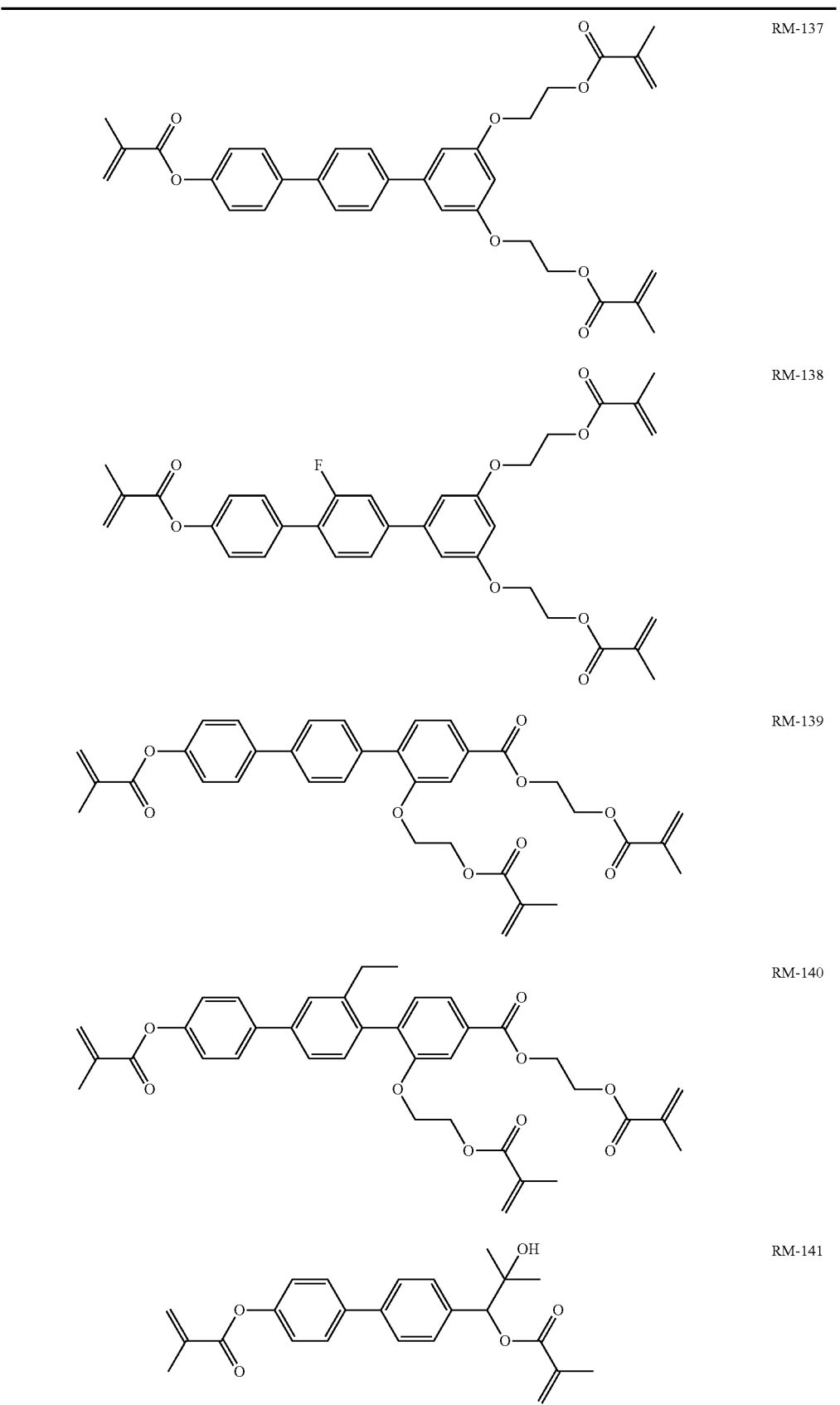

TABLE E-continued

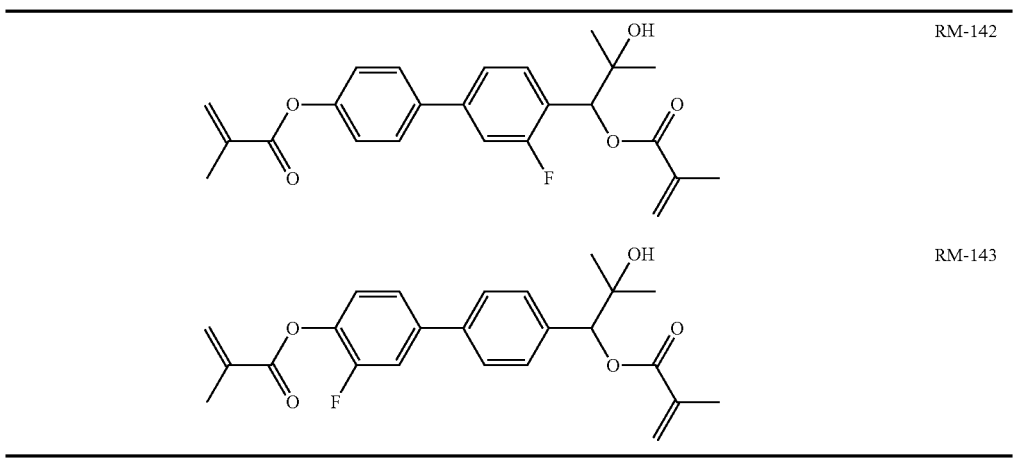

In a preferred embodiment, the LC media according to the invention comprise one or more polymerisable compounds, preferably selected from the polymerisable compounds of the formulae RM-1 to RM-143. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121 and RM-122 are particularly preferred.

Table E shows self-alignment additives for vertical alignment which can be used in LC media according to the present invention together with the polymerizable compounds of formula I:

TABLE E

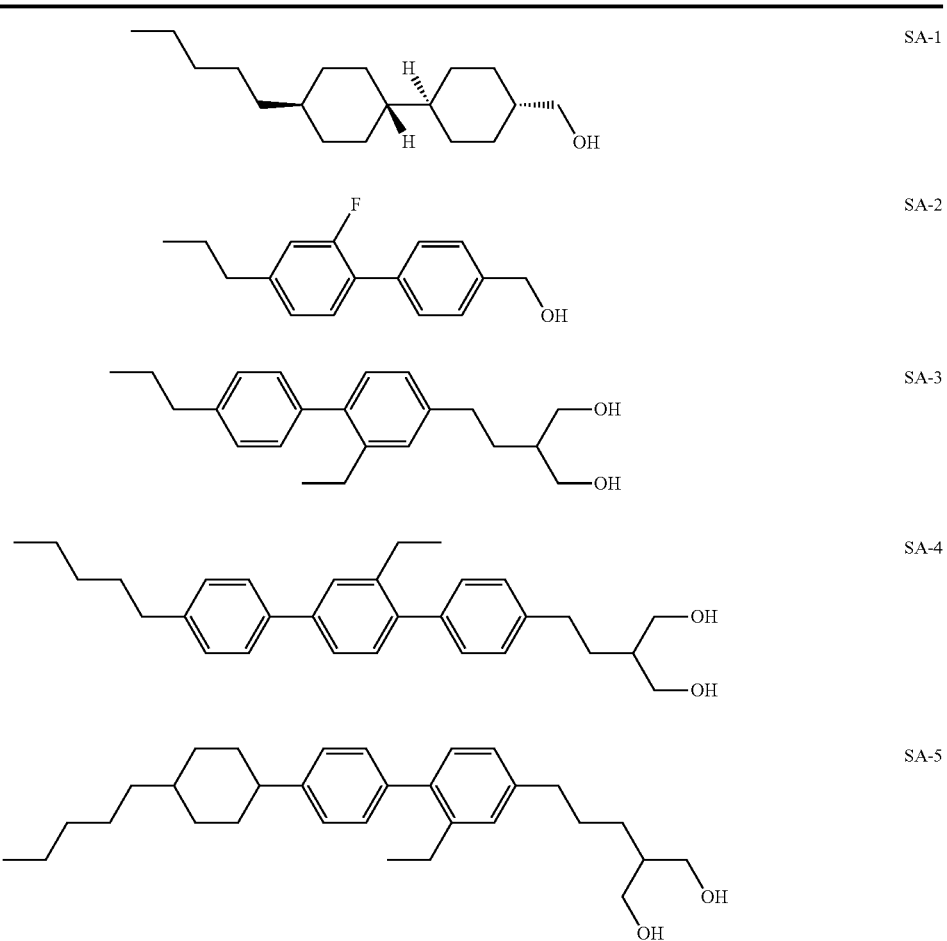

TABLE E-continued
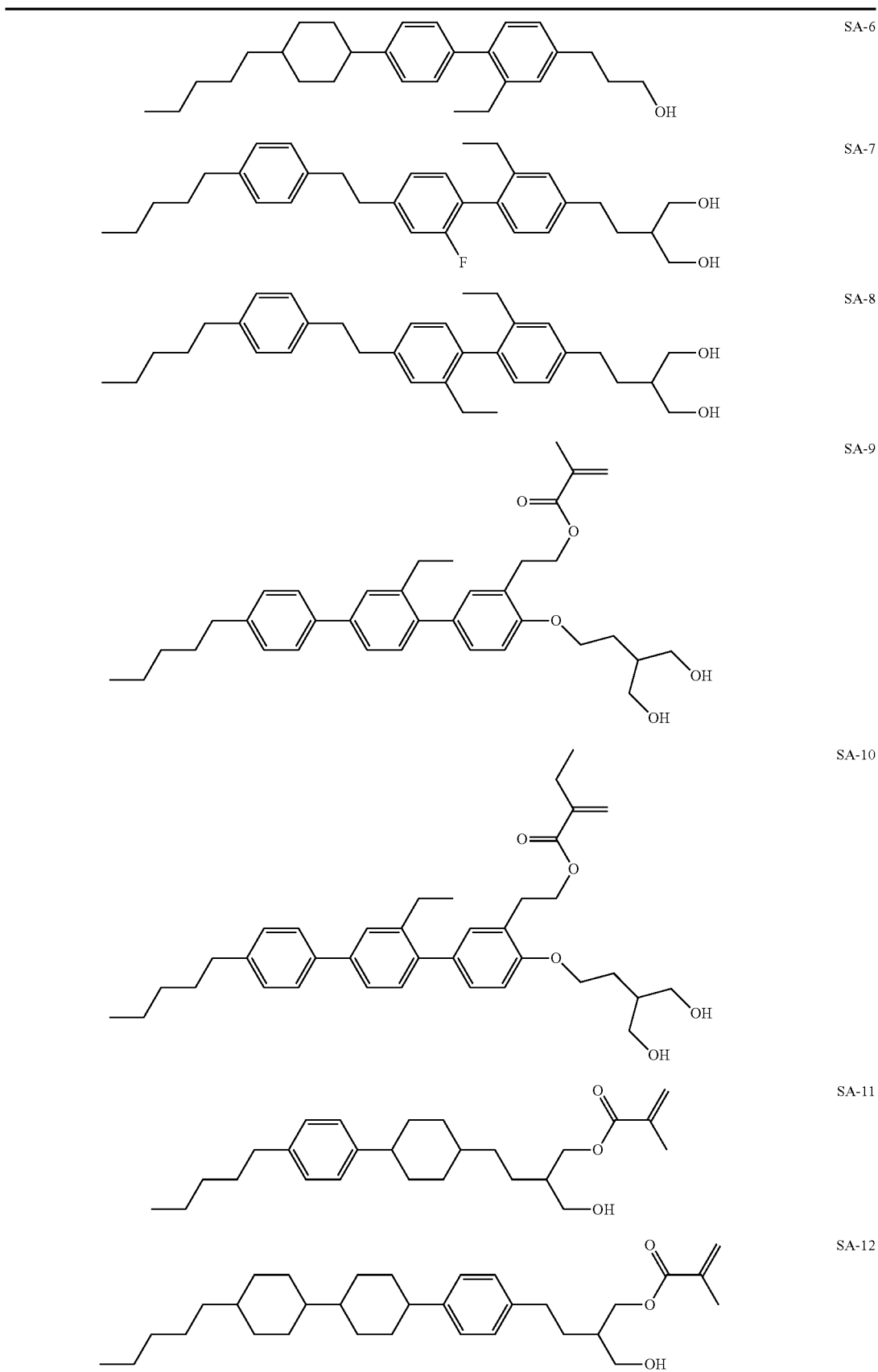

TABLE E-continued
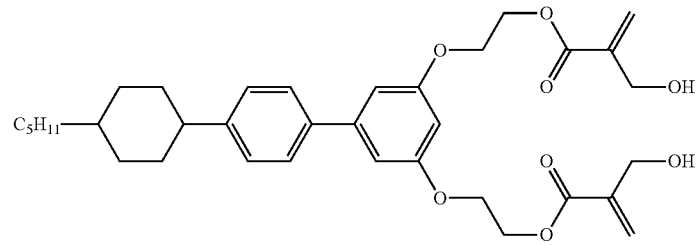
SA-13
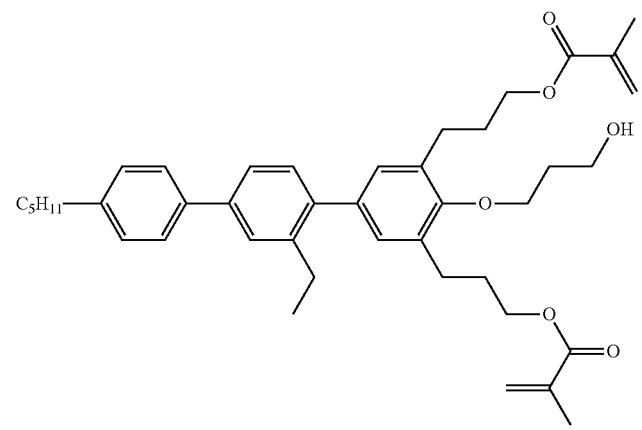
SA-14
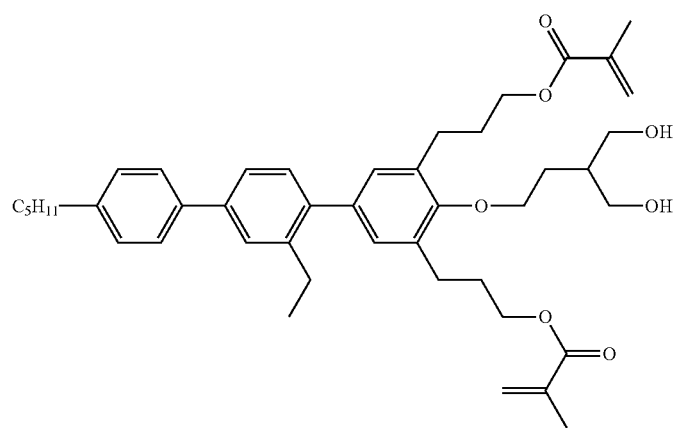
SA-15
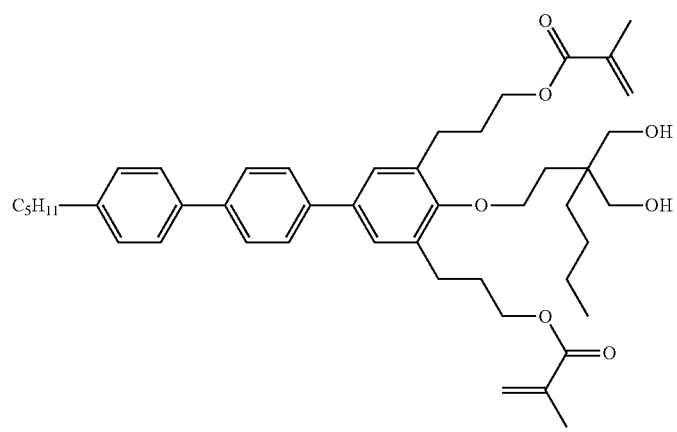
SA-16

TABLE E-continued
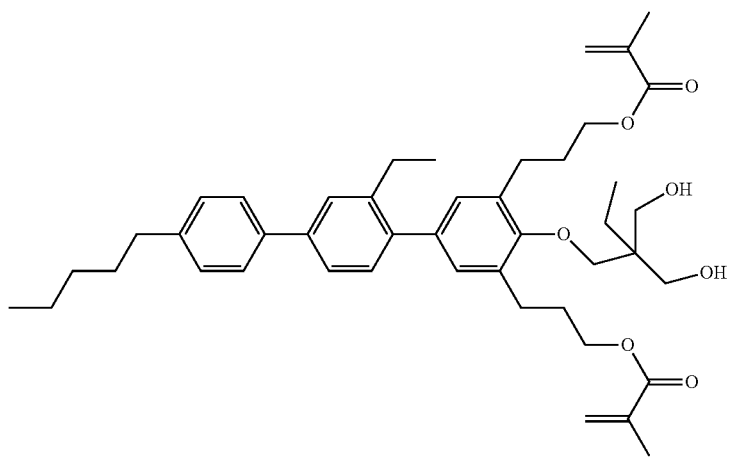 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-17
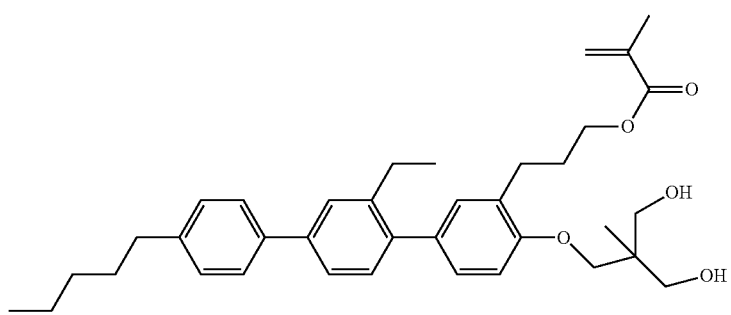 [SMILES: C=C(C)C(=O)OCCCc1cc(-c2ccc(-c3ccc(CCCCC)cc3)cc2CC)ccc1OCC(C)(CO)CO]
SA-18
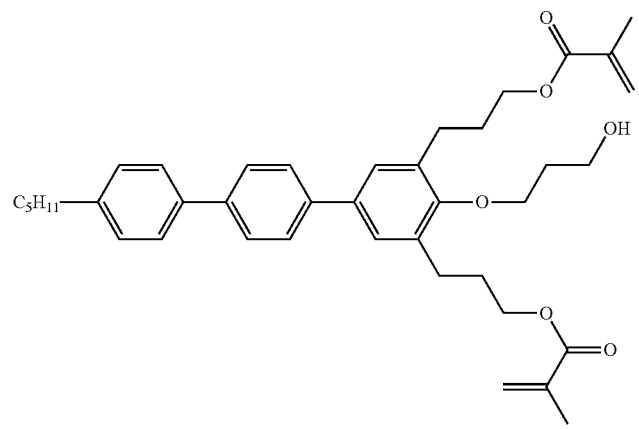
SA-19
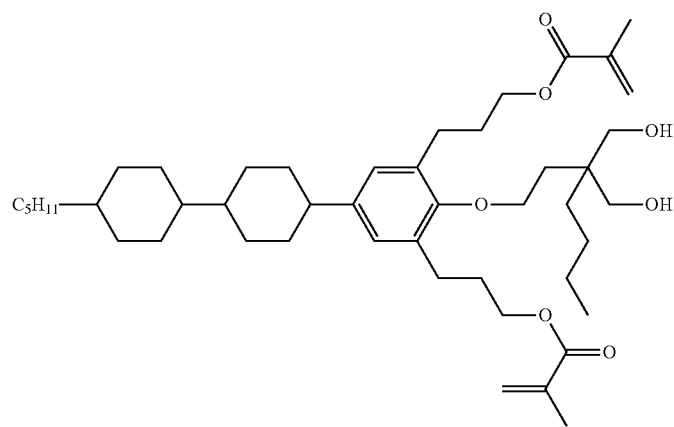
SA-20

TABLE E-continued
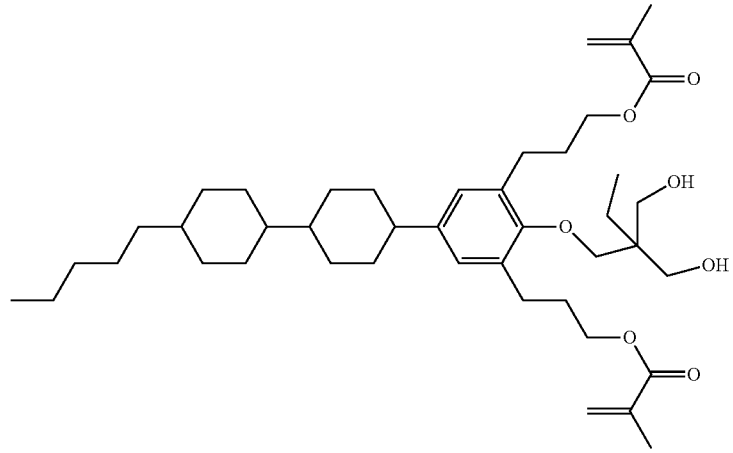 [SMILES: C=C(C)C(=O)OCCCc1cc(C2CCC(C3CCC(CCCCC)CC3)CC2)cc(CCCOC(=O)C(=C)C)c1OCC(CC)(CO)CO]
SA-21
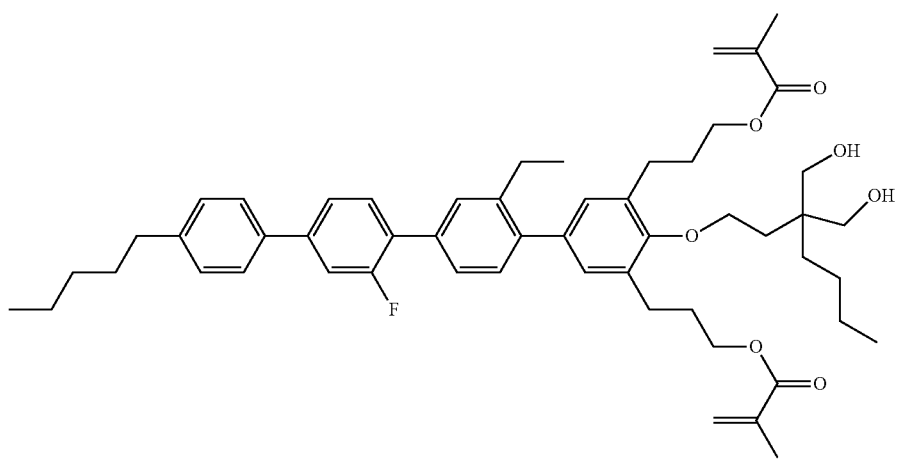 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-22
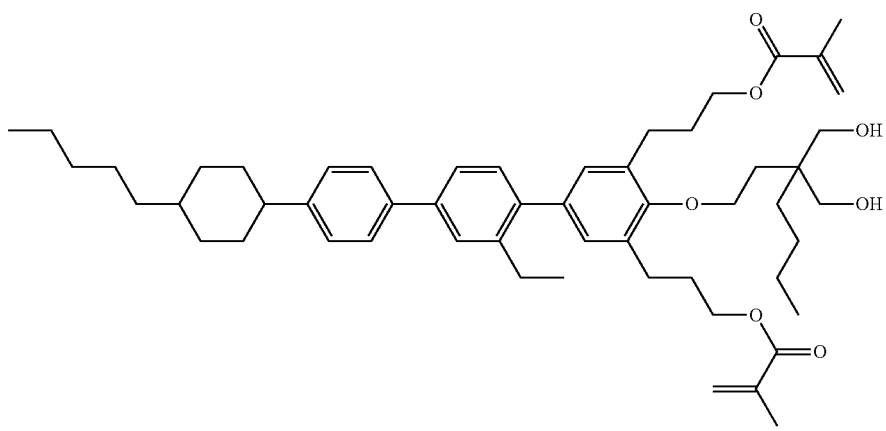 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-23

TABLE E-continued
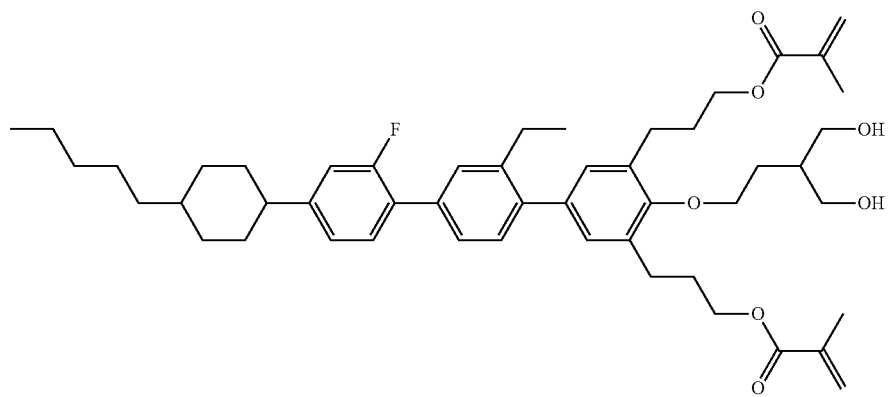 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-24
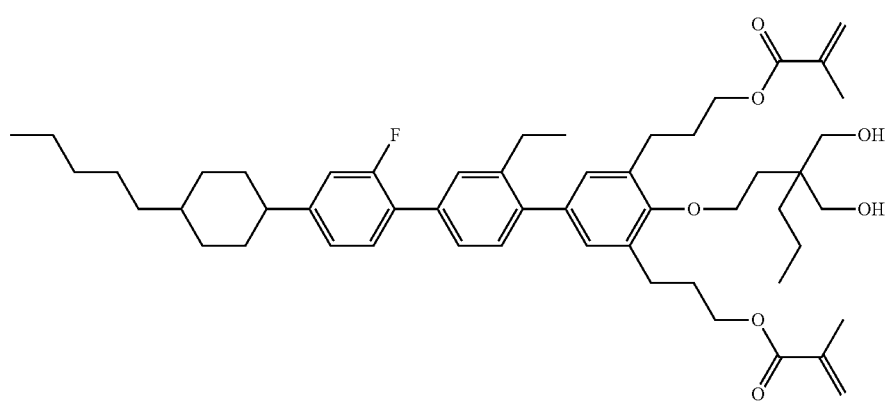 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-25
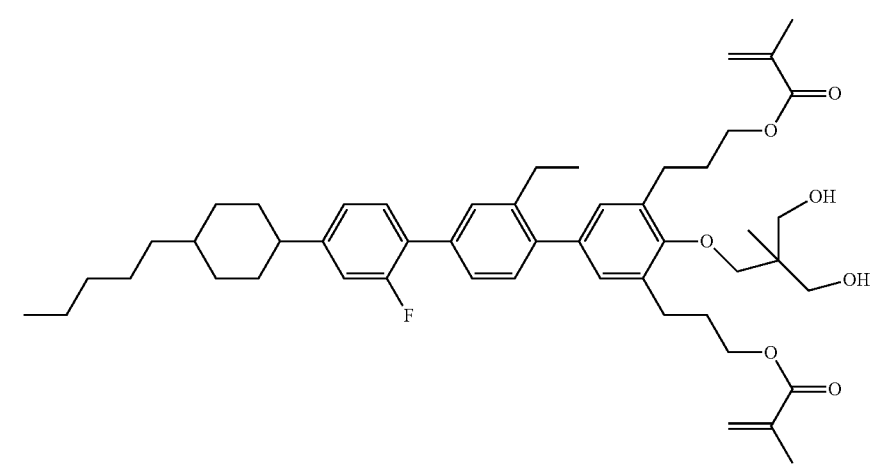 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-26

TABLE E-continued
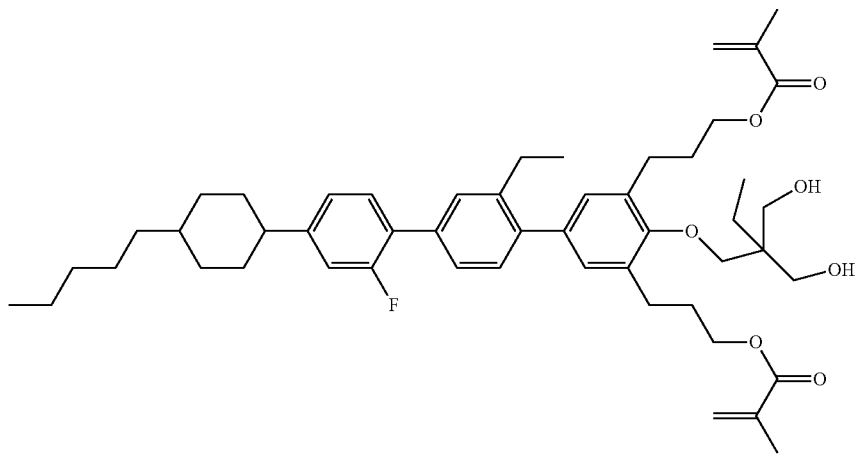
SA-27
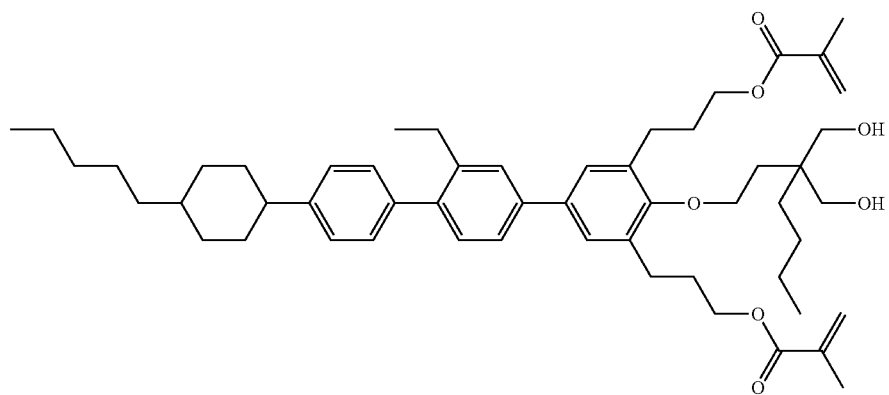 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-28
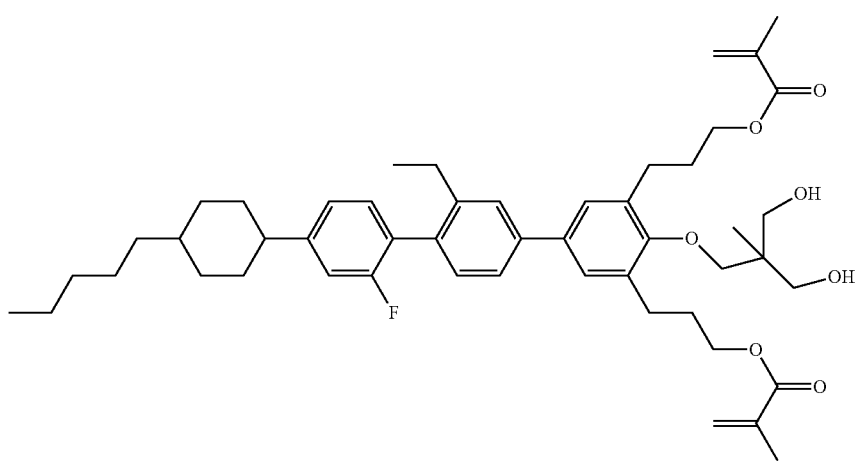 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]
SA-29

TABLE E-continued
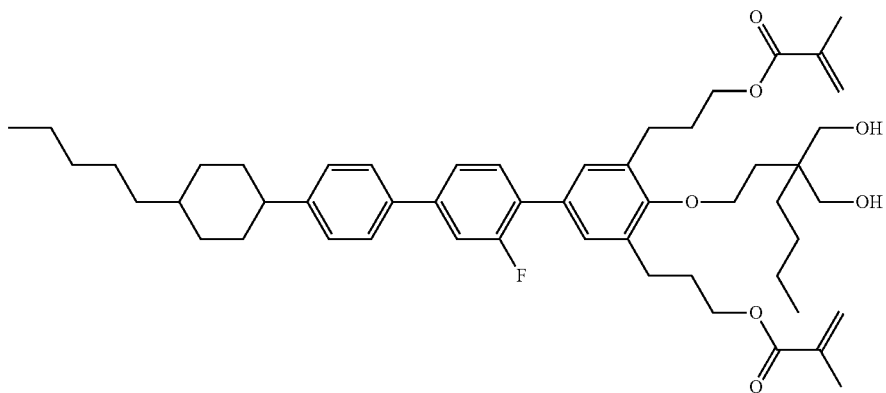 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-30
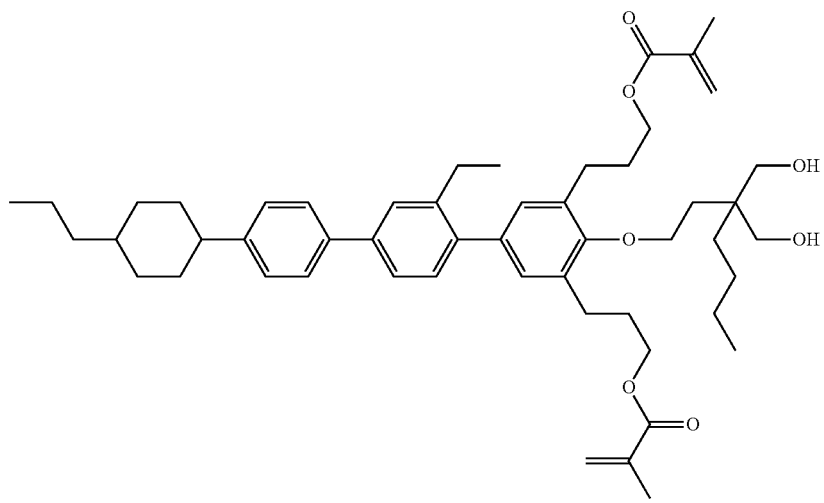 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-31
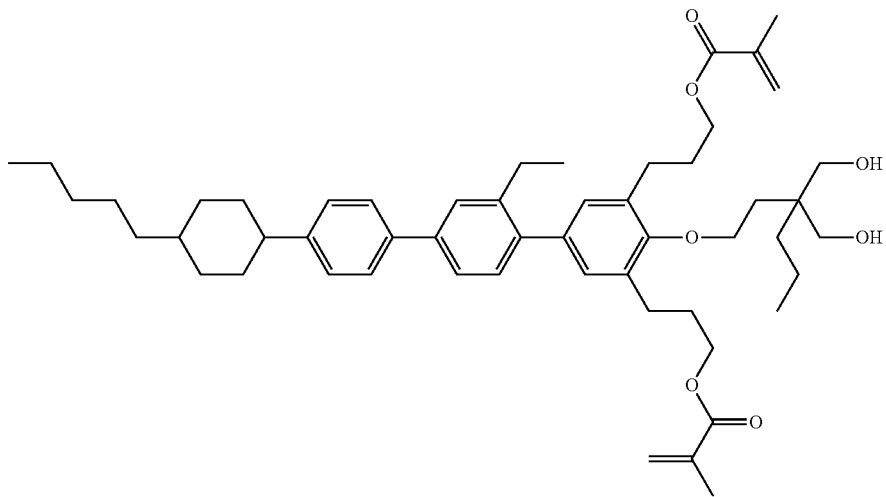 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]
SA-32

TABLE E-continued
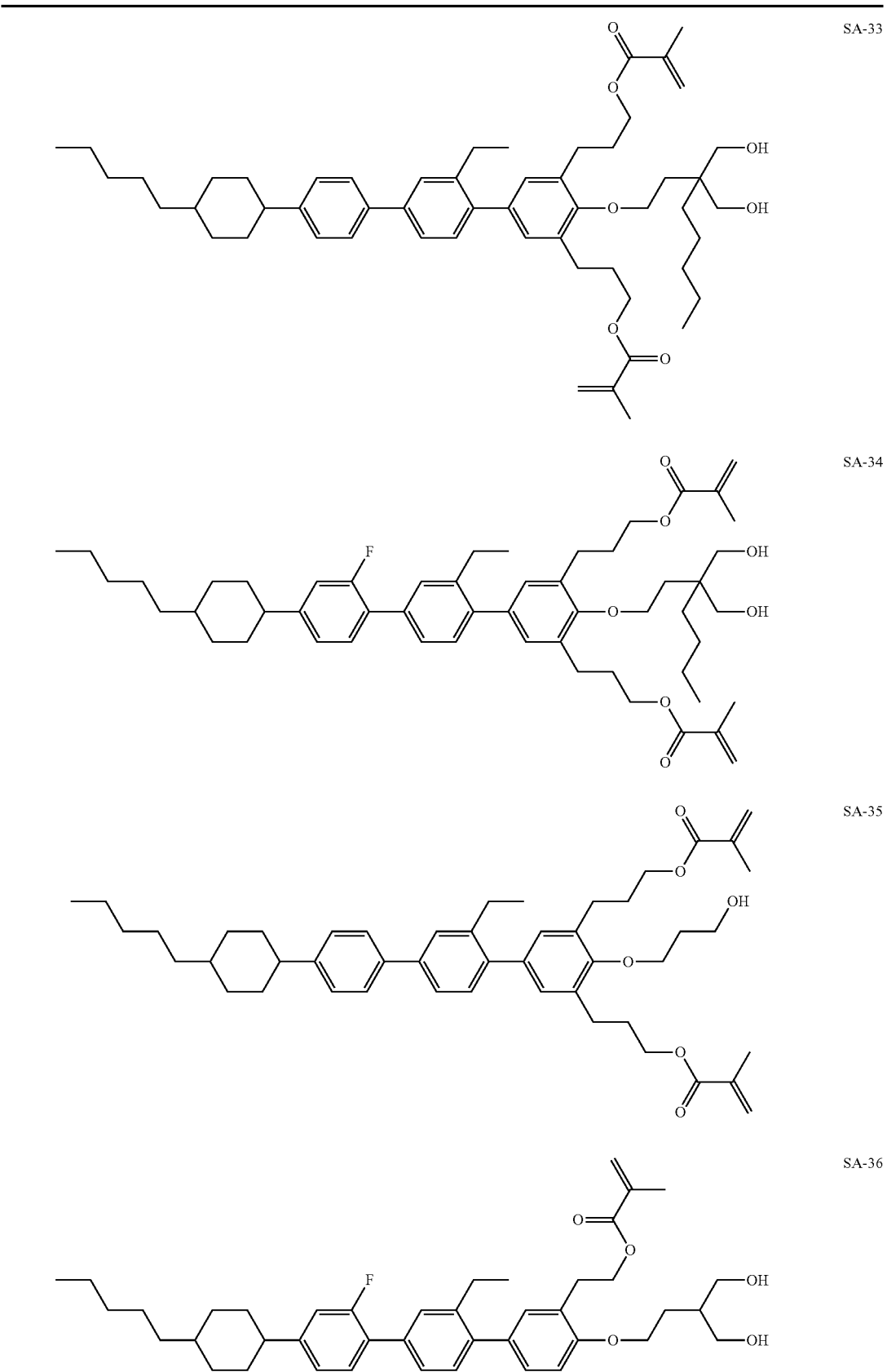

TABLE E-continued
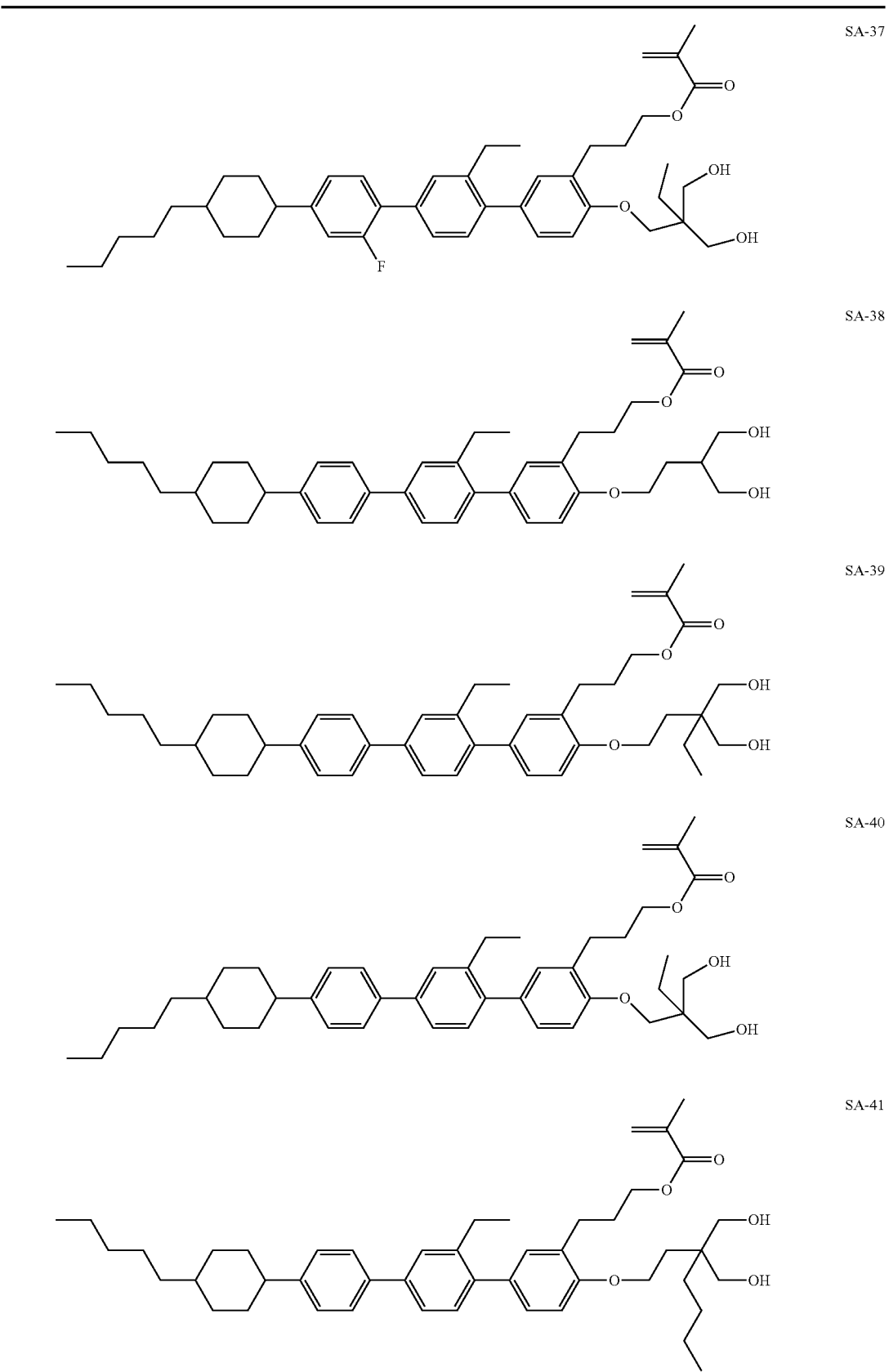
SA-37
SA-38
SA-39
SA-40
SA-41

TABLE E-continued
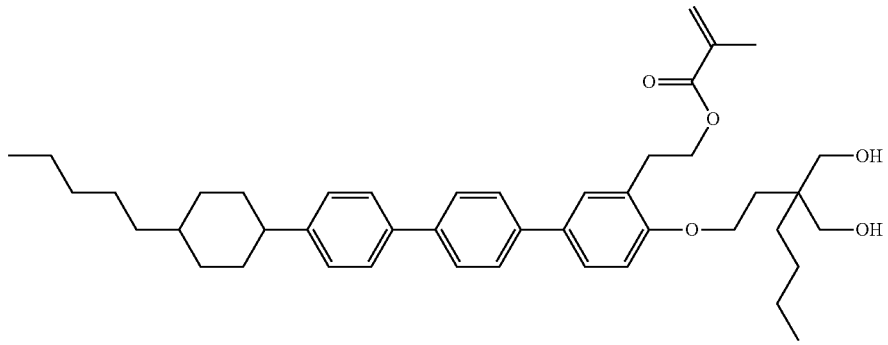 [SMILES: C=C(C)C(=O)OCCc1cc(-c2ccc(-c3ccc(C4CCC(CCCCC)CC4)cc3)cc2)ccc1OCCC(CO)(CO)CCCC]
SA-42
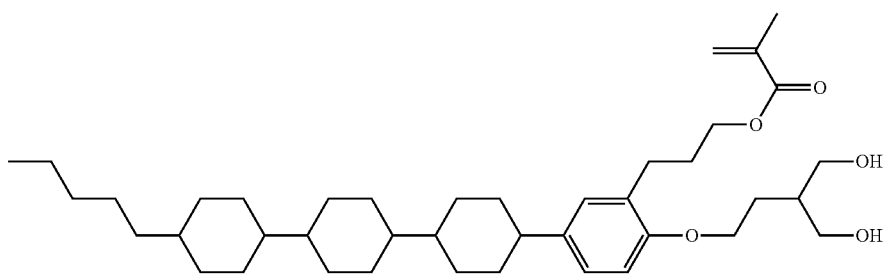 [SMILES: C=C(C)C(=O)OCCCc1cc(C2CCC(C3CCC(C4CCC(CCCCC)CC4)CC3)CC2)ccc1OCCC(CO)CO]
SA-43
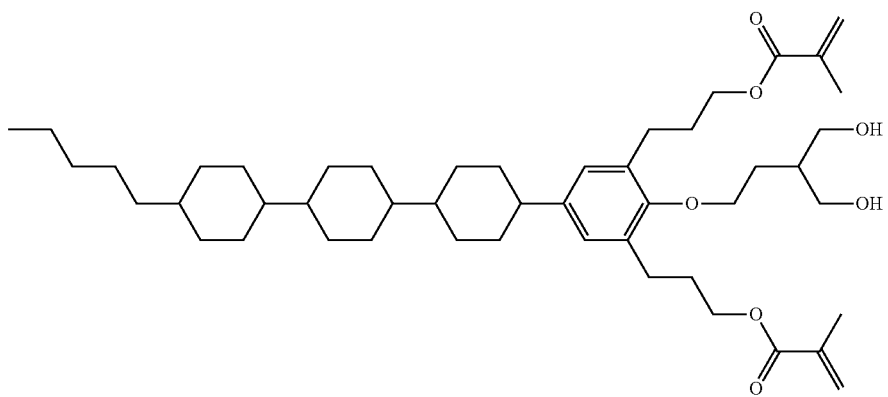 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO]
SA-44
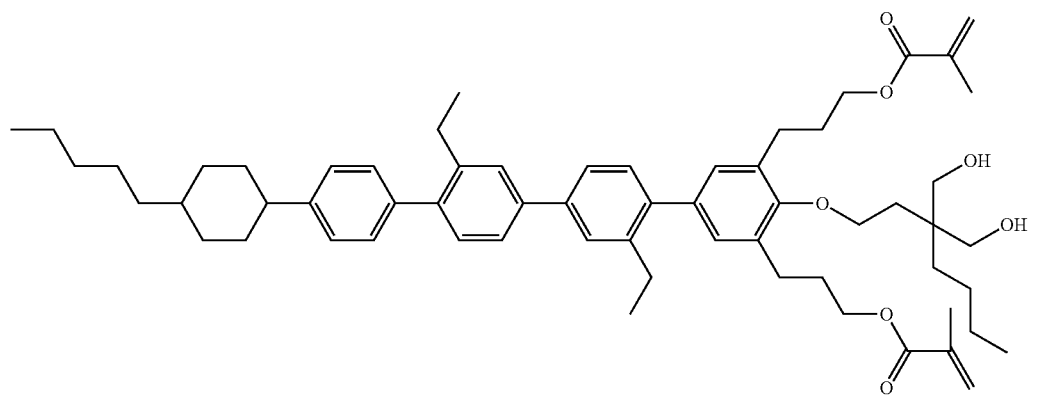 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]
SA-45

TABLE E-continued

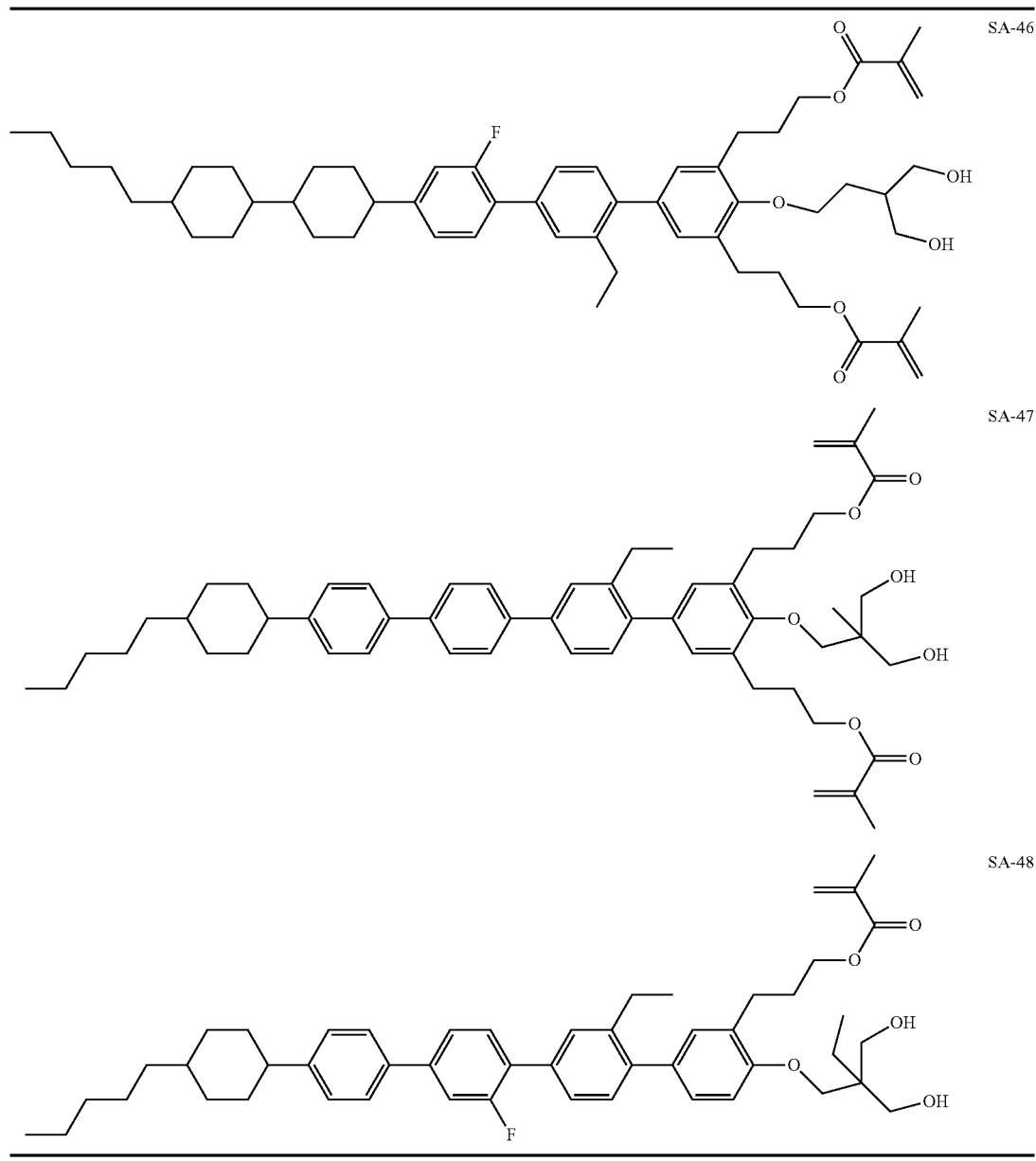

In a preferred embodiment, the LC media and displays according to the present invention comprise one or more SA additives selected from formulae SA-1 to SA-48, preferably from formulae SA-14 to SA-48, very preferably from formulae SA-20 to SA-34 and SA-48, preferably in combination with one or more RMs of formula M.

The following examples are intended to explain the invention without limiting it.

Above and below, unless explicitly noted otherwise, all percentage data denote percent by weight, and relate to the corresponding mixture as a whole, comprising all solid or liquid-crystalline components, without solvents. Furthermore, unless explicitly noted otherwise, all temperatures are indicated in in degrees Celsius (° C.). m.p. denotes melting point, cl.p.=clearing point. Furthermore, C=crystalline state, N=nematic phase, S=smectic phase and I=isotropic phase. The data between these symbols represent the transition temperatures.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., $T_{ni}$ clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

All physical properties are and have been determined in accordance with "Merck Liquid Crystals, Physical Properties of Liquid Crystals", Status November 1997, Merck KGaA, Germany, and apply for a temperature of 20° C. unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

COMPARISON EXAMPLE 1

The LC mixture C1 is formulated as follows:

| | | | |
|---|---|---|---|
| CDUQU-3-F | 6.0% | cl.p. | 110.1° C. |
| DPGU-4-F | 3.0% | Δn | 0.1108 |
| PGUQU-4-F | 7.0% | Δε | +5.8 |
| CCP-30CF3 | 8.0% | $\varepsilon_\parallel$ | 8.9 |
| CCP-40CF3 | 4.0% | $K_1$ | 17.7 |
| CCP-50CF3 | 3.0% | $K_3$ | 18.7 |
| CCP-V-1 | 18.0% | $K_3/K_1$ | 1.06 |
| CCP-V2-1 | 9.0% | $V_0$ | 1.84 V |
| CLP-3-T | 4.5% | $\gamma_1$ | 112 mPa·s |
| PGP-2-2V | 6.5% | LTS −20° C. | 1000 h |
| CC-3-V1 | 8.0% | | |
| CCH-301 | 10.0% | | |
| CCH-303 | 3.0% | | |
| PCH-301 | 10.0% | | |

To 99.95% of the mixture C1 are added 0.05% of the stabiliser S2-1:

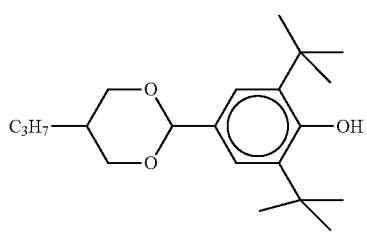

S2-1

To 99.85% of the resulting LC mixture are added 0.05% of the stabiliser S2-1 and 0.1% of the stabiliser S3-1 to give the mixture C11.

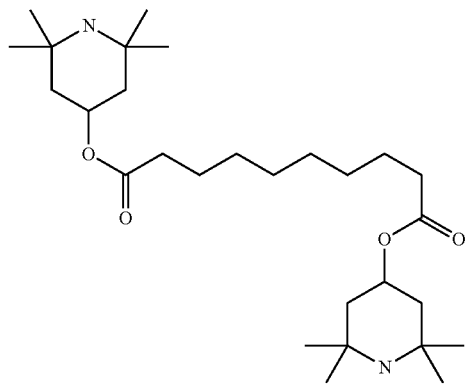

S3-1

EXAMPLE 1

The LC mixture N1 is formulated as follows:

| | | | |
|---|---|---|---|
| CPGP-5-2 | 1.0% | cl.p. | 110.5° C. |
| CPGU-3-OT | 1.5% | Δn | 0.1105 |
| CCG-V-F | 8.5% | Δε | +5.8 |
| CCP-3-1 | 5.0% | $\varepsilon_\parallel$ | 8.9 |
| CCP-3F•F•F | 10.0% | $K_1$ | 17.2 |
| CCP-V-1 | 16.0% | $K_3$ | 19.7 |
| CCP-V2-1 | 9.0% | $K_3/K_1$ | 1.14 |
| CCQU-2-F | 5.0% | $V_0$ | 1.82 V |
| CCQU-3-F | 10.0% | LTS −20° C. | 1000 h |
| CDU-2-F | 10.0% | | |
| PGP-2-2V | 5.5% | | |
| CC-3-V1 | 10.0% | | |
| PP-1-2V1 | 7.0% | | |
| PP-1-3 | 1.5% | | |

The mixture contains 1.0% of the compound CPGP-5-2 of formula I.

To 99.9% of the mixture N1 are added 0.1% of the stabiliser S3-1 to give the mixture N11.

EXAMPLE 2

The LC mixture N2 is formulated as follows:

| | | | |
|---|---|---|---|
| CPGP-5-2 | 1.0% | cl.p. | 109.7° C. |
| CPGU-3-OT | 2.5% | Δn | 0.1115 |
| DGUQU-4-F | 3.0% | Δε | +5.8 |
| CCG-V-F | 9.0% | $\varepsilon_\parallel$ | 8.8 |
| CCP-3-1 | 6.0% | $K_1$ | 17.2 |
| CCP-2F•F•F | 5.0% | $K_3$ | 19.4 |
| CCP-3F•F•F | 10.0% | $K_3/K_1$ | 1.13 |
| CCP-5F•F•F | 8.0% | $V_0$ | 1.81 V |
| CCP-V-1 | 16.0% | LTS −20° C. | 1000 h |
| CCP-V2-1 | 4.5% | | |
| CCQU-3-F | 10.0% | | |
| PGP-2-2V | 4.5% | | |
| CC-3-V1 | 11.0% | | |
| PP-1-2V1 | 4.5% | | |
| PP-1-3 | 5.0% | | |

The mixture contains 1.0% of the compound CPGP-5-2 of formula I.

To 99.9% of the mixture N2 are added 0.1% of the stabiliser S3-1 to give the mixture N22.

VHR Values

The VHR values of mixtures C11, N11 and N22 are measured at 100C, 3 Hz and 1V in VHR test cell before and after light exposure using a LED lamp.

The results are shown in Table 1.

TABLE 1

| VHR values before and after BL load, 3 Hz/100° C. | | | |
|---|---|---|---|
| | C11 | N11 | N22 |
| | | VHR/% | |
| Initial | 61.5 | 74.9 | 79.6 |
| After BL 144 h | 75.4 | 78.9 | 82.7 |

From Table 1 it can be seen that the mixtures N11 and N22 according to the present invention, which contain a compound of formula I, show significantly higher VHR values that mixture C11, both before and after backlight stress.

COMPARISON EXAMPLE 2

The LC mixture C2 is formulated as follows:

| | | | |
|---|---|---|---|
| CPGU-3-OT | 2.0% | cl.p. | 109.9° C. |
| DGUQU-4-F | 2.5% | $\Delta n$ | 0.1116 |
| CCG-V-F | 11.0% | $\Delta \varepsilon$ | +5.6 |
| CCP-3-1 | 5.0% | $\varepsilon_\parallel$ | 8.6 |
| CCP-3F•F•F | 10.0% | $K_1$ | 17.5 |
| CCP-5F•F•F | 8.0% | $K_3$ | 19.2 |
| CCP-V-1 | 12.0% | $K_3/K_1$ | 1.10 |
| CCP-V2-1 | 6.0% | $V_0$ | 1.85 V |
| CCQU-2-F | 5.0% | | |
| CCQU-3-F | 10.0% | | |
| PGP-2-2V | 8.0% | | |
| CC-3-2V1 | 2.5% | | |
| CC-3-V1 | 11.0% | | |
| PP-1-2V1 | 2.5% | | |
| PP-1-3 | 4.5% | | |

The mixture does not show satisfying LTS.

EXAMPLE 3

The LC mixture N3 is formulated as follows:

| | | | |
|---|---|---|---|
| CPGP-5-2 | 0.5% | cl.p. | 110.0° C. |
| CPGU-3-OT | 2.0% | $\Delta n$ | 0.1107 |
| DGUQU-4-F | 3.0% | $\Delta \varepsilon$ | +5.7 |
| CCG-V-F | 9.5% | $\varepsilon_\parallel$ | 8.7 |
| CCP-3-1 | 5.0% | $K_1$ | 17.6 |
| CCP-3F•F•F | 10.0% | $K_3$ | 19.2 |
| CCP-5F•F•F | 6.5% | $K_3/K_1$ | 1.09 |
| CCP-V-1 | 14.0% | $V_0$ | |
| CCP-V2-1 | 5.5% | | |
| CCQU-2-F | 6.0% | | |
| CCQU-3-F | 10.0% | | |
| PGP-2-2V | 6.5% | | |
| CC-3-2V1 | 3.0% | | |
| CC-3-V1 | 11.0% | | |
| PP-1-2V1 | 2.5% | | |
| PP-1-3 | 5.0% | | |

The mixture contains 0.5% of the compound CPGP-5-2 of formula I.

EXAMPLE 4

The LC mixture N4 is formulated as follows:

| | | | |
|---|---|---|---|
| CPGP-5-2 | 1.0% | cl.p. | 109.4° C. |
| CPGU-3-OT | 2.0% | $\Delta n$ | 0.1109 |
| DGUQU-4-F | 3.0% | $\Delta \varepsilon$ | +5.8 |
| CCG-V-F | 10.0% | $\varepsilon_\parallel$ | 8.7 |
| CCP-3-1 | 5.0% | $K_1$ | 17.5 |
| CCP-3F•F•F | 10.0% | $K_3$ | 19.4 |
| CCP-5F•F•F | 8.0% | $K_3/K_1$ | 1.11 |
| CCP-V-1 | 12.5% | $V_0$ | 1.83 V |
| CCP-V2-1 | 5.5% | LTS −20° C. | 1000 h |
| CCQU-2-F | 5.0% | | |
| CCQU-3-F | 10.0% | | |
| PGP-2-2V | 6.0% | | |
| CC-3-2V1 | 3.0% | | |
| CC-3-V1 | 11.0% | | |
| PP-1-2V1 | 3.0% | | |
| PP-1-3 | 5.0% | | |

The mixture contains 1.0% of the compound CPGP-5-2 of formula I, and shows good LTS at −20° C.

EXAMPLE 5

The LC mixture N5 is formulated as follows:

| | | | |
|---|---|---|---|
| CPGP-5-2 | 2.0% | cl.p. | 109.3° C. |
| CPGU-3-OT | 1.5% | $\Delta n$ | 0.1104 |
| DGUQU-4-F | 3.0% | $\Delta \varepsilon$ | +5.7 |
| CCG-V-F | 9.5% | $\varepsilon_\parallel$ | 8.7 |
| CCP-3-1 | 5.0% | $K_1$ | 17.5 |
| CCP-3F•F•F | 10.0% | $K_3$ | 19.3 |
| CCP-5F•F•F | 7.5% | $K_3/K_1$ | 1.10 |
| CCP-V-1 | 14.0% | $V_0$ | 1.84 V |
| CCP-V2-1 | 4.0% | LTS −20° C. | 1000 h |
| CCQU-2-F | 6.0% | | |
| CCQU-3-F | 10.0% | | |
| PGP-2-2V | 5.0% | | |
| CC-3-2V1 | 3.0% | | |
| CC-3-V1 | 11.0% | | |
| PP-1-2V1 | 3.5% | | |
| PP-1-3 | 5.0% | | |

The mixture contains 2.0% of the compound CPGP-5-2 of formula I, and shows good LTS at −20° C.

EXAMPLE 6

The LC mixture N6 is formulated as follows:

| | | | |
|---|---|---|---|
| CPGP-5-2 | 4.0% | cl.p. | 109.3° C. |
| CPGU-3-OT | 1.5% | $\Delta n$ | 0.1100 |
| DGUQU-4-F | 3.0% | $\Delta \varepsilon$ | +5.7 |
| CCG-V-F | 9.5% | $\varepsilon_\parallel$ | 8.7 |
| CCP-3-1 | 5.0% | $K_1$ | 17.5 |
| CCP-3F•F•F | 10.0% | $K_3$ | 19.6 |
| CCP-5F•F•F | 8.0% | $K_3/K_1$ | 1.12 |
| CCP-V-1 | 14.0% | $V_0$ | 1.83 V |
| CCP-V2-1 | 2.5% | LTS −20° C. | 1000 h |
| CCQU-2-F | 6.0% | LTS −30° C. | 1000 h |
| CCQU-3-F | 10.0% | | |
| PGP-2-2V | 2.5% | | |
| CC-3-2V1 | 3.0% | | |
| CC-3-V1 | 11.0% | | |
| PP-1-2V1 | 5.0% | | |
| PP-1-3 | 5.0% | | |

The mixture contains 4.0% of the compound CPGP-5-2 of formula I, and shows good LTS at −20° C. and −30° C.

EXAMPLE 7

The LC mixture N7 is formulated as follows:

| | | | |
|---|---|---|---|
| CPGP-5-2 | 6.0% | cl.p. | 110.0° C. |
| CPGU-3-OT | 1.5% | $\Delta n$ | 0.1094 |
| DGUQU-4-F | 2.0% | $\Delta \varepsilon$ | +5.8 |
| CCG-V-F | 10.0% | $\varepsilon_\parallel$ | 8.8 |
| CCP-3-1 | 4.5% | $K_1$ | 17.5 |
| CCP-3F•F•F | 10.0% | $K_3$ | 19.6 |
| CCP-5F•F•F | 9.5% | $K_3/K_1$ | 1.12 |
| CCP-V-1 | 6.0% | $V_0$ | 1.83 V |
| CCP-V2-1 | 6.5% | LTS −20° C. | 1000 h |
| CCQU-2-F | 8.0% | LTS −30° C. | 1000 h |
| CCQU-3-F | 10.0% | LTS −40° C. | 1000 h |
| PGP-2-2V | 1.5% | | |
| CC-3-2V1 | 4.0% | | |
| CC-3-V1 | 10.5% | | |
| PP-1-2V1 | 5.0% | | |
| PP-1-3 | 5.0% | | |

The mixture contains 6.0% of the compound CPGP-5-2 of formula I, and shows good LTS at −20° C., −30° C. and −40° C.

VHR values

The VHR values of mixtures C₂, N4, N5, N6 and N7 are measured at 60C, 60 Hz/3 Hz and 1V in VHR test cell before and after light exposure for varying using a LED lamp.

The results are shown in Tables 2 and 3.

TABLE 2

| VHR values before and after BL load, 60 Hz/60° C. | | | | | |
|---|---|---|---|---|---|
| | C2 | N4 | N5 | N6 | N7 |
| | | | VHR/% | | |
| Initial | 99.2 | 99.1 | 99.3 | 99.3 | 99.4 |
| After BL 24 h | 93.8 | 94.0 | 94.1 | 94.3 | 94.5 |
| After BL 120 h | 76.7 | 76.6 | 76.7 | 77.5 | 78.8 |

TABLE 3

| VHR values before and after BL load, 3 Hz/60° C. | | | | | |
|---|---|---|---|---|---|
| | C2 | N4 | N5 | N6 | N7 |
| | | | VHR/% | | |
| Initial | 93.0 | 93.6 | 94.5 | 94.4 | 94.8 |
| After BL 24 h | 70.7 | 71.0 | 72.3 | 73.6 | 74.8 |
| After BL 120 h | 21.6 | 21.7 | 22.0 | 23.0 | 24.5 |

From Tables 2 and 3 it can be seen that the mixtures N4-N7 according to the present invention, which contain a compound of formula I, show higher VHR values than mixture C₂ after backlight stress.

EXAMPLE 8

To 99.95% of the LC mixture of Example 7 are added 0.05% of stabiliser S1-1.

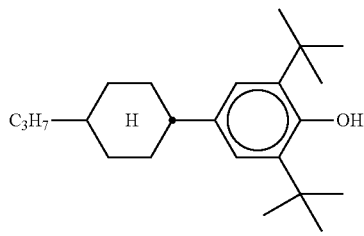

S1-1

EXAMPLE 9

To 99.65% of the LC mixture of Example 7 are added 0.05% of stabiliser S1-1 and 0.3% of the monomer RM-1.

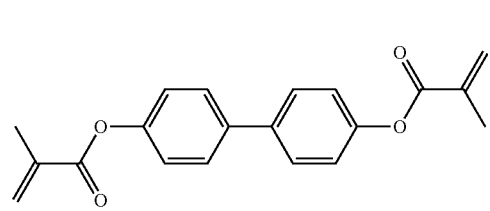

RM-1

EXAMPLE 10

To 99.7% of the LC mixture of Example 7 are added 0.3% of the monomer RM-35.

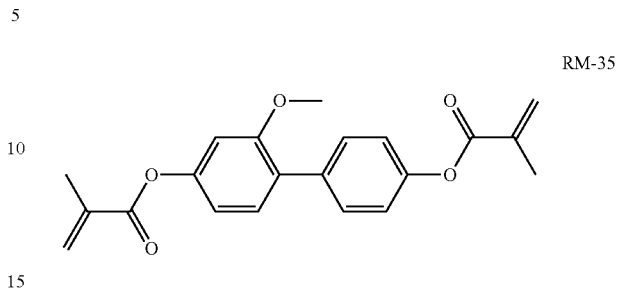

RM-35

EXAMPLE 11

To 99.65% of the LC mixture of Example 7 are added 0.05% of stabiliser S2-1 and 0.3% of the monomer RM-64.

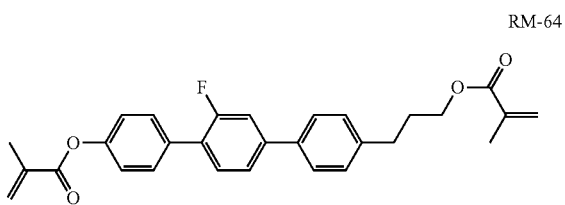 [SMILES: C=C(C)C(=O)OCCCc1ccc(-c2ccc(-c3ccc(OC(=O)C(=C)C)cc3)c(F)c2)cc1]

RM-64

EXAMPLE 12

To 99.7% of the LC mixture of Example 6 are added 0.3% of the monomer RM-120.

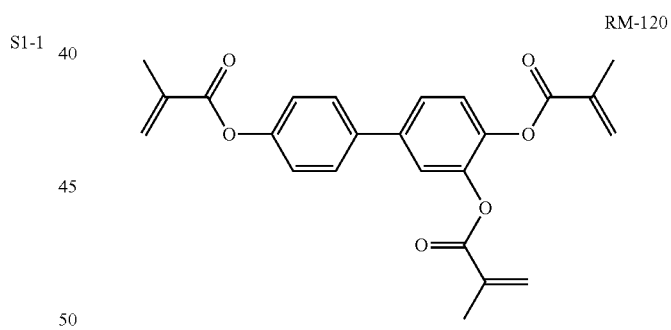

RM-120

EXAMPLE 13

To 99.699% of the LC mixture of Example 5 are added 0.3% of the monomer RM-19 and 0.001% of Irgacure 651®.

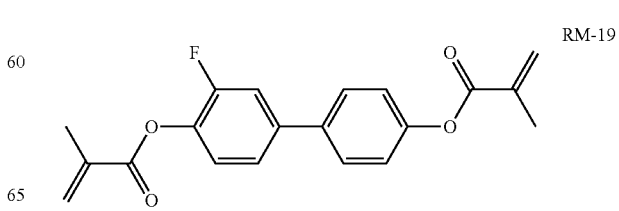

RM-19

EXAMPLE 14

To 99.7% of the LC mixture of Example 4 are added 0.3% of the monomer RM-121.

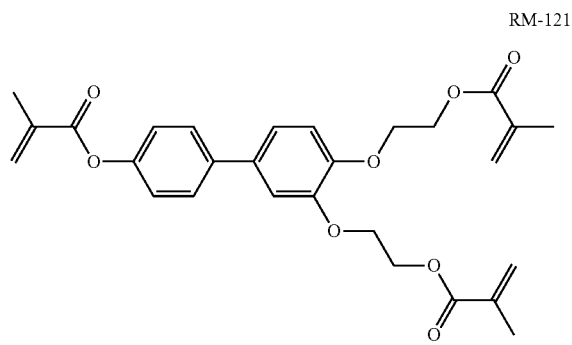 [SMILES: C=C(C)C(=O)OCCOc1ccc(-c2ccc(OC(=O)C(=C)C)cc2)cc1OCCOC(=O)C(=C)C]

RM-121

EXAMPLE 15

To 99.7% of the LC mixture of Example 6 are added 0.3% of the monomer RM-122.

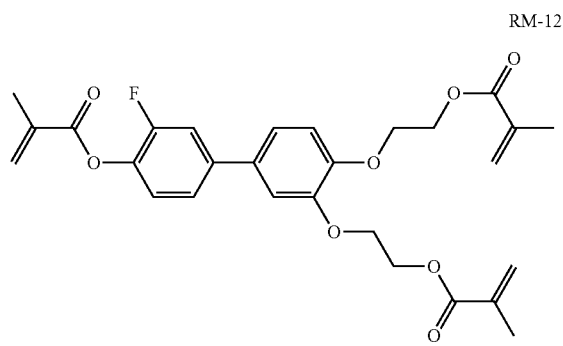

RM-122

EXAMPLE 16

To 99.7% of the LC mixture of Example 7 are added 0.3% of the monomer RM-91.

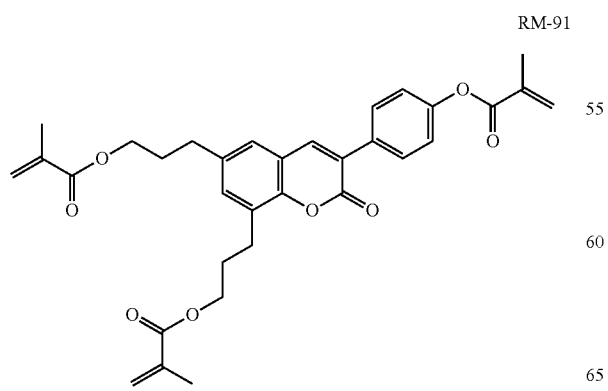

RM-91

EXAMPLE 17

To 99.98% of the LC mixture of Example 7 are added 0.02% of stabiliser S1-1.

EXAMPLE 18

To 99.99% of the LC mixture of Example 7 are added 0.01% of stabiliser S2-1.

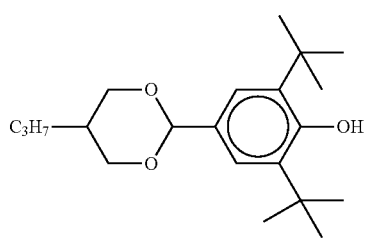

S2-1

EXAMPLE 19

To 99.98% of the LC mixture of Example 3 are added 0.02% of stabiliser stabiliser S3-1.

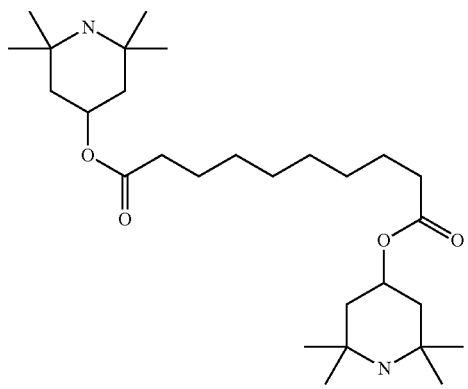

S3-1

EXAMPLE 20

To 99.95% of the LC mixture of Example 6 are added 0.05% of stabiliser S3-2.

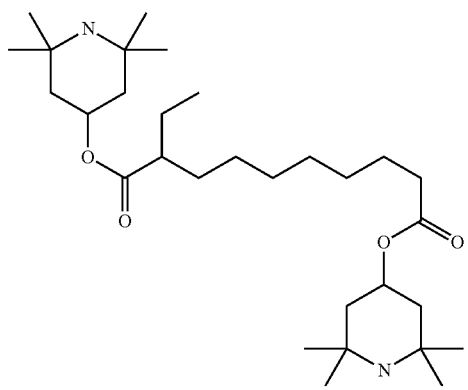

S3-2

EXAMPLE 21

To 99.98% of the LC mixture of Example 7 are added 0.02% of stabiliser S3-3.

S3-3

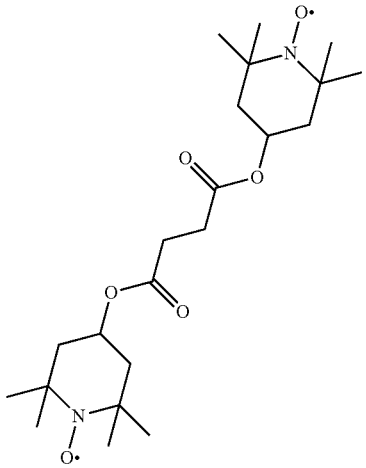

EXAMPLE 22

To 99.7% of the LC mixture of Example 4 are added 0.3% of the monomer RM-39.

RM-39

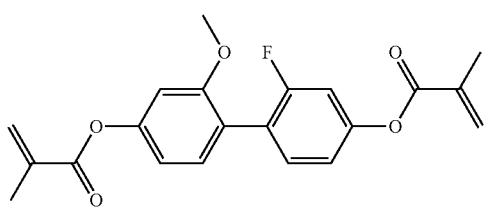

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding European Application No. EP 19183112.2, filed Jun. 28, 2019, are incorporated by reference herein.

The invention claimed is:

1. An LC medium with positive dielectric anisotropy, wherein said LC medium has a clearing point ≥105° C. and a birefringence from 0.10 to 0.13, and comprises at least one compound of formula I in a total concentration of said at least one compound of formula I of >0 and ≤10%

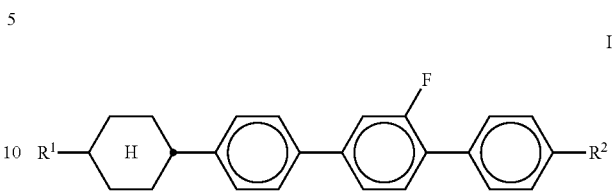

in which
$R^1$ and $R^2$ independently of each other denote alkyl having 1 to 6 C atoms,
and
at least one compound of formula XII

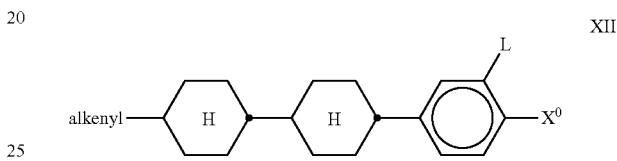

in which
$X^0$ is F, Cl, CN, SF$_5$, SCN, NCS, a halogenated alkyl radical, a halogenated alkenyl radical, a halogenated alkoxy radical or a halogenated alkenyloxy radical having up to 6 C atoms,
"alkenyl" denote C$_{2-6}$-alkenyl, and
L denotes H or F.

2. An LC medium with positive dielectric anisotropy, comprising
at least one compound of formula I in a total concentration of said at least one compound of formula I of >0 and ≤10%

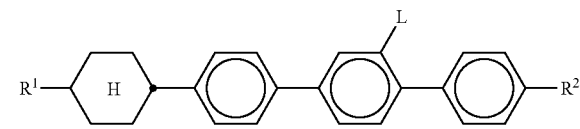

in which
$R^1$ and $R^2$ independently of each other denote alkyl having 1 to 6 C atoms,
and
at least one compound of formula XII

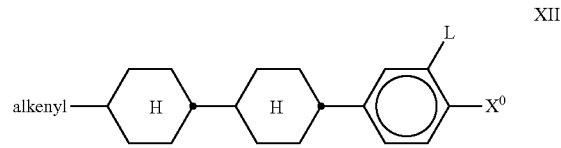

in which
$X^0$ is F, Cl, CN, SF$_5$, SCN, NCS, a halogenated alkyl radical, a halogenated alkenyl radical, a halogenated alkoxy radical or a halogenated alkenyloxy radical having up to 6 C atoms, "alkenyl" denote $C_{2-6}$-alkenyl, and
L denotes H or F
and
at least one compound of the following formulae III6, III9, III20 and/or III21

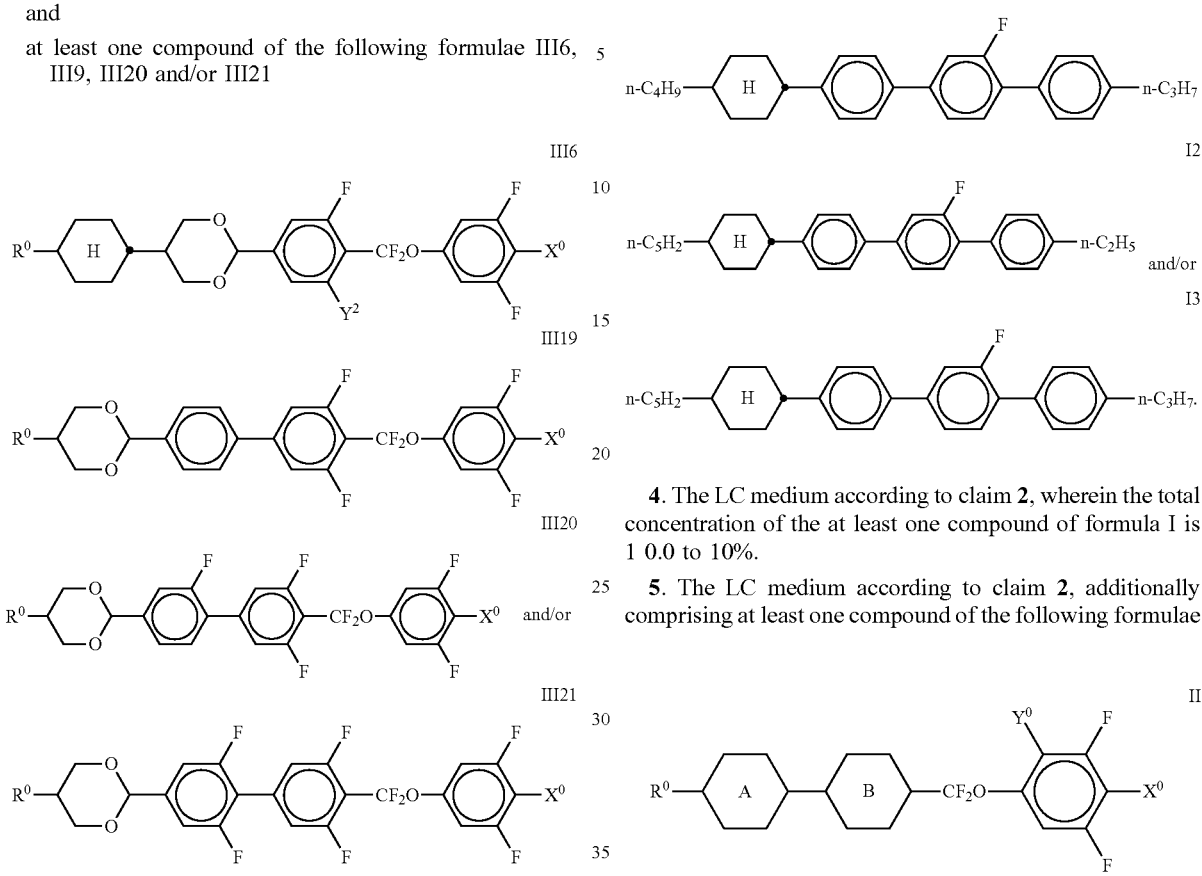

III6

III19

III20

III21 in which
R⁰ is an unsubstituted or halogenated alkyl or alkoxy radical having 1 to 15 C atoms, in which one or more CH₂ groups are each optionally replaced, independently of one another, by —C≡C—, —CF₂O—, —CH=CH—,

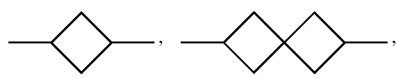

—O—, —CO—O— or —O—CO— in such a way that O atoms are not linked directly to one another, or denotes

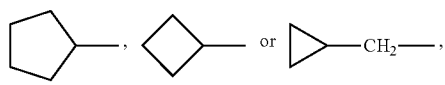

X⁰ is F, Cl, CN, SF₅, SCN, NCS, a halogenated alkyl radical, a halogenated alkenyl radical, a halogenated alkoxy radical or a halogenated alkenyloxy radical having up to 6 C atoms, and
Y² is H or F.

3. The LC medium according to claim 2, wherein the at least one compound of formula I are one or more of the following formulae

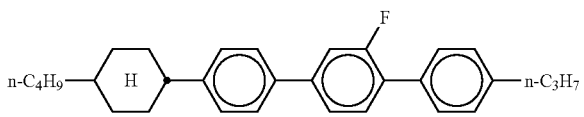

I1

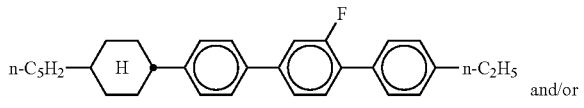

I2 and/or

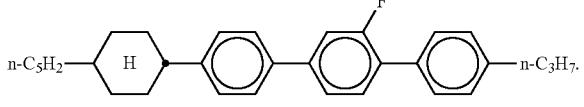

I3

4. The LC medium according to claim 2, wherein the total concentration of the at least one compound of formula I is 1 0.0 to 10%.

5. The LC medium according to claim 2, additionally comprising at least one compound of the following formulae

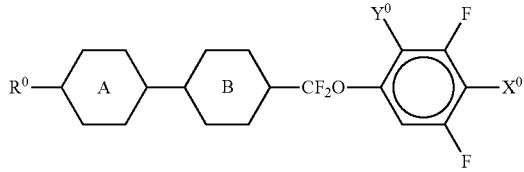

II

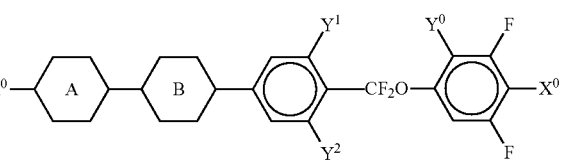

III wherein the individual radicals, independently of each other and on each occurrence identically or differently, have the following meanings

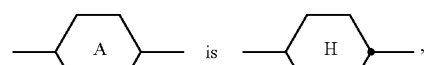

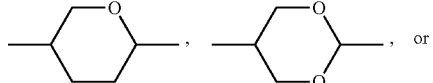

is

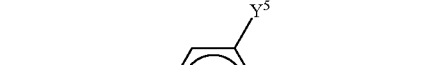

,

,

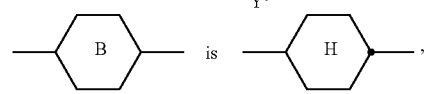

, or

is

-continued

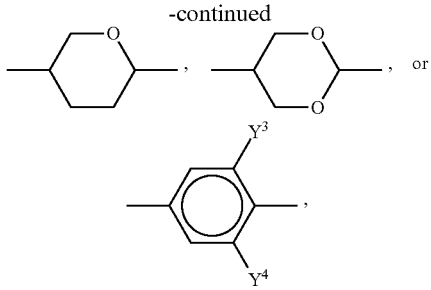

R⁰ is an unsubstituted or halogenated alkyl or alkoxy radical having 1 to 15 C atoms, in which one or more CH₂ groups are each optionally replaced, independently of one another, by —C≡C—, —CF₂O—, —CH=CH—,

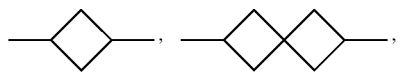

—O—, —CO—O— or —O—CO— in such a way that O atoms are not linked directly to one another, or denotes

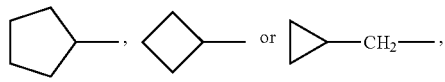

X⁰ is F, Cl, CN, SF₅, SCN, NCS, a halogenated alkyl radical, a halogenated alkenyl radical, a halogenated alkoxy radical or a halogenated alkenyloxy radical having up to 6 C atoms,
Y⁰ is H or CH₃, and
Y¹⁻⁶ is H or F.

6. The LC medium according to claim 2, further comprising at least one compound of the following formulae

II1

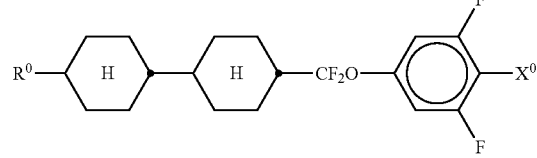

II2

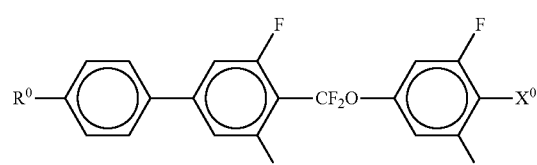

II3

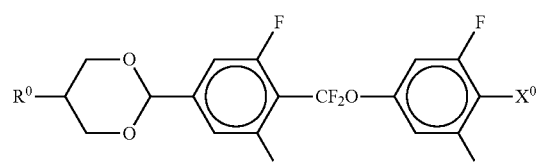

-continued

II4

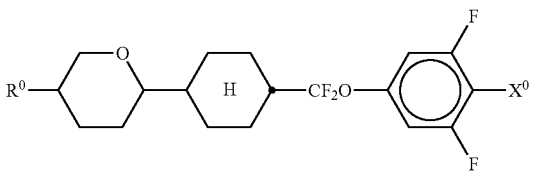

II5

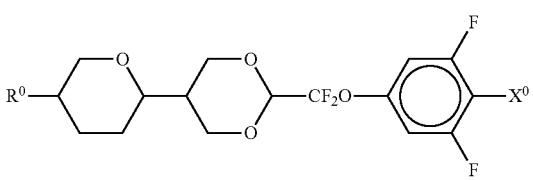

II6

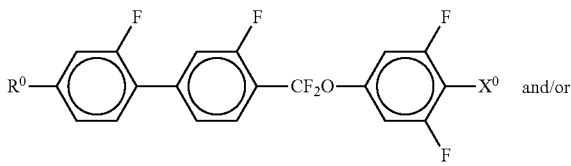

and/or

II7

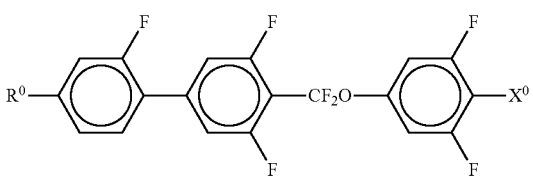

in which
R⁰ is an unsubstituted or halogenated alkyl or alkoxy radical having 1 to 15 C atoms, in which one or more CH₂ groups are each optionally replaced, independently of one another, by —C≡C—, —CF₂O—, —CH=CH—,

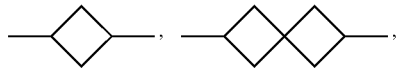

—O—, —CO—O— or —O—CO— in such a way that O atoms are not linked directly to one another, or denotes

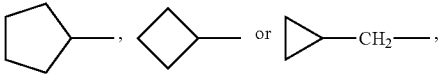

and
X⁰ is F, Cl, CN, SF₅, SCN, NCS, a halogenated alkyl radical, a halogenated alkenyl radical, a halogenated alkoxy radical or a halogenated alkenyloxy radical having up to 6 C atoms.

7. The LC medium according to claim 2, further comprising at least one compound of the following formulae

IV

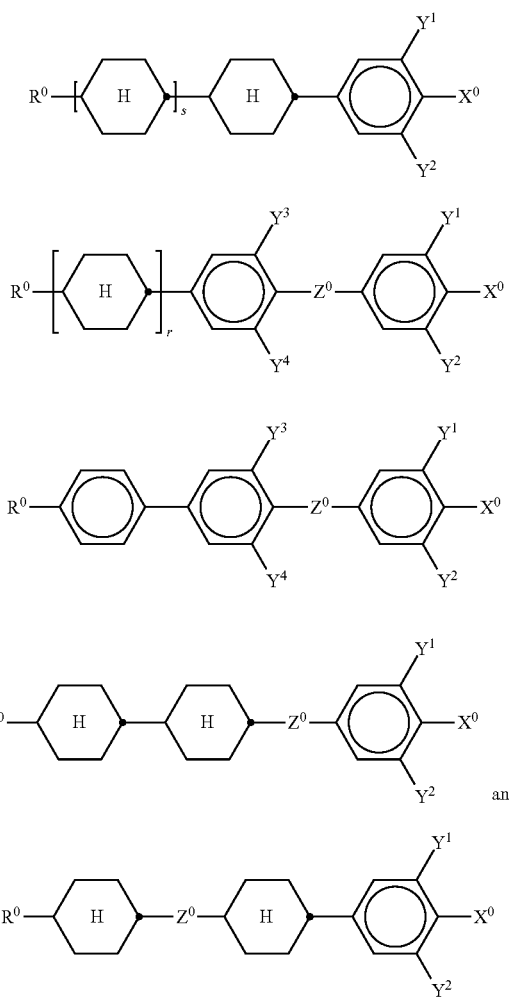

V

VI

VII

VIII in which
R⁰ is an unsubstituted or halogenated alkyl or alkoxy radical having 1 to 15 C atoms, in which one or more CH₂ groups are each optionally replaced, independently of one another, by —C≡C—, —CF₂O—, —CH=CH—,

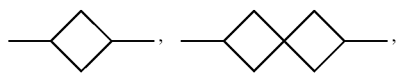

—O—, —CO—O— or —O—CO— in such a way that O atoms are not linked directly to one another, or denotes

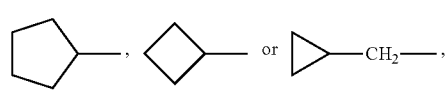

X⁰ is F, Cl, CN, SF₅, SCN, NCS, a halogenated alkyl radical, a halogenated alkenyl radical, a halogenated alkoxy radical or a halogenated alkenyloxy radical having up to 6 C atoms, $Y^{1-4}$ is H or F,
Z⁰ denotes —C₂H₄—, —(CH₂)₄—, —CH=CH—, —CF=CF—, —C₂F₄—, —CH₂CF₂—, —CF₂CH₂—, —CH₂O—, —OCH₂—, —COO— or —OCF₂—, and in formulae V and VI also a single bond, and in formulae V and VIII also —CF₂O—,
r denotes 0 or 1, and
s denotes 0 or 1.

8. The LC medium according to claim 2, further comprising at least one compound of the following formulae IVa1

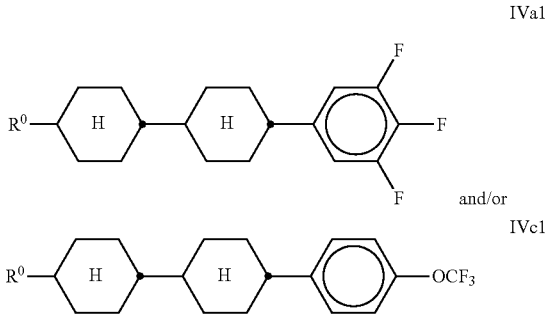

and/or

IVc1 in which
R⁰ is an unsubstituted or halogenated alkyl or alkoxy radical having 1 to 15 C atoms, in which one or more CH₂ groups are each optionally replaced, independently of one another, by —C≡C—, —CF₂O—, —CH=CH—,

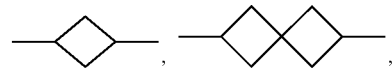

—O—, —CO—O— or —O—CO— in such a way that O atoms are not linked directly to one another, or denotes

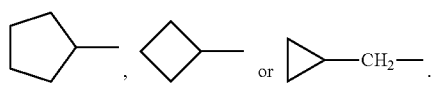

9. The LC medium according to claim 2, additionally comprising at least one compound of the following formulae:

IX

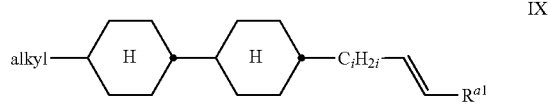

X

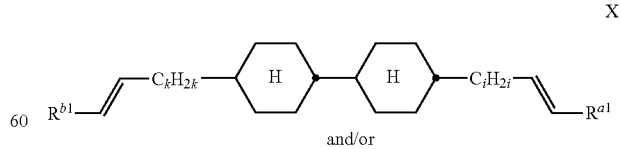

and/or

XI

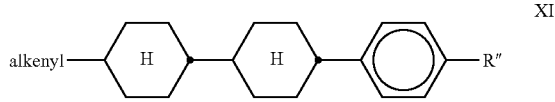

in which
"alkyl" denotes $C_{1-6}$-alkyl,
"alkenyl" denote $C_{2-6}$-alkenyl,
R" denotes $C_{1-6}$-alkyl, $C_{1-6}$-alkoxy or $C_{2-6}$-alkenyl,
$R^{a1}$, $R^{b1}$ denote independently of each other $CH_3$ or $C_2H_5$, and
i, k are independently of each other 0, 1, 2 or 3.

10. The LC medium according to claim 2, further comprising at least one compound of the following formulae

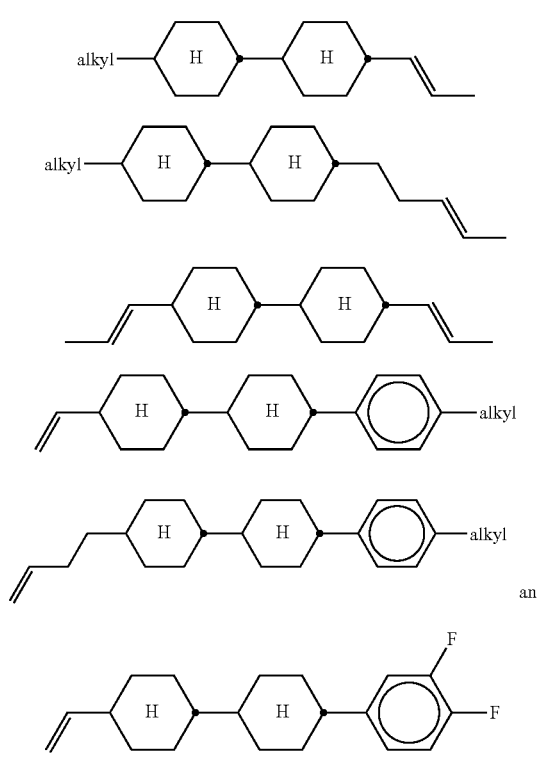

IXa

IXb

Xa

XIa

XIb and/or

XIIa wherein
"alkyl" denotes $C_{1-6}$-alkyl.

11. The LC medium according to claim 2, wherein the LC medium does not contain a compound selected from the group consisting of compounds of formulae XXIIIa, XXIIIb and XIV

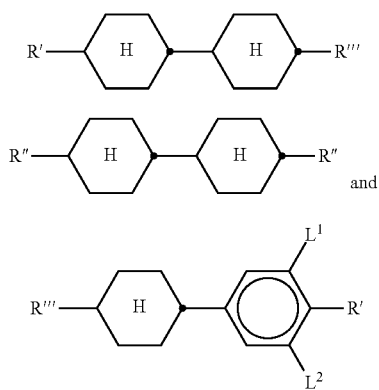

XIIIa

XIIIb and

XIV in which
$L^1$ and $L^2$ denote independently of one another H or F,
R' denotes on each occurrence identically or differently alkyl or alkoxy with 1 to 12 C atoms,
R" denotes on each occurrence identically or differently alkenyl with 2 to 7 C atoms which contains a terminal vinyl group, and
R'" denotes R' or R".

12. The LC medium according to claim 2, further comprising at least one compound of the following formula

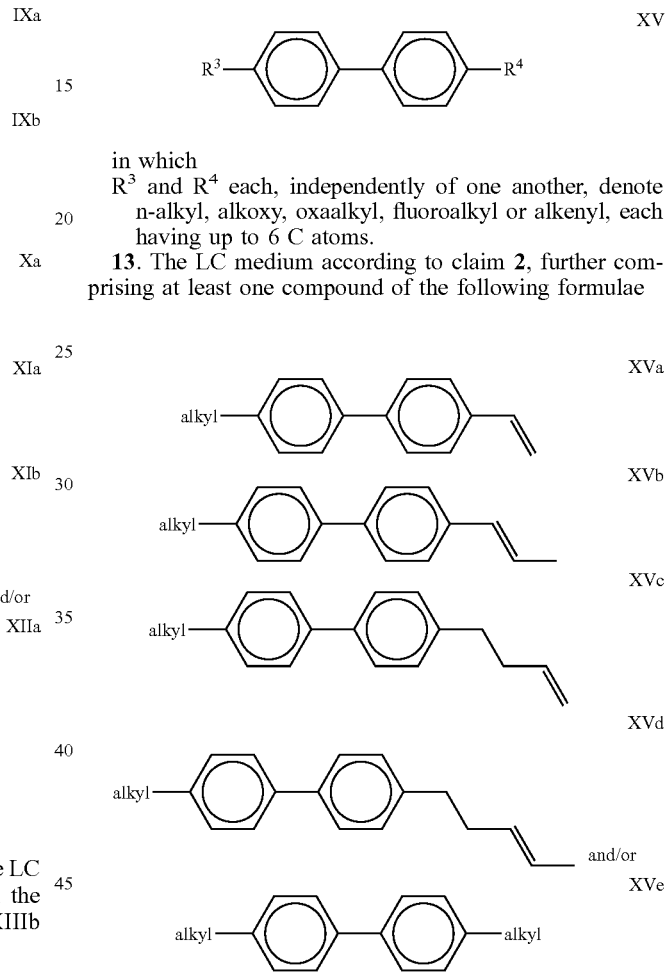

XV in which
$R^3$ and $R^4$ each, independently of one another, denote n-alkyl, alkoxy, oxaalkyl, fluoroalkyl or alkenyl, each having up to 6 C atoms.

13. The LC medium according to claim 2, further comprising at least one compound of the following formulae XVa XVb XVc XVd and/or XVe in which
"alkyl" denotes $C_{1-6}$-alkyl.

14. The LC medium according to claim 2, further comprising at least one compound of formula XVI

XVI in which
$R^3$ and $R^4$ each, independently of one another, denote n-alkyl, alkoxy, oxaalkyl, fluoroalkyl or alkenyl, each having up to 6 C atoms, and
L denotes H or F.

15. The LC medium according to claim 2, further comprising a compound of formula XVIc2

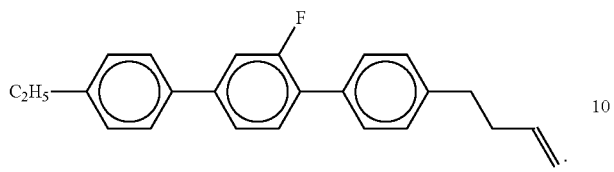
XVIc2

16. The LC medium according to claim 2, comprising at least one compound of formula IA1

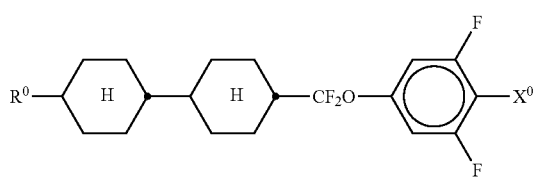
IA1 in which
R⁰ is ethyl or propyl and
X⁰ is F.

17. The LC medium according to claim 2, further comprising at least one compound of the following formulae

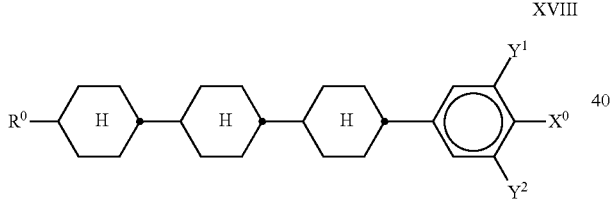
XVIII

XIX

XX

XXI

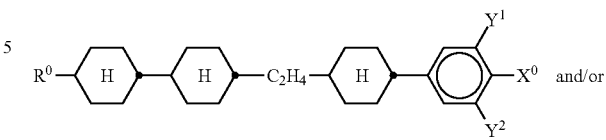
XXII and/or

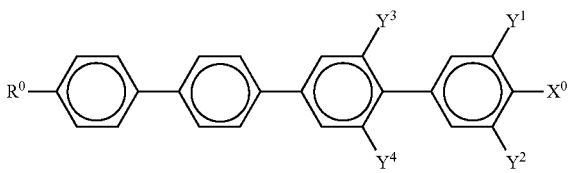
XXIII in which
R⁰ is an unsubstituted or halogenated alkyl or alkoxy radical having 1 to 15 C atoms, in which one or more CH₂ groups are each optionally replaced, independently of one another, by —C≡C—, —CF₂O—, —CH=CH—,

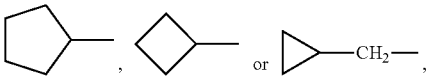

—O—, —CO—O— or —O—CO— in such a way that O atoms are not linked directly to one another, or denotes

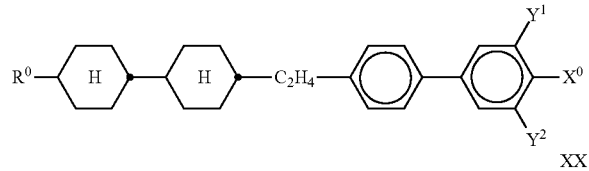

X⁰ is F, Cl, CN, SF₅, SCN, NCS, a halogenated alkyl radical, a halogenated alkenyl radical, a halogenated alkoxy radical or a halogenated alkenyloxy radical having up to 6 C atoms, and
Y¹⁻⁴ is H or F.

18. The LC medium according to claim 2, further comprising at least one compound of formula XXIa

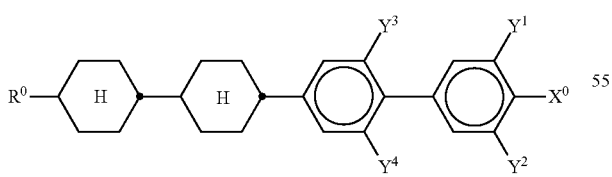
XXIa in which
R⁰ denotes ethyl, n-propyl, n-butyl or n-pentyl.

19. The LC medium according to claim 2, further comprising at least one compound of the following formulae

XXVII

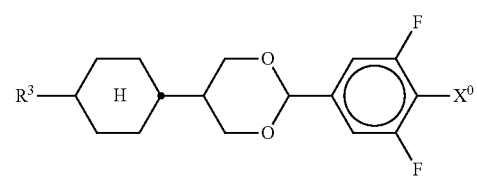

XXVIII

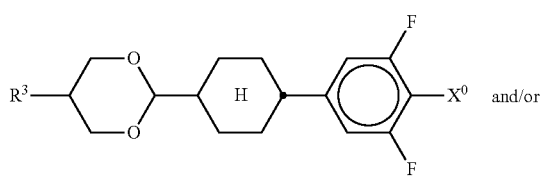 and/or

XXIX

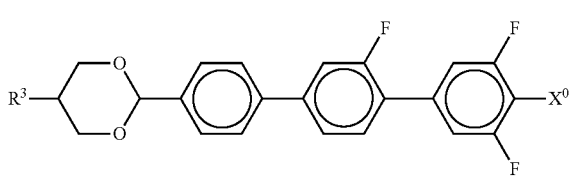

in which
R₃ denotes n-alkyl, alkoxy, oxaalkyl, fluoroalkyl or alkenyl, each having up to 6 C atoms, and
X⁰ is F, Cl, CN, SF₅, SCN, NCS, a halogenated alkyl radical, a halogenated alkenyl radical, a halogenated alkoxy radical or a halogenated alkenyloxy radical having up to 6 C atoms.

20. The LC medium according to claim 2, further comprising at least one compound of formula XXIXa

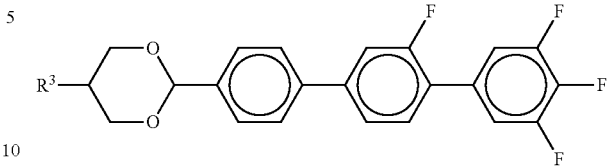

in which
R³ denotes ethyl, n-propyl, n-butyl or n-pentyl.

21. A process for preparing an LC medium according claim 2, comprising mixing at least one compound of formula I with at least one compound of formula XII and at least one of the compounds of formulae III6, III19, III20, and/or III21.

22. An electro-optical application, shutter glasses, a 3D application, or an LC display or an IPS, PS-IPS, FFS, PS—FFS, HB-FFS, U-IPS, TN, PS-TN, STN or TN-TFT display, comprising the LC medium according to claim 7.

23. The LC medium according to claim 2, wherein the total concentration of the at least one compound of formula I is more than 0.2% and less than 8%.

24. The LC medium according to claim 2, which has a clearing point ≥105° C.

25. A public information display or automotive display comprising the LC medium according to claim 2.

26. A public information display comprising the LC medium according to claim 1.

* * * * *